United States Patent
Sollich

(10) Patent No.: US 8,365,156 B2
(45) Date of Patent: Jan. 29, 2013

(54) INTERMEDIATE LANGUAGE SUPPORT FOR CHANGE RESILIENCE

(75) Inventor: Peter Franz Valentin Sollich, Munich (DE)

(73) Assignee: Microsoft Corporation, Redmond, WA (US)

( * ) Notice: Subject to any disclaimer, the term of this patent is extended or adjusted under 35 U.S.C. 154(b) by 517 days.

(21) Appl. No.: 12/762,316

(22) Filed: Apr. 17, 2010

(65) Prior Publication Data
US 2011/0258615 A1 Oct. 20, 2011

(51) Int. Cl.
G06F 9/44 (2006.01)
(52) U.S. Cl. .................. 717/146; 717/143; 717/153
(58) Field of Classification Search ............... None
See application file for complete search history.

(56) References Cited

U.S. PATENT DOCUMENTS

| | | | |
|---|---|---|---|
| 5,297,284 A | 3/1994 | Jones et al. | |
| 6,957,416 B2 | 10/2005 | Adams | |
| 7,162,626 B2 | 1/2007 | Zimmer et al. | |
| 7,219,329 B2 | 5/2007 | Meijer et al. | |
| 7,281,248 B2 | 10/2007 | Demsey et al. | |
| 7,516,449 B2 | 4/2009 | Agrawal | |
| 7,526,760 B1* | 4/2009 | Daynes et al. | 717/153 |
| 7,546,607 B2 | 6/2009 | Demsey et al. | |
| 7,571,425 B2 | 8/2009 | Lessly | |
| 7,600,223 B2 | 10/2009 | Massarenti et al. | |
| 7,627,863 B2 | 12/2009 | Chen | |
| 7,685,581 B2* | 3/2010 | Plesko et al. | 717/146 |
| 2002/0108107 A1* | 8/2002 | Darnell et al. | 717/153 |
| 2002/0170042 A1* | 11/2002 | Do et al. | 717/143 |
| 2003/0154468 A1* | 8/2003 | Gordon et al. | 717/143 |
| 2004/0268331 A1* | 12/2004 | Mitchell et al. | 717/146 |
| 2005/0055680 A1* | 3/2005 | Kluger et al. | 717/143 |
| 2005/0060695 A1* | 3/2005 | Hostetter et al. | 717/153 |
| 2006/0101468 A1 | 5/2006 | Massarenti et al. | |
| 2006/0212861 A1* | 9/2006 | Tarditi et al. | 717/146 |
| 2007/0157191 A1 | 7/2007 | Seeger et al. | |
| 2009/0328017 A1* | 12/2009 | Larsen et al. | 717/146 |

OTHER PUBLICATIONS

N.B.H. Sombekke, Graph-Based Sematics of the .NET Intermediate Language, University of Twente Faculty of Electrical Engineering, Mathematics & Computer Science, 2007, pp. 10-18.*
Frances Perry, Type-Preserving Compilation for Large-Scale Optimizing Object-Oriented Compilers, Princeton University, 2008, pp. 184-190.*
Juan Chen, A Simple Typed Intermediate Language for Object-Oriented Languages, Microsoft Research, 2005, pp. 2-7.*
Eisenbach, et al., "Reuse and Abuse", Retrieved at <<http://www.jot.fm/issues/issue_2007_01/article5/article5.pdf>>, Journal of Object Technology, vol. 6, No. 1, Jan.-Feb. 2007, pp. 139-167.

(Continued)

*Primary Examiner* — Thuy Dao
*Assistant Examiner* — Mongbao Nguyen
(74) *Attorney, Agent, or Firm* — Ogilvie Law Firm

(57) ABSTRACT

Management of changes involving base classes is facilitated. An intermediate language code has execution-ready register allocation but unbound object field layout and/or virtual method slot assignment, thereby providing resilience. A symbolic reference rather than a direct offset can identify a field, and intermediate language code can be field order independent. Other symbolic references may also be used. Intermediate language code pseudo instructions can express items such as a field access, a method call, a virtual method call, part or all of a method prolog, part or all of a method epilog. A binder binds the intermediate language code to produce executable code. Thus, one may avoid recompilation otherwise required when a base class is revised by adding a field, removing a private field, rearranging field order, adding a virtual method, or rearranging virtual method order.

20 Claims, 5 Drawing Sheets

OTHER PUBLICATIONS

"3rd ECOOP Workshop on Formal Techniques for Java Programs" Retrieved at <<http://www.cs.ru.nl/ftfjp/2001/ftfjp01.pdf>>, ECOOP 2001 Workshop 4, Jun. 18, 2001, pp. 148.

Schaber, Gerhard "Dynamic Ordered Inheritance and Flexible Method Dispatch", Retrieved at <<http://www.ssw.uni-linz.ac.at/Research/Papers/Scha03/Scha03.pdf>>, PhD thesis., Johannes Kepler University of Linz, Jul. 2003, pp. 207.

Bakota, et al , "Semi-Automatic Test Case Generation from Business Process Models", Retrieved at <<http://www.cs.tut.fi/~splst09/material/Proceedings%20of%20SPLST09%20and%20NWMODE09.pdf>>, Proceedings of 11th Symposium on Programming Languages and Software Tools and 7th Nordic Workshop on Model Driven Software Engineering, Aug. 26-28, 2009, pp. 349.

Mikhajlov, et al., "A Study of the Fragile Base Class Problem", Retrieved at <<http://www.cas.mcmaster.ca/~emil/publications/fragile/ecoop98.pdf >>, Proceedings of the 12th European Conference on Object-Oriented Programming 1998 Jul. 20-24, 1998, pp. 28.

"Fragile Base Class", Retrieved at <<http://en.wikipedia.org/wiki/Fragile_base_class>>, Retrieved Date: Feb. 16, 2010, pp. 2.

"Virtual Machines, Managed Code and Component Technology", Retrieved at<<http://ieee.org/stamp/stamp.jsp?arnumber=01401995>>, 2005, pp. 8.

"MRTEs Add Both Functionality and Complexity", Retrieved at <<http://software.intel.com/en-us/articles/mrtes-add-both-functionality-and-complexity/>>, May 20, 2008, Pages.

"Java JNI Bridge: A Framework for Mixed Native ISA Execution", Retrieved at <<http://ieeexplore.ieee.org/stamp/stamp.jsp?tp=arnumber=1611530>>, 2006, Pages.

Potrebic, "What's the Fragile Base Class (FBC) Problem?", Retrieved at <<http://2f.ru/holy-wars/fbc.html>>, Jun. 25, 1997, pp. 5.

"Fragile binary interface problem", Retrieved at <<http://en.wikipedia.org/wiki/Fragile_binary_interface_problem>>, Sep. 11, 2009, pp. 3.

"Software brittleness", Retrieved at <<http://en.wikipedia.org/wiki/Software_brittleness>>, Oct. 11, 2009, pp. 3.

* cited by examiner

INTERMEDIATE LANGUAGE SUPPORT FOR CHANGE RESILIENCE

RELATED APPLICATIONS

The present application is related to and a sibling of an application Ser. No. 12/762,420, and having the same title and the same inventor as the present application.

BACKGROUND

In software, a fragile binary interface problem (also known as a fragile base class problem) may be present when internal changes to an underlying class library cause descendant libraries or programs to stop working properly. The problem may occur when a compiler for an object-oriented language generates code that accesses fields of an object using offsets from the starting point of the object to the field in question. If the author of a library changes the size or layout of public fields within an object, the offsets may change, and then software that relies on the former offsets becomes unreliable.

More generally, software sometimes exhibits brittleness as time passes and changes occur in the software and/or its environment. That is, an apparently small change to a component, to runtime support, or to input data may lead to a large reduction in software reliability. Software brittleness may be caused by a wide variety of factors, and proposed solutions to brittleness also vary widely. Moreover, attempts to reduce brittleness may conflict with other efforts, such as efforts to make a particular piece of software faster, more efficient in its use of hardware, more compact, easier to modify, and/or easier to debug.

SUMMARY

Changes to one part of a program can have repercussions in other parts, sometimes with unintended and undesirable results. Some embodiments discussed herein help facilitate management of changes involving base classes of a software product. For example, after obtaining in a memory a base class source code, some embodiments provide resilience against changes by generating in the memory from the base class source code an intermediate language code in which register allocation is execution-ready but object field layout and/or virtual method slot assignment is unbound. Sometimes the intermediate language code uses a symbolic reference rather than a direct offset to identify a field, for example, and sometimes the intermediate language code is field order independent. In some cases, intermediate language code includes native instructions and pseudo instructions, with at least one of the following expressed using pseudo instruction(s): a field access, a method call, a virtual method call, part or all of a method prolog, part or all of a method epilog. Some embodiments bind the intermediate language code to produce code which is executable by a processor.

Some embodiments help manage changes involving a base class of a software product. Suppose an embodiment obtains an initial source code A for a module A, including an initial base class A declared in the initial source code A, and obtains a source code B for a module B which includes a dependency on initial base class A. The embodiment generates an initial intermediate language code A by compiling the initial source code A, and generates an initial intermediate language code B by compiling the source code B. An initial executable code A is prepared by binding the initial intermediate language code A, and an initial executable code B is prepared by binding the initial intermediate language code B. Subsequently, a revised source code A is obtained for a revised base class A in module A.

Revised class A differs from initial base class A in at least one of the following ways: a field has been added, a private field has been removed, field order has been rearranged, a virtual method has been added, virtual method order has been rearranged. Nonetheless, the embodiment generates a revised intermediate language code A by compiling the revised source code A, prepares a revised executable code A by binding the revised intermediate language code A, and prepares a revised executable code B by rebinding the initial intermediate language code B while referencing the revised intermediate language code A. Thus, one avoids recompilation of source code B. One may then execute revised executable code A with revised executable code B free from any field offset collision and free from any virtual method slot assignment collision during execution of revised base class A.

In some embodiments, binding intermediate language code includes transforming an intermediate language pseudo instruction that accesses memory into a corresponding native language instruction having a different length in bytes than the intermediate language pseudo instruction.

In some embodiments, a size of a local variable is unspecified in the initial intermediate language code B, and rebinding the initial intermediate language code B includes determining that size and specifying that size in revised executable code B. In some embodiments, a stack frame offset (or a stack frame offset alignment requirement) of a local variable is unspecified in the initial intermediate language code B, and rebinding the initial intermediate language code B includes determining that stack frame offset (or offset alignment) and specifying that stack frame offset (or offset alignment) in revised executable code B.

In some embodiments, the initial intermediate language code B includes a symbolic reference to a type defined in revised base class A, and rebinding the initial intermediate language code B includes transforming that symbolic reference into a reference in revised executable code B that utilizes an address of a data structure describing the type. In some, the initial intermediate language code B includes a symbolic reference to a field, and rebinding the initial intermediate language code B includes transforming that symbolic reference into a numeric offset in revised executable code B. In some embodiments, the initial intermediate language code B includes a symbolic reference to a member defined in Module A, and rebinding the initial intermediate language code B includes transforming that symbolic reference into at least one of the following in revised executable code B: a numeric offset, a direct pointer to a method body, an indirect pointer to a method body, a virtual slot number.

Some embodiments include a binder which implements a structural correspondence between intermediate language code and executable code. For example, the intermediate language code and the executable code may be consistent with the structural correspondence in ways that involve accessing objects, calling virtual methods, copying a structure whose size is unspecified in the intermediate language code, zero-initializing a structure whose size is unspecified in the intermediate language code, declaring a local variable whose type is specified symbolically in the intermediate language code, defining a runtime mapping of virtual slot indices to method bodies, symbolically referencing a type, and/or in other ways.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
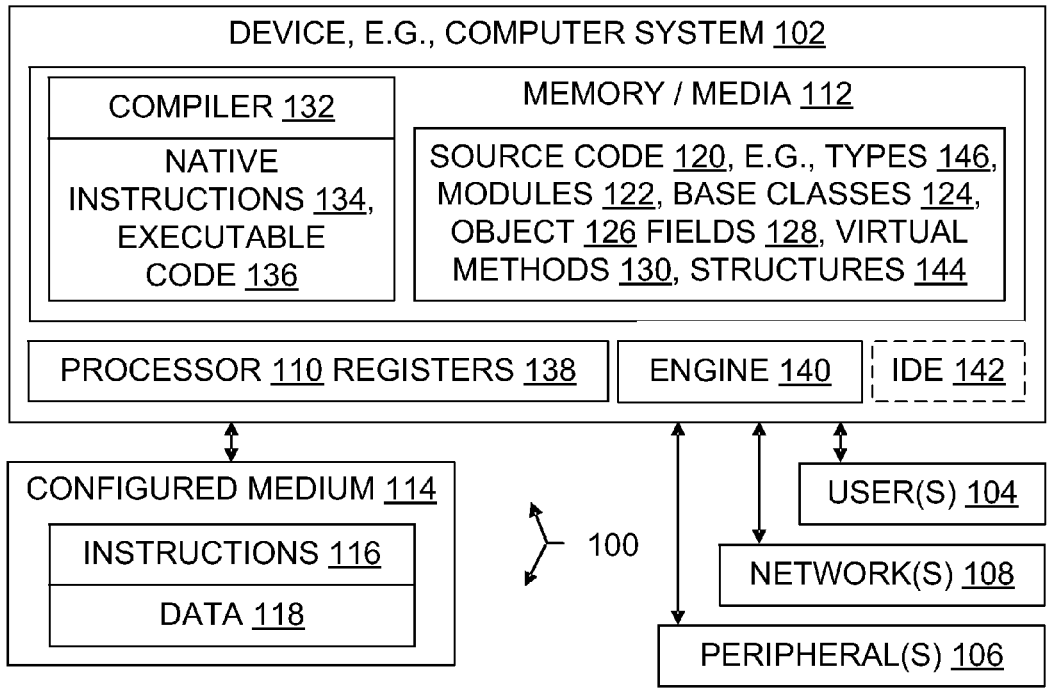
FIG. 1 is a block diagram illustrating a computer system having source code in a memory, at least one processor, and other items in an operating environment which may be present on multiple network nodes, and also illustrating configured storage medium embodiments.

Some software development approaches include generation of an intermediate code from a source code. A variety of intermediate codes exist, with various characteristics. Some technologies deploy intermediate code that is JIT-compiled ("Just-In-Time" compiled). Often such intermediate code targets an abstract stack machine. Among other things, mapping this abstract machine onto a concrete machine that uses actual hardware registers involves allocation of the machine's registers. Efficient register allocation is often a design criterion for JIT-compilation, or indeed for any compilation that produces machine language. However, an acceptable register allocation scheme may be complicated, making it relatively difficult to implement and also making it a relatively large part of the compilation in terms of time and other computational resources. JIT-compilation may also perform machine-dependent optimizations, further complicating the translation from intermediate code to machine language.

One aspect of compilation may be insertion of field offsets and virtual slot numbers into code that references them. Some approaches construct offset tables at load time, but this has limited flexibility and does not fully address the fragile binary interface problem. Thus, it remains to either fix up the code somehow, e.g., with a linker that presumes a fixed change in the addresses it modifies, or to use some kind of indirection with the code. Indirection reduces execution time performance. Code fix-up may involve intermediate code that is JIT-compiled, with the attendant register allocation costs.

By contrast, some embodiments described herein provide intermediate code which is close to the machine in that registers are already allocated, even though offsets have not been specified. This intermediate code is not JIT-compiled in the typical manner, since register allocation has already been done and is embedded in the intermediate code. Instead, this intermediate code goes through a binding on the client machine; such binding can be simpler than familiar compilation efforts that involve register allocation. Despite the embedded register allocation, however, the intermediate code can be resilient in the face of changes to object field size, object field layout, garbage collection details, structure allocation details, method call implementation details, and changes to other aspects of an executable code in a particular execution environment.

For example, some embodiments provide intermediate language code in which register allocation is sufficiently complete to permit efficient execution, and which also has pseudo instructions that "abstract" implementation details. That is, the pseudo instructions are designed to decouple certain implementation details from a programming interface which includes instructions that respect intermediate code syntax but may be bound in practice to one or more machine language instructions.

In some embodiments, pseudo instructions are provided to abstract object field layout and virtual method slot assignment, thereby mitigating or removing the fragile base class problem for an unmanaged language such as C++. In some embodiments, the capabilities provided by an intermediate language code and binder extend to managed execution environments, and include pseudo instructions which abstract garbage collector information in code and data, object allocation, representation of type descriptors, exception handling, mechanisms for virtual or interface calls, and/or other aspects of software execution. Some embodiments provide deployed intermediate code which is resilient to changes in an execution engine, and to changes in the data structures and software conventions the execution engine expects any code targeting the engine to respect.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

With regard to discussions of binding operations such as those involving "transforming", "producing", or "preparing" code, reference to "instructions" means "instructions and any corresponding data". Metadata is a type of data. For example, reference to transforming a garbage-collection-write-barrier pseudo instruction means that the transformation receives certain intermediate language code (instructions and associated metadata/data) and produces certain native code (instructions and associated metadata/data such as garbage collection tables), as discussed herein. That is, use of the term "instruction" in the context of binding does not exclude production or other use of data that is associated with instructions.

Phrases such as "register allocation is execution-ready" with regard to an intermediate language code mean that an executable code can be created from the intermediate language code without any additional or different mapping from program source code variables onto processor registers. As a result, binding this intermediate language code need not perform register allocation to produce machine language code from the intermediate language code. In other words, each user-defined or compiler-generated variable that is allocated to a register in the intermediate code will use that same register in the final executable code.

In a production system, it may happen that an entire intermediate language code has register allocation execution-ready, or it may be the case that only a proper subset of the entire intermediate language code has register allocation execution-ready. In other words, suppose X is an intermediate language code for which register allocation is execution-ready, suppose instructions Y are not register allocation execution ready, and suppose Y is added to X. Then the addition of Y does not destroy the register allocation execution-ready status of X. For example, in a particular intermediate language discussed below, called "MDIL", there are non-native instructions for which the native instruction sequence produced by binding will use temporary registers allocated by the binder. However, this type of register allocation has limited scope in MDIL, and its presence does not alter the fact that large portions of MDIL do include pseudo instructions for which register allocation is execution-ready.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "instruction(s)" means "one or more instructions" or equivalently "at least one instruction".

Whenever reference is made to data or instructions, it is understood that these items configure a computer-readable memory thereby transforming it to a particular article, as opposed to simply existing on paper, in a person's mind, or as a transitory signal on a wire, for example.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", or "communicating to" a destination may involve intervening action such as forwarding, copying, uploading, downloading, encoding, decoding, compressing, decompressing, encrypting, decrypting and so on by some other party, yet still be understood as being performed directly by the party of interest. In particular, actions such as compiling, generating, binding, and producing discussed herein may be performed directly by a party even though intervening mechanisms and/or intervening entities are involved.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by binding, rebinding, instruction insertion, slot assignment, symbol transformation, resolution, deployment, execution, modification, display, creation, revision, loading, and/or other operations.

Computer software source code 120 may include, for example, module(s) 122, base class(es) 124, object(s) 126 which have field(s) 128, virtual method(s) 130, structures 144, and/or other items. A compiler 132 and/or other code generator may be used to generate native instructions 134 from the source code, namely, instructions recognizable to a processor 110. Linkers and/or other tools combine object modules composed of native instructions and fixups to form executable code 136. The processor(s) 110 have registers 138. The processor(s) 110 and system software such as a kernel help define an execution engine 140. The source code 120 and other items shown in the Figures and/or noted herein may reside partially or entirely within one or more media 112, thereby configuring those media. An operating environment may also include other hardware, such as buses, power supplies, and accelerators, for instance.

A given operating environment 100 may include an Integrated Development Environment (IDE) 142 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use intermediate language, that is, code which is intermediate between source code and native instructions.

IDE 142 is shown in outline form in FIG. 1 to emphasize that it is not necessarily part of the illustrated operating environment, but may interoperate with items in the operating environment as discussed herein. It does not follow that items not in outline form are necessarily required, in any Figure or any embodiment.

Systems

Figure 2:
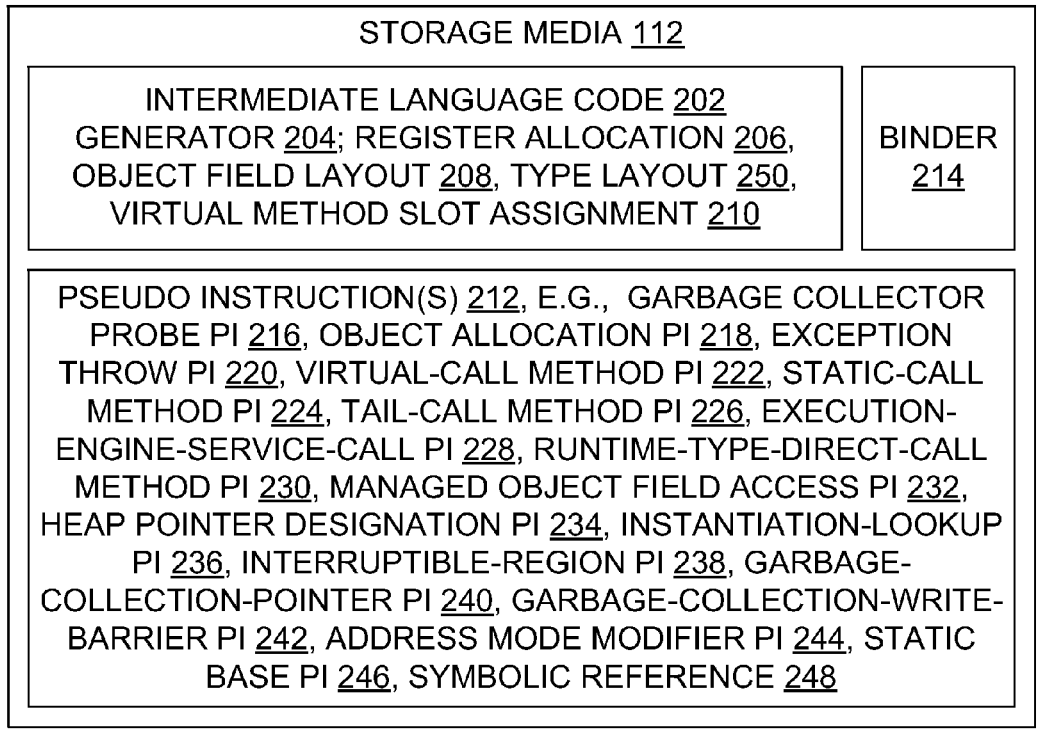
FIG. 2 is a block diagram illustrating aspects of change-resilient intermediate code in an example architecture.

FIG. 2 illustrates an architecture which is suitable for use with some embodiments. Source code 120 is transformed into intermediate language code 202 (also referred to herein as intermediate code) by a generator 204. In some embodiments, such as one illustrated in FIG. 3, the generator 204 is integrated with a compiler 132, e.g., the generator 204 may be invoked during a code generation phase of compilation. In other embodiments, such as one illustrated in FIG. 4, the generator 204 is separate from the compiler and receives as input code which has been output by the compiler 132.

Unless clearly indicated otherwise, reference herein to intermediate code (or intermediate language code) means intermediate code 202 in which register allocation 206 has been completed but other aspects of executable code 136 are not yet specified. Some uses of "intermediate code" outside this document may use the phrase "intermediate code" in reference to code which is not intermediate code 202 in the present sense, e.g., because register allocation 206 has not been completed. In practice, some configurations may employ more than one kind of intermediate code, including both intermediate code 202 and some other code which is intermediate between source and native code but is not intermediate code 202 as defined herein.

In some embodiments, for example, object field layout 208 is not fully specified in the intermediate code 202, although register allocation 206 is fully specified. In some embodiments, virtual method slot assignments 210 are not fully specified in the intermediate code 202. In some embodiments, pseudo instructions 212 within intermediate code 202 identify aspects of executable code 136 are not specified in the code 202. Such unspecified aspects are determined and specified using a binder 214. The binder 214 transforms intermediate code 202 pseudo instructions 212 into native instruction(s) 134, as taught herein.

In the Figures and text herein, "PI" means "pseudo instruction", that is, pseudo code instruction. Similarly, "NI" means "native instruction", that is, native code instruction. "MDIL" stands for "Machine Dependent Intermediate Language" and is an example of some aspects of intermediate language code 202.

A given embodiment may include one or more of the following kinds of pseudo instructions 212:

Garbage collector probe pseudo instruction(s) 216 can be inserted into tight loops to check for a pending garbage collection. The check can be implemented by a binder 214 transformation of garbage collector probe pseudo instruction(s) 216 into native instructions 134. That is, garbage collector probe pseudo instruction(s) 216 can be used as placeholders for binder-specified machine instruction(s) which upon execution will check for a pending garbage collection. How the check is performed, and what garbage collection information the check uses, may depend on the execution engine 140; familiar garbage collection mechanisms may be used.

Object allocation pseudo instruction(s) 218 can be used as placeholders for binder-specified machine instruction(s) 134 which upon execution will allocate memory to hold an object of a type specified in the intermediate language code 202. How the allocation is performed may depend on the execution engine 140; familiar memory allocation mechanisms may be used.

Exception throw pseudo instruction(s) 220 can be used as placeholders for binder-specified machine instruction(s) 134 which upon execution will throw a new exception, rethrow a current exception, and/or otherwise perform exception operation(s). How the exception is performed may depend on the execution engine 140; familiar exception handling mechanisms may be used.

Virtual-call method pseudo instruction(s) 222 can be used as placeholders for binder-specified machine instruction(s) 134 which upon execution will make a virtual call to a designated method. How the virtual call is performed may depend on the execution engine 140; virtual tables and/or other familiar virtual call mechanisms may be used. A virtual method may be called non-virtually in some situations, so there may be a difference between making a virtual call to a method (which would be virtual in this case), and making a call to a virtual method (in which case the call itself may either be virtual or not). A distinction between virtual and non-virtual calls is that for a virtual call, the address to call is determined by a runtime lookup of the method's address in an object's virtual table or another lookup mechanism, while for a non-virtual call, the method's address is determined statically.

Static-call method pseudo instruction(s) 224 can be used as placeholders for binder-specified machine instruction(s) 134 which upon execution will make a non-virtual call to a designated method. How the call is performed may depend on the execution engine 140 and other factors; familiar call mechanisms may be used.

Tail-call method pseudo instruction(s) 226 can be used as placeholders for binder-specified machine instruction(s) 134 which upon execution will make a tail call to a designated method, namely, a call followed immediately by a return to the caller. How the tail call is performed may depend on the execution engine 140; familiar mechanisms may be used.

Execution-engine-service-call pseudo instruction(s) 228 can be used as placeholders for binder-specified machine instruction(s) 134 which upon execution will make a call to a designated runtime helper, e.g., an execution engine 140 service routine. The available services will normally depend on the execution engine 140. In some cases, engine services are available through code 202, but in other cases engine services are accessed through other mechanisms. In a given embodiment execution engine services may include none, one, or more of the following categories; some of these examples are implementation-specific and/or related to an MDIL HELPER_CALL pseudo instruction 228, and not necessarily pertinent to every embodiment:

Arithmetic helpers for operations a machine does not support natively, e.g., 64-bit multiplications on a 32-bit machine.

Conversions between floating point and integer data types, optionally with error checking.

Helpers for throwing various kinds of runtime exceptions, e.g., for runtime range checking.

Helpers for security checks.

Helpers for accessing "remote" objects. Objects may be remote in the sense that they may be in another process on the same machine, and/or in the sense that they may be on another machine altogether.

Helper calls for various kinds of type checks at runtime.

Helper calls relating to calling unmanaged code.

Helper calls relating to object allocations. In MDIL, these are represented by ALLOC_OBJECT or ALLOC_ARRAY in intermediate code 202. One exception is CORINFO_HELP_NEW_MDARR_NO_LBOUNDS, which allocates a multi-dimensional array with all low bounds set to zero.

Helper calls interacting with the garbage collector. For instance, a GC_PROBE pseudo instruction 216 may be translated into a helper call CORINFO_HELP_POLL_GC, but depending on the execution environment, there may be more efficient ways of implementing GC_PROBE. A service CORINFO_HELP_ASSIGN_REF_ECX is another call in this category; it helps implement a write barrier and thus could be more compactly represented by a STORE_REF pseudo instruction in the intermediate code 202.

Runtime-type-direct-call method pseudo instruction(s) 230 can be used as a request to a binder 214 to not perform a virtual call, but instead to determine a target method of a virtual or interface call from a runtime-type provided by a compiler 132 or other intermediate code 202 generator 204. Thus, the binder 214 may be asked to insert machine instruction(s) in place of the pseudo instruction 230 to make a direct call to a method of a runtime type that is identified symbolically in the intermediate language code 202. For instance, an MDIL CONSTRAINT pseudo instruction 230 specifies the runtime-type of the object a virtual call is performed on. CONSTRAINT operates as a request to a binder 214 to not perform a virtual call at all, but rather to figure out the target method of a virtual or interface call from a runtime-type provided by a compiler.

Managed object field access pseudo instruction(s) 232 can be used as placeholders for binder-specified machine instruction(s) 134 which upon execution will access a field 128 of an object 126 which is managed, e.g., an object whose allocation is managed by an execution engine 140. Access may take the form of a load, an add, a store, or another operation, for example. The actual field offsets placed in native code 134 by the binder may change due to versioning of managed assemblies and of the execution engine 140, for example. In some embodiments, field access pseudo instructions 232 may use a variety of addressing modes. In general these pseudo instruction modes map directly to native addressing modes. In some cases extra instructions and possibly also temporary registers are used. MDIL also includes array access addressing modes, which abstract the layout of the array header, e.g., where the length of the array is stored, and where the first array element is in relation to the starting address of the array.

Heap pointer designation pseudo instruction(s) 234 can be used to convey to a binder 214 which registers or stack locations contain which kind of pointer at what locations in a method. The binder 214 can use such information to determine a runtime mapping from a position within a method to a set of pointer location(s) that contain pointer(s) into a garbage collection heap.

In MDIL, some examples of heap pointer designation pseudo instructions 234 include REF_UNTR, REF_BIRTH, and REF_DEATH, since they each help determine a mapping from method body execution point to locations that point into the garbage collection heap. In general, these locations only contain a gc pointer during a particular portion of the execution of a method. One can think of garbage collection as interrupting the execution of a method at a particular point of execution. The execution system doing the garbage collection may well need to determine which registers and stack locations contain pointers to the garbage collected heap at the particular point where execution was interrupted. Conceptually, this may be determined by scanning the intermediate code up to the point where execution was interrupted and maintaining a list of locations containing pointers to the garbage collected heap as follows: The list starts out empty. For each REF_UNTR_xxx pseudo instruction, the location is added to the list. For each REF_BIRTH_xxx pseudo instruction, the location is added to the list. For each REF_DEATH_xxx pseudo instruction, the location is deleted from the list. In a given implementation, the intermediate code is not necessarily kept around or scanned; instead an additional data structure is built that is associated with each method and implements the same mapping from an execution point within a method to a set of locations (registers or stack locations) that contain pointers to the garbage collected heap.

Instantiation-lookup pseudo instruction(s) 236 can be used as placeholders for binder-specified machine instruction(s) 134 which upon execution will lookup an instantiation or instance of a generic type or method, for example. An instantiation parameter identifying a specific instance of a generic item may be passed as a parameter of the pseudo instruction, provided in a dictionary attached to a "this" pointer, or supplied through another mechanism.

More generally, some embodiments include support for generic code whereby an actual native code sequence may depend on some type supplied as a parameter. The intermediate code 202 may be shared, or there may be several flavors of intermediate code depending on the kind of type parameter. For instance, there may be an intermediate code method body for integral types, one for floating point types, one for reference types, one for user-defined value types (struct types), and so on. In shared generic code, the actual machine code is shared between similar instances of a generic type or a generic method. In some cases this implies that a runtime lookup of a type, field, method or the like is performed.

Interruptible-region pseudo instruction(s) 238 can be used to convey to a binder 214 which portions of code have access to garbage collector information, and in particular, which portions of code other than call return sites have such access. Details of garbage collection may depend on the execution engine 140; familiar mechanisms may be used.

In MDIL, START_FULLY_INTERRUPTIBLE and END_FULLY_INTERRUPTIBLE pseudo instructions 238 delineate regions where the garbage collection information is precise at each instruction boundary rather than just at call sites. This may be important for situations in a multithreaded program where one thread allocates memory, while another thread executes a long-running loop that does not make any calls. In this situation, it may be desired to be able to stop the second thread and be able to report all the garbage collection pointers accurately.

Garbage-collection-pointer pseudo instruction(s) 240 can be used to indicate to a binder 214 where arguments containing garbage collector pointers are pushed on a stack, popped from a stack, or become invalid for garbage collection without having been popped. In some embodiments, garbage-collection-pointer pseudo instruction(s) 240 can be used to indicate that a value which is not a garbage collector pointer has been pushed onto a stack.

In MDIL, REF_PUSH and NONREF_PUSH are examples of garbage-collection-pointer pseudo instruction(s) 240. In particular, NONREF_PUSH indicates that a value which is not a garbage collector pointer has been pushed onto a stack. As a result, the garbage collector knows if something is not a garbage collector pointer, but some other value that may happen to look like one. This NONREF_PUSH indication may be particularly helpful when a garbage collector decides to compact the garbage collector heap, during which it may adjust some or all of the garbage collector pointers kept around by the program; it would be incorrect to adjust a regular integer that is not a pointer. This NONREF_PUSH indication may also help the garbage collector know where on the stack return addresses are stored.

Garbage-collection-write-barrier pseudo instruction(s) 242 can be used to convey to a binder 214 the status of a garbage collection write barrier. Details of the write barrier and other aspects of garbage collection, such as the size of a card table data structure used in write barrier implementation, may depend on the execution engine 140; familiar mechanisms may be used.

In MDIL a STORE_REF pseudo instruction 242 is available to support generational garbage collectors. This instruction 242 generates what is known as a write barrier, namely, a hint to the execution engine that a pointer to a younger object may have been stored into an older object. The STORE_REF instruction can occur inside or outside of an interruptible region. STORE_REF, will be transformed by the binder into a sequence of machine instructions implementing a garbage collector write barrier as appropriate for the target execution engine.

MDIL also includes address mode modifiers. Under a strict view, these address mode modifiers are not instructions in their own right but are instead used as part of an instruction. For convenience herein, however, an "address mode modifier pseudo instruction" is any pseudo instruction 212 which includes an address mode modifier. Accordingly, some pseudo instructions 212 lie in at least two categories, e.g., a given instruction 212 may be both a managed object field access pseudo instruction 232 and an address mode modifier pseudo instruction 244. Address mode modifier pseudo instruction(s) 244 can be used as placeholders for portions of binder-specified machine instruction(s) 134 which include an address mode modification. In MDIL these pseudo instructions 244 hide the layout of arrays in the execution engine, e.g., the layout of the array header containing the length. But their role is not necessarily limited to hiding array layout. In MDIL, these pseudo instructions 244 also have provisions to support array elements changing size during versioning.

Static base pseudo instruction(s) 246 can be used as placeholders for binder-specified machine instruction(s) 134 which include or provide a base address for accessing a static variable storage area. In MDIL a GET_STATIC_BASE pseudo instruction 246 is available to obtain the base of the statics that do not contain garbage collection pointers (e.g., int, double, bool). A GET_STATIC_BASE_GC pseudo instruction 246 is available to obtain the base of the statics containing garbage collection pointers, as well as user-defined struct types. In MDIL, these pseudo instructions hide (defer specification to binding time) the precise access path to the static fields for a class, and also hide whether a class initializer should be run.

Some pseudo instructions include symbolic reference(s) 248 to fields, types, and/or other items. For example, tokens may be used to identify a field or a type without also specifying details such as the field's offset or the type's size; the binder 214 adds the details needed for execution while transforming code with pseudo instructions into fully native code having no pseudo instructions.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

With reference to FIGS. 1 and 2, some embodiments provide a computer system 102 with a logical processor 110 and a memory medium 112 configured by circuitry, firmware, and/or software to transform intermediate code containing pseudo instructions into native code as described herein. For example, some embodiments provide a system having a processor 110 in operable communication with a memory 112, with an intermediate language code 202 and an executable code 136 residing in the memory (e.g., in RAM and/or in a file on a disk). The intermediate language code and the executable code are consistent with a structural correspondence in that each register allocation 206 in the intermediate language code has an identical register allocation 206 in the executable code.

In addition, in some embodiments the intermediate language code and the executable code are consistent with regard to object field layout and/or virtual method slot assignment. An intermediate language code 202 and an executable code 136 are consistent with regard to object field layout if a pseudo instruction 212 in the intermediate language code for accessing objects 126 includes a symbolic field reference which corresponds to machine instructions 134 using numeric field offsets in the executable code. The binder 214 transforms the symbolic field reference into a numeric offset recognizable by the execution engine 140 targeted by the binder.

One may say that "object field layout is as yet unbound" to indicate that the intermediate language code uses symbolic field references instead of direct offsets. For example, if object field layout is as yet unbound then the order of fields is not specified in the intermediate language. The intermediate language is field order independent in that two functionally identical executable codes can be created from the same intermediate language code, with those two executable codes differing only in the relative order in RAM of two fields of some object.

An intermediate language code 202 and an executable code 136 are consistent with regard to virtual method slot assignment if a pseudo instruction 212 in the intermediate language code for calling virtual methods 130 includes a symbolic slot reference which corresponds to machine instructions 134 using numeric virtual method table slots in the executable code. The binder 214 transforms the symbolic slot reference into a numeric virtual method table slot (e.g., an index) which is recognizable by the execution engine 140 targeted by the binder. One may say that "virtual method slot assignment is as yet unbound" to indicate that the virtual method slot numbers are not specified in the intermediate language.

In some embodiments, the intermediate code may use symbolic references for virtual methods, may leave virtual slot assignments unspecified, and may leave the order of virtual methods unspecified. Thus, two executable functionally equivalent programs can be generated that differ only in the relative order of in the virtual table of the virtual methods, i.e. the virtual slot assignment.

Some embodiments include a binder 214 which implements the structural correspondence between the intermediate language code 202 and the executable code 136. In some embodiments, the binder 214 is significantly faster and easier to implement/maintain/port than a JIT compiler, because register allocation 206 has been done in the intermediate language code 202 that reaches the binder.

In some embodiments, the intermediate language code 202 and the executable code 136 are consistent with the structural correspondence in that a pseudo instruction 212 in the intermediate language code symbolically referencing a type 146 corresponds to machine instructions 134 in the executable code 136 specifying an address of a data structure describing the type.

The "structural correspondence" referred to herein that relates intermediate code 202 and native instructions 134/executable code 136 is not limited to management of program data structures, and in particular is not limited to objects 126 or structures 144, but may extend beyond in some embodiments to embrace garbage collection, exception handling, method invocation, and other aspects of software, as discussed herein. However, some pseudo instructions are directed specifically at managing structures 144 such as C structs, Pascal records, and similar multi-field/multi-member data structures in these and other programming languages.

In some embodiments, for example, the intermediate language code 202 and the executable code 136 are consistent with the structural correspondence in that a pseudo instruction 212 in the intermediate language code for copying a structure 144 (e.g., a struct or record) whose size is unspecified in the intermediate language code corresponds to machine instructions 134 in the executable code that are consistent with a specific structure size. For example, a pseudo instruction 212 may declare a variable with a type which is specified as a symbolic reference 248 to the type, with the actual size of the type determined in the binder rather than in the intermediate code generator.

In some embodiments, the intermediate language code 202 and the executable code 136 are consistent with the structural correspondence in that a pseudo instruction 212 in the intermediate language code for zero-initializing a structure 144 (e.g., a local variable) whose size is unspecified in the intermediate language code corresponds to machine instructions in the executable code that are consistent with a specific structure size.

In some embodiments, the intermediate language code 202 and the executable code 136 are consistent with the structural correspondence in that a pseudo instruction 212 in the intermediate language code for declaring in a routine a local variable whose type is specified symbolically in the intermediate language code corresponds to machine instructions in the executable code that are consistent with at least one specific local variable size of at least one local variable declared symbolically in the routine.

For example, a pseudo instruction 212 may zero-initialize a portion of memory of a particular type which is specified symbolically in the intermediate code 202. The memory may be a field embedded inside some other type, an element of array, etc.

Note also machine instructions 134 can be consistent with intermediate code 202 by way of a structural correspondence without necessarily containing the structure size explicitly in some fashion. For instance, if a structure with a size of eight bytes is zero-initialized in intermediate code 202, then a generated native code 134 sequence may consist of three instructions: the first one loads a value of zero into a machine register, and the second and third one store that machine register into the first and second four-byte section of memory in the structure. In some cases only the cumulative size of all the pseudo instructions 212 (as well as their alignment requirements) in a method body is manifested as an explicit constant in the generated machine code 134. When a symbolic local variable is accessed, what is present in the executable code is the local variable offset, which may depend on the sizes and alignment requirements not just of the variable itself, but also of preceding local variables.

Turning aside now from pseudo instructions which are directed specifically at structures 144, in some embodiments, the intermediate language code 202 and the executable code 136 are consistent with the structural correspondence in that a pseudo instruction 212 in the intermediate language code for a type layout 250 description of a type at least partially defines a runtime mapping of virtual slot indices to method bodies for the type, wherein at least one method body pointer in the executable code 136 implements a virtual method 130 as being one of the following: a new virtual method, an override of a virtual method in a base type.

In some embodiments, the binder 214 builds virtual method tables (slot assignments 210) which are consistent with the type layout description. A virtual method table may be viewed as an array of pointers to methods. Each type has its own virtual method table, but by default the pointers to the methods are copied from the base type, except in the following cases. First, when the type layout description specifies a new virtual method, a new slot is added to the virtual method table for this type, pointing to the body of the new method. Second, when the type layout description specifies an override of a virtual method in the base class, the binder looks up the virtual slot number of the method in the base type. That slot in the virtual method table of the derived type is then made to point to the overriding method (from the derived type) instead of the method from the base type.

In some embodiments, the system establishes a mapping of virtual slot indices to method bodies for the type whose layout is being described, that is, a new virtual method creates a new slot and maps it to the new method body, while an override maps an existing virtual slot to a new method. This may be done without ever mentioning the virtual slot number explicitly in the intermediate code 202. Instead, the code 202 is treated as saying in effect "this method gets a new slot" or "this method uses the same slot as this other existing method". The binder 214 takes this declarative description of virtual methods and what virtual methods override what other virtual methods to construct an efficient mapping for use at runtime.

In some embodiments, binders 214 generate native instructions both for method calls and for virtual method calls. For a method call, the binder will provide an address to call, possibly through an indirection cell filled in at module load time. For a virtual method call, the binder will synthesize a machine code sequence containing the virtual slot number, involving one or more indirections from the object the virtual method is called on.

In some embodiments, the intermediate language code 202 and the executable code 136 are consistent with the structural correspondence in that a garbage collector probe pseudo instruction 212, 216 in the intermediate language code corresponds in position to machine instruction(s) 134 in the executable code 136 which upon execution will check for a pending garbage collection.

In some embodiments, the intermediate language code 202 and the executable code 136 are consistent with the structural correspondence in that an object allocation pseudo instruction 212, 218 in the intermediate language code corresponds in position to machine instruction(s) 134 in the executable code 136 which upon execution will allocate memory to hold an object 126 of a type specified in the intermediate language code.

In some embodiments, the intermediate language code 202 and the executable code 136 are consistent with the structural correspondence in that an exception throw pseudo instruction 212, 220 in the intermediate language code corresponds in position to machine instruction(s) 134 in the executable code which upon execution will throw an exception object that is identified in a register 138 specified in the intermediate language code.

In some embodiments, the intermediate language code 202 and the executable code 136 are consistent with the structural correspondence in that a virtual-call method pseudo instruction 212, 222 in the intermediate language code corresponds in position to machine instruction(s) 134 in the executable code which upon execution will make a virtual call to a method that is identified symbolically in the intermediate language code.

In some embodiments, the intermediate language code 202 and the executable code 136 are consistent with the structural correspondence in that a static-call method pseudo instruction 212, 224 in the intermediate language code corresponds in position to machine instruction(s) 134 in the executable code which upon execution will make a static call to a method that is identified symbolically in the intermediate language code.

In some embodiments, the intermediate language code 202 and the executable code 136 are consistent with the structural correspondence in that a tail-call method pseudo instruction 212, 226 in the intermediate language code corresponds in position to machine instruction(s) 134 in the executable code which upon execution will make a tail call to a method that is identified symbolically in the intermediate language code.

In some embodiments, the intermediate language code 202 and the executable code 136 are consistent with the structural correspondence in that a runtime-type-direct-call method pseudo instruction 212, 230 in the intermediate language code corresponds in position to machine instruction(s) 134 in the executable code which upon execution will make a direct call to a method of a runtime type that is identified symbolically in the intermediate language code.

In some embodiments, the intermediate language code 202 and the executable code 136 are consistent with the structural correspondence in that a managed object field access pseudo instruction 212, 232 in the intermediate language code corresponds in position to machine instruction(s) 134 in the executable code which upon execution will use a field offset for accessing a field 128 of an object 126 on a garbage collected heap, the field offset being unspecified in the intermediate language code.

In some embodiments, the intermediate language code 202 and the executable code 136 are consistent with the structural correspondence in that the intermediate language code contains a garbage-collection-pointer pseudo instruction 212, 240 indicating at least one of the following: a garbage collector pointer is pushed onto a stack, a garbage collector pointer is popped off of a stack, a garbage collector pointer becomes invalid, a value which is not a garbage collector pointer has been pushed onto a stack.

In some embodiments, the intermediate language code 202 and the executable code 136 are consistent with the structural correspondence in that the intermediate language code contains a garbage-collection-write-barrier pseudo instruction 212, 242 indicating a status of a garbage collector write barrier.

In some embodiments, types can embed other types. In some embodiments, parts of stack frames can use a symbolic layout, e.g., local variables can be of types whose size and layout is computed by the binder.

The size of code is often a consideration, particularly with intermediate codes and native codes, and operations which change code size may invalidate jumps and other addresses embedded within code. In some embodiments, the binder 214 transforms pseudo instructions 212 which occupy X bytes of space into native instructions that have different number of bytes. The native code may be larger, or smaller, than the corresponding intermediate code. In some embodiments, a binder 214 determines and inserts jump/call addresses based on changing code sizes, as opposed to addresses based on a given address and a fixed offset as is done by familiar linkers. That is, such binders can correctly process address generation/update situations that linkers are unable to process correctly. The binders 214 can determine when instructions can use a smaller encoding (depending on the size of field offsets and virtual slot numbers), and adjust branch distances accordingly.

Some embodiments operate in a "cloud" computing environment and/or a "cloud" storage environment. For example, source code 120 may be on multiple devices/systems 102 in a networked cloud, corresponding intermediate code 202 may be stored on yet other devices within the cloud, and corresponding executable code 136 may configure memory on yet other cloud device(s)/system(s) 102. For example, compilation of source code 120 to produce intermediate language code 202 code may occur on one machine whereas binding of that intermediate language code 202 code to produce executable code 136 may occur after the intermediate language code 202 code is deployed to a different machine.

Processes

Figure 3:
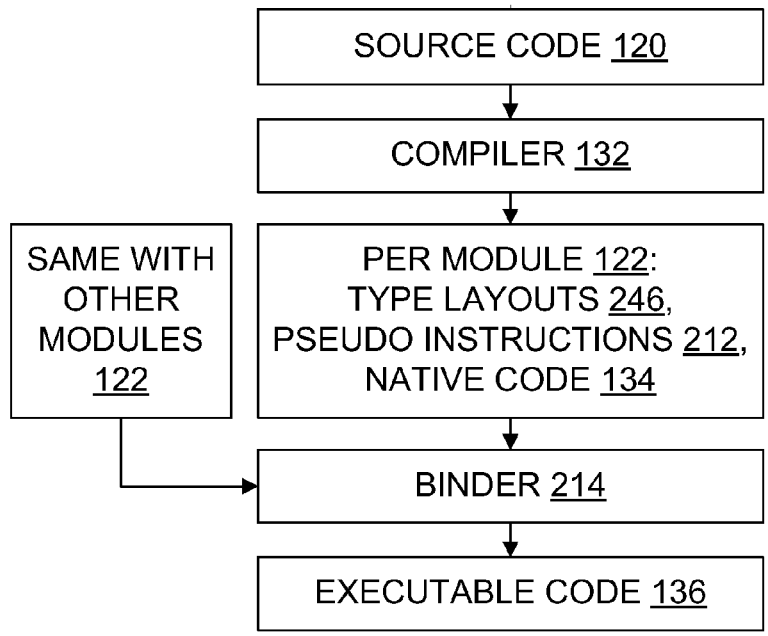
FIG. 3 is a data flow diagram illustrating usage of change-resilient pseudo instructions in some embodiments.
Figure 4:
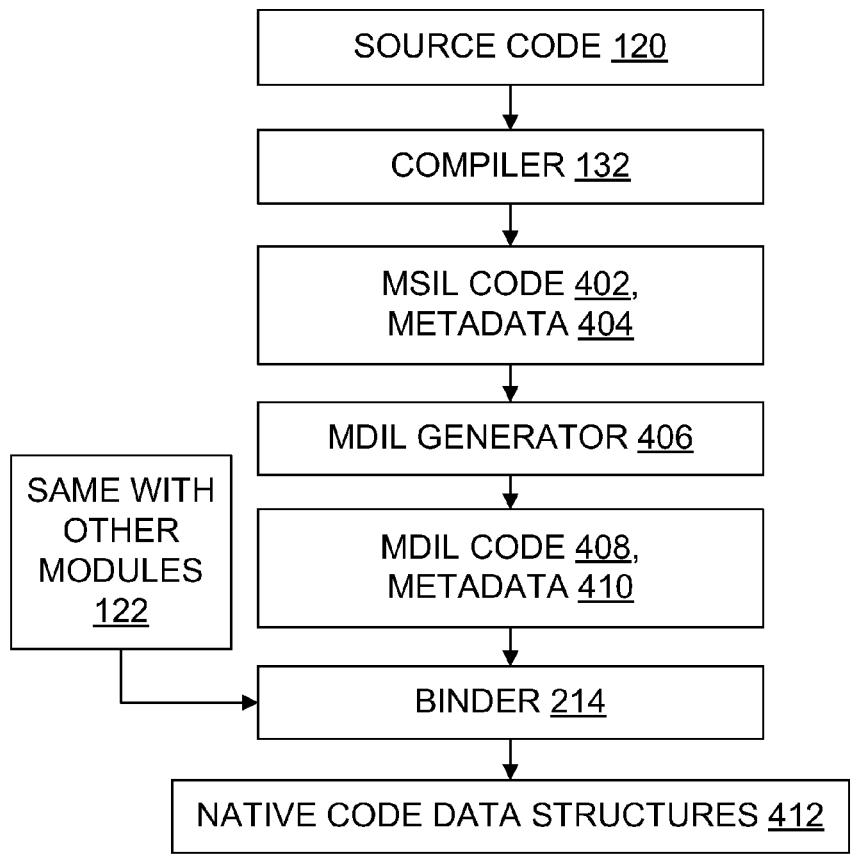
FIG. 4 is a data flow diagram illustrating usage of change-resilient pseudo instructions of a particular intermediate language example in some embodiments.
Figure 5:
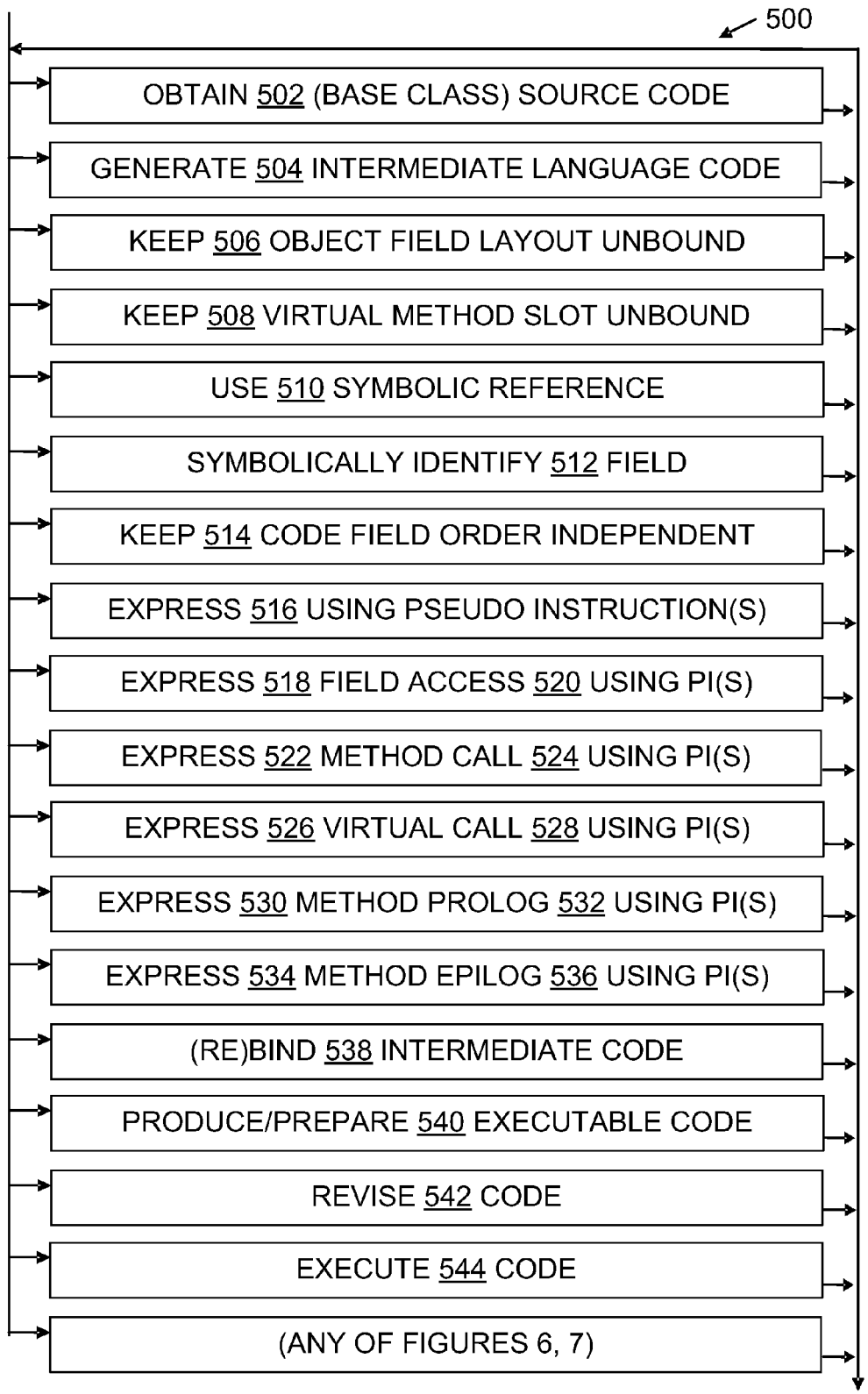
FIGS. 5, 6, and 7 collectively form a flow chart illustrating steps of some process and configured storage medium embodiments.
Figure 6:
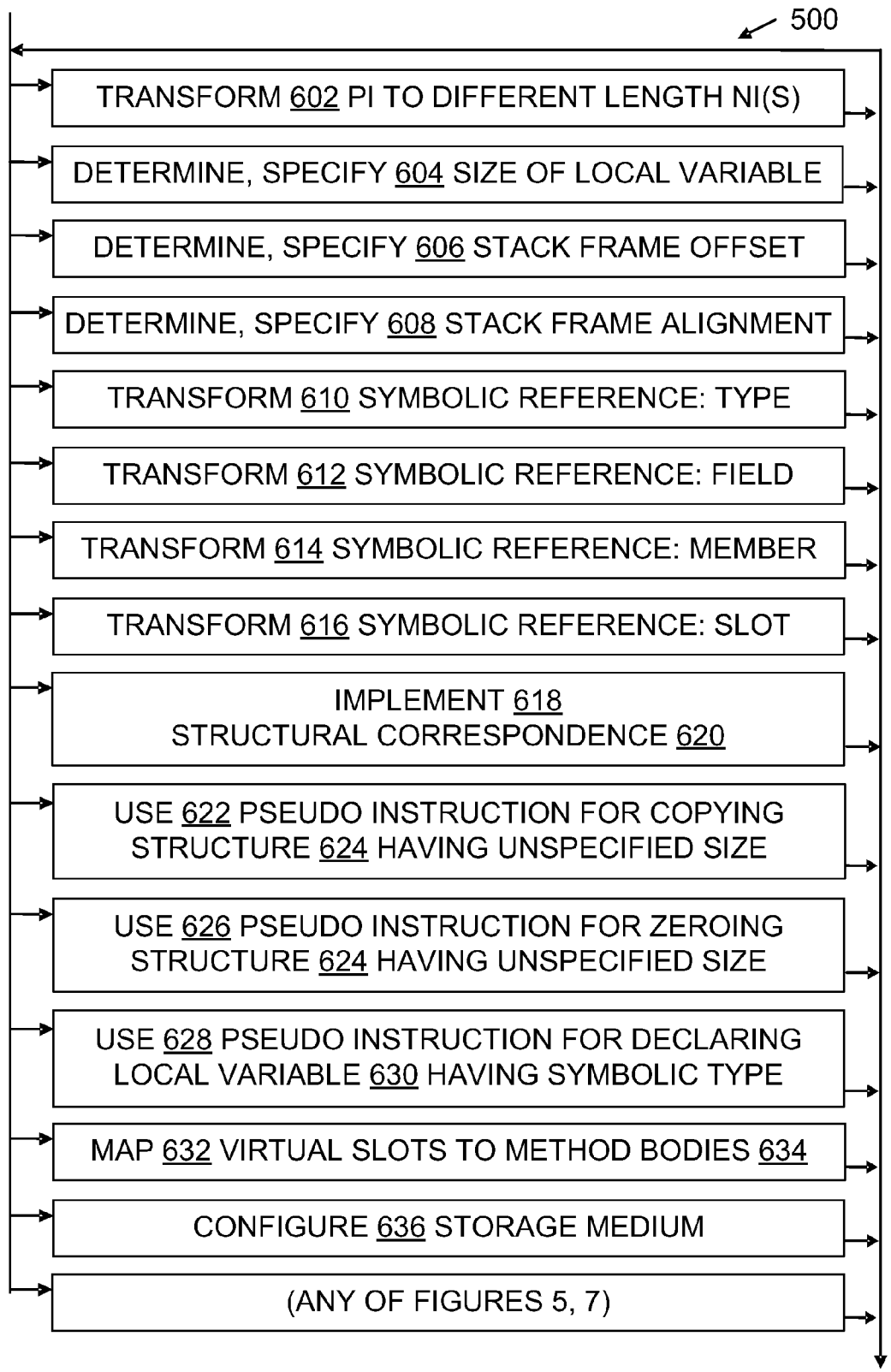
Figure 7:
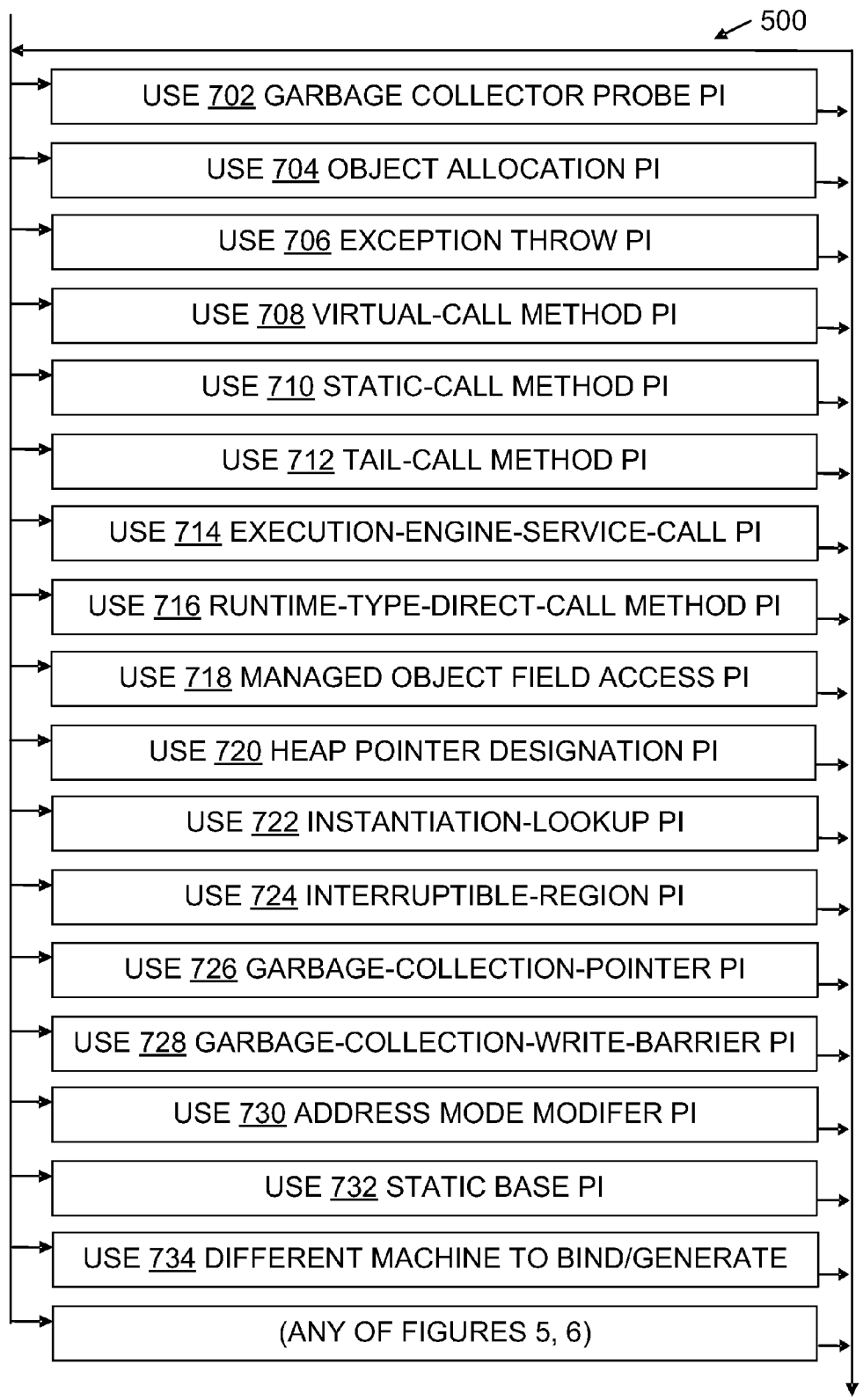

FIGS. 3 through 7 illustrate some process embodiments. FIGS. 5 through 7 collectively form a flowchart 500. Processes shown in the Figures may be performed in some embodiments automatically, e.g., by an intermediate code generator 204 and a binder 214 under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIGS. 5 to 7. Steps may be performed serially, in a partially overlapping manner, or fully in parallel. The order in which flowchart 500 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flows, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

FIG. 3 illustrates process and other embodiments with particular attention to version resilience in the handling of base classes 124. Source code 120 (including in this instance at least one base class 124) is input to a compiler 132, which generates intermediate language code 202 for at least one module 122, including in that intermediate code 202 both pseudo instructions 212 and native code instructions 134. The intermediate code 202 is fed in turn to a binder 214, which resolves the pseudo instructions 212 into native code instructions 134, e.g., by calculating numeric offsets for fields 128 based on type layout 250 information, and by using those numeric offsets to replace symbolic field references that were used in pseudo instructions.

FIG. 4 illustrates process and other embodiments with particular attention to version resilience in the handling of garbage collection and/or other pseudo code categories enumerated in FIG. 2. Source code 120 is input to a compiler 132, which generates MSIL, a familiar intermediate language code; MSIL stands for "Microsoft Intermediate Language". Associated with the MSIL code instructions are familiar metadata 404. The MSIL, including its metadata, is fed into an MDIL generator, which is an example of a generator 204. The MDIL generator generates MDIL code 408 and its associated metadata 410. MDIL stands for "Machine Dependent Intermediate Language" and is an example of intermediate language code 202. There may be some overlap between MDIL native instructions and the underlying MSIL instructions, and there may be overlap between MDIL metadata and MSIL metadata. However, MSIL does not include pseudo instructions 212 discussed herein as belonging to MDIL. The MDIL intermediate code 202 is fed to a binder 214, which resolves the pseudo instructions 212 into native code instructions 134, including native code data structures 412 such as virtual method slot assignment tables and garbage collection card tables, by substitution, mappings, and/or otherwise as discussed herein.

Turning now to FIGS. 5 through 7, various steps will be introduced. Aspects of these steps are also discussed elsewhere herein.

During a base class source code obtaining step 502, an embodiment obtains source code 120 which includes a declaration of at least one base class 124. Step 402 may be accomplished using file systems, source code editors, and/or other familiar mechanisms, for example.

During an intermediate code generating step 504, an embodiment generates intermediate code 202. In some configurations or some embodiments only intermediate code instructions are generated, but in others step 504 generates metadata (e.g., MDIL metadata 410) as part of the intermediate code 202. Step 504 may be accomplished using parsing, tree traversal, table lookup, and/or other familiar mechanisms adapted for use in generating intermediate code 202 with pseudo instructions 212 as taught herein.

During an object field layout change resilience keeping step 506, an embodiment keeps object field layout(s) 208 unbound in intermediate code 202. For example, object field 128 offsets may be symbolic rather than hard-coded (termed "numeric" herein), with development relying on a binder 214 to determine and insert numeric field offsets when the intermediate code 202 is bound to a particular target engine 140.

During a virtual method slot assignment change resilience keeping step 508, an embodiment keeps virtual method slot assignment(s) 210 unbound in intermediate code 202. For example, virtual method 130 slot assignments may be unspecified, with development relying on a binder 214 to determine and utilize numeric virtual method slot assignments when the intermediate code 202 is bound to a particular target engine 140.

During a symbolic reference using step 510, an embodiment uses a symbolic reference 248 in intermediate code 202, by placing the symbolic reference and/or by transforming the symbolic reference into a numeric reference, for example.

During a symbolically identifying step 512, an embodiment symbolically identifies a field 128 in intermediate code 202, rather than identifying the filed as a numeric offset, for example. Step 512 is an example of step 510, in which the symbolic reference refers to a field.

During field order independence keeping step 514, an embodiment keeps field order unbound in intermediate code 202. An instance of step 514 may be an example of steps 512 and 506, for example, when object field 128 offsets are represented symbolically rather than being represented as numeric field offsets.

During a pseudo instruction expressing step 516, one or more items such as fields, types, virtual methods, calls, or pointer status with regard to garbage collection, for example, are expressed using one or more pseudo instructions 212. FIG. 2 enumerates particular kinds of pseudo instructions, and other examples are also discussed herein. Expressing step 516 may occur during intermediate language code generating step 504. Steps 518 through 534 discussed below are some examples of expressing step 516, focused on particular kinds of pseudo instructions 212.

During a field access expressing step 516, an embodiment expresses field 128 access 520 (read and/or write) using one or more pseudo instructions 212, such as managed object field access pseudo instructions 212, 232, for example.

During a method call expressing step 522, an embodiment expresses a non-virtual method call 524 using one or more pseudo instructions 212, such as static-call method pseudo instructions 212, 224, tail-call method pseudo instructions 212, 226, execution-engine-service-call pseudo instructions 212, 228, or runtime-type-direct-call method pseudo instructions 212, 230, for example.

During a virtual call expressing step 526, an embodiment expresses a virtual call 528 using one or more pseudo instructions 212, such as a virtual-call method pseudo instruction 212, 222, for example.

During a method prolog expressing step 526, an embodiment expresses a method prolog 532 using one or more pseudo instructions 212.

During a method epilog expressing step 534, an embodiment expresses a method epilog 536 using one or more pseudo instructions 212.

During a binding step 538, an embodiment binds pseudo instructions 212 to native instructions 134, selects native instructions 134 on the basis of pseudo instruction(s) 212, produces native code data structure(s) 412 based on pseudo instruction(s) 212, and/or otherwise processes pseudo instructions 212 as taught herein while producing native instructions 134. A rebinding step is also referred to as step 538; during rebinding a binder 214 may bind again some intermediate code that the binder (or another binder) has previously bound 538.

During an executable code producing step 540 (which may also be referred to as a code preparing step 540), an embodiment produces, prepares, updates, generates, and/or otherwise provides native instructions 134 for use in executable code 136, based at least in part on underlying pseudo instruction(s) 212. Step 540 may be performed by a binder 214, for example.

During a revising step 542, an embodiment revises source code 120, either automatically or under direct and detailed control of a human user 104.

During a code executing step 544, an embodiment executes native instructions 134, such as native instructions in an executable code 136 produced in part with the efforts of a binder 214, for example.

During a length transforming step 602, an embodiment transforms a pseudo instruction 212 or collection of pseudo instructions 212 into native instruction(s) 134 whose representation occupies a different number of bytes that the representation of the pseudo instruction(s) 212. As with other discussions herein of "transforming" and similar terms, the underlying pseudo instruction(s) 212 may survive the transformation, and/or the pseudo instructions 212 may not survive but rather be replaced in place.

During local variable size determining and specifying steps, which correspond and are referred to herein for convenience separately and jointly as step 604, an embodiment determines a native code size of a local variable whose size is not specified in underlying pseudo instruction(s) 212. Step 604 may be performed as part of binding step 538, for example.

During stack frame offset determining and specifying steps, which correspond and are referred to herein for convenience separately and jointly as step 606, an embodiment determines a native code stack frame offset which is not specified in underlying pseudo instruction(s) 212. Step 606 may be performed as part of binding step 538, for example.

During stack frame alignment determining and specifying steps, which correspond and are referred to herein for convenience separately and jointly as step 608, an embodiment determines a native code stack frame alignment which is not specified in underlying pseudo instruction(s) 212. Step 608 may be performed as part of binding step 538, for example. It will be appreciated that step 608 does not align the stack frame itself. Rather, individual variables in the stack frame have alignment requirements which are determined during step 608. The binder also assigns stack frame offsets consistent with these alignment requirements.

During a type symbolic reference transforming step 610 (which may also be referred to as type resolution), an embodiment transforms a symbolic reference 248 to a type, located in pseudo instruction(s) 212, into use of a specific type located in native instruction(s) 134. Unlike a symbolic type reference, a specific type has a numeric size, for example, and if the type has fields/members then the specific type also has a specific filed/member order. Step 610 may be performed as part of binding step 538, for example.

During a field symbolic reference transforming step 612 (which may also be referred to as field resolution), an embodiment transforms a symbolic reference 248 to a field, located in pseudo instruction(s) 212, into use of a specific field located in native instruction(s) 134. Unlike a symbolic field reference, a specific field has a numeric size and offset, for example. Step 612 may be performed as part of binding step 538, for example.

During a member symbolic reference transforming step 614 (which may also be referred to as member resolution), an embodiment transforms a symbolic reference 248 to a member, located in pseudo instruction(s) 212, into use of a specific member located in native instruction(s) 134. Unlike a symbolic member reference, a specific member has a numeric size and offset, for example. Step 614 may be performed as part of binding step 538, for example.

During a slot symbolic reference transforming step 616 (which may also be referred to as slot resolution or slot assignment), an embodiment transforms a symbolic reference 248 to a virtual method slot, located in pseudo instruction(s) 212, into use of a specific slot located in native instruction(s) 134. Unlike a symbolic slot reference, a specific slot has a numeric value in a runtime data structure such as a virtual method table, for example. Step 616 may be performed as part of binding step 538, for example.

During a correspondence implementing step 618, an embodiment implements a structural correspondence 620 between pseudo instruction(s) 212 and native instruction(s) 134. Step 618 may be accomplished, for example, by performing one or more of the following steps: (re)binding 538, transforming 602, 610, 612, 614, 616.

During a copy pseudo instruction using step 622, an embodiment uses pseudo instruction(s) 212 which would indicate to a binder 214 that certain native instruction(s) 134 are desired, namely, native instruction(s) 134 which when executed will copy a structure 624. The size of the structure 624 is not specified in the pseudo instruction(s) 212, but is/will be specified in the native instruction(s) 134. Pseudo instruction(s) 212 may be used 622 by placing them in intermediate language code 202 and/or by transforming the pseudo instruction(s) 212 into native instruction(s) 134, for example.

During a zero pseudo instruction using step 626, an embodiment uses pseudo instruction(s) 212 which would indicate to a binder 214 that certain native instruction(s) 134 are desired, namely, native instruction(s) 134 which when executed will zero a structure 624. The size of the structure 624 is not specified in the pseudo instruction(s) 212, but is/will be specified in the native instruction(s) 134. Pseudo instruction(s) 212 may be used 626 by placing them in intermediate language code 202 and/or by transforming the pseudo instruction(s) 212 into native instruction(s) 134, for example.

During a local variable declaration pseudo instruction using step 628, an embodiment uses pseudo instruction(s) 212 which would indicate to a binder 214 that certain native instruction(s) 134 are desired, namely, native instruction(s) 134 which when executed will declare a local variable 630 having a particular type. The type may be specified by using 510 a symbolic type reference. In some embodiments, aspects of the local variable 630 and its type are not specified in the pseudo instruction(s) 212, but are/will be specified in the native instruction(s) 134. Such aspects may include, for instance, the size, alignment requirements, and stack frame offset of the local variable and/or the local variable's type. Pseudo instruction(s) 212 may be used 628 by placing them in intermediate language code 202 and/or by transforming the pseudo instruction(s) 212 into native instruction(s) 134, for example.

During a virtual method slot mapping step 632, an embodiment maps one or more virtual method slots to one or more method bodies, as part of implementing 618 a correspondence 630, for example. Step 632 may be part of (re)binding step 538.

During a memory configuring step 636, a memory medium 112 is configured by intermediate language code 202 or a portion thereof containing pseudo instruction(s) 212, by a generator 204 for generating such code 202, by a binder 214 for binding such code 202, and/or otherwise in connection with change resilient code as discussed herein.

During a garbage collector probe pseudo instruction using step 702, an embodiment uses a garbage collector probe pseudo instruction 216 by placing the instruction 216 in intermediate code 202 and/or by transforming the pseudo instruction 216 into machine instruction(s) 134 (and possibly associated data/metadata) which upon execution will check for a pending garbage collection, for example.

During an object allocation pseudo instruction using step 704, an embodiment uses an object allocation pseudo instruction 218 by placing the instruction 218 in intermediate code 202 and/or by transforming the pseudo instruction 218 into machine instruction(s) 134 (and possibly associated data/metadata) which upon execution will allocate memory space for an object 126, for example.

During an exception throw pseudo instruction using step 706, an embodiment uses an exception throw pseudo instruction 220 by placing the instruction 220 in intermediate code 202 and/or by transforming the pseudo instruction 220 into machine instruction(s) 134 (and possibly associated data/metadata) which upon execution will throw an exception, for example.

During a virtual-call method pseudo instruction using step 708, an embodiment uses a virtual-call method pseudo instruction 222 by placing the instruction 222 in intermediate code 202 and/or by transforming the pseudo instruction 222 into machine instruction(s) 134 (and possibly associated data/metadata) which upon execution will make a virtual call to a method identified by the instruction 222, for example.

During a static-call method pseudo instruction using step 710, an embodiment uses a static-call method pseudo instruction 224 by placing the instruction 224 in intermediate code 202 and/or by transforming the pseudo instruction 224 into machine instruction(s) 134 (and possibly associated data/metadata) which upon execution will make a static call to a method identified by the instruction 224, for example.

During a tail-call method pseudo instruction using step 712, an embodiment uses a tail-call method pseudo instruction 226 by placing the instruction 226 in intermediate code 202 and/or by transforming the pseudo instruction 226 into machine instruction(s) 134 (and possibly associated data/metadata) which upon execution will make a tail call to a method identified by the instruction 226, for example.

During an execution-engine-service-call pseudo instruction using step 714, an embodiment uses an execution-engine-service-call pseudo instruction 228 by placing the instruction 228 in intermediate code 202 and/or by transforming the pseudo instruction 228 into machine instruction(s) 134 (and possibly associated data/metadata) which upon execution will make a call to a an execution engine 140 service that is identified by the instruction 228, for example.

During a runtime-type-direct-call method pseudo instruction using step 716, an embodiment uses a runtime-type-direct-call method pseudo instruction 230 by placing the instruction 230 in intermediate code 202 and/or by transforming the pseudo instruction 230 into machine instruction(s) 134 (and possibly associated data/metadata) which upon execution will make a call to a method using a type identified symbolically by the instruction 230, for example.

During a managed object field access pseudo instruction using step 718, an embodiment uses a managed object field access pseudo instruction 232 by placing the instruction 232 in intermediate code 202 and/or by transforming the pseudo instruction 232 into machine instruction(s) 134 (and possibly associated data/metadata) which upon execution will access a field 128 of an object 126 identified by the instruction 232, for example.

During a heap pointer designation pseudo instruction using step 720, an embodiment uses a heap pointer designation pseudo instruction 234 by placing the instruction 234 in intermediate code 202 and/or by transforming the pseudo instruction 234 into machine instruction(s) 134 (and possibly associated data/metadata) which upon execution will manage garbage collection for a heap using a pointer identified by the instruction 234, for example.

During an instantiation-lookup pseudo instruction using step 722, an embodiment uses an instantiation-lookup pseudo instruction 236 by placing the instruction 236 in intermediate code 202 and/or by transforming the pseudo instruction 236 into machine instruction(s) 134 (and possibly associated data/metadata) which upon execution will use a generic code instantiation identified by the instruction 236, for example.

During an interruptible-region pseudo instruction using step 724, an embodiment uses an interruptible-region pseudo instruction 238 by placing the instruction 238 in intermediate code 202 and/or by transforming the pseudo instruction 238 into machine instruction(s) 134 (and possibly associated data/metadata) which upon execution will manage garbage collection for a tight loiop and/or other region of code that is delimited or otherwise identified at least in part by the instruction 238, for example.

During a garbage-collection-pointer pseudo instruction using step 726, an embodiment uses a garbage-collection-pointer pseudo instruction 240 by placing the instruction 240 in intermediate code 202 and/or by transforming the pseudo instruction 240 into machine instruction(s) 134 (and possibly associated data/metadata) which upon execution will manage garbage collection using a pointer identified by the instruction 240, for example.

During a garbage-collection-write-barrier pseudo instruction using step 728, an embodiment uses a garbage-collection-write-barrier pseudo instruction 242 by placing the instruction 242 in intermediate code 202 and/or by transforming the pseudo instruction 242 into machine instruction(s) 134 (and possibly associated data/metadata) which upon execution will manage a garbage collection write barrier, for example.

During an address mode modifier pseudo instruction using step 730, an embodiment uses an address mode modifier pseudo instruction 244 by placing the instruction 244 in intermediate code 202 and/or by transforming the pseudo instruction 244 into machine instruction(s) 134 (and possibly associated data/metadata) which upon execution will be controlled by an address mode modification, for example. Address mode modifiers in pseudo instructions 244 modify a native address mode that is part of the native instruction 134 resulting from the translation of the pseudo instruction 244 containing the address mode modifier.

During a static base pseudo instruction using step 732, an embodiment uses a static base pseudo instruction 246 by placing the instruction 246 in intermediate code 202 and/or by transforming the pseudo instruction 246 into machine instruction(s) 134 (and possibly associated data/metadata) which upon execution will provide a base address of a static variable storage area, for example. In some embodiments, the machine instructions generated may also check whether a class has already been initialized, and trigger initialization if that has not already been done.

During a different machine using step 734, an embodiment may use a different computer or other device to bind 538 code 202 than is used to generate 504 that code 202, or the embodiment may use a different computer or other device to generate 504 code 202 than a then-identified machine that will be used to bind 538 that code 202. In other words, step 734 may occur upon binding, or upon generating, provided that the machines which have or will be used for binding and for generating can be identified at the time step 734 occurs, and further provided that those machines not be one and the same machine. Step 734 does not occur upon generating code if the machine that will be used to bind the code is unknown at the time the code is generated. For purposes of step 734, two machines constitute different machines if they have separately controllable power sources, that is, if it is possible for a human user to turn off one of the machines without also thereby turning off the other machine, and/or possible for a human user to turn on one of the machines without also thereby turning on the other machine.

The foregoing steps and their interrelationships are discussed in greater detail below, in connection with various embodiments.

Some embodiments provide a process facilitating management of changes involving base classes 124 of a software product. The process includes obtaining 502 in a memory a base class source code 120, and generating 504 in the memory from the base class source code an intermediate language code 202 in which register allocation 206 is execution-ready but at least one of the following is as yet unbound: object field layout 208, virtual method slot assignment 210.

For example, in one embodiment the generating step generates 504 intermediate language code 202 in which object field layout 208 is as yet unbound, and does so at least in part by generating intermediate language code which uses 510 a symbolic reference 248 rather than a direct offset to identify a field 128. As another example, in one embodiment the generating step generates 504 intermediate language code 202 in which object field layout 208 is as yet unbound, and does so at least in part by generating intermediate language code which is field order independent.

In some embodiments, the generating step generates 504 intermediate language code 202 which includes both native instructions 134 and pseudo instructions 212. In particular, an embodiment may generate 504 code 202 in which at least one of the following is expressed 516 using pseudo instruction(s): a field access, a method call, a virtual method call, an entire method prolog, at least a portion of a method prolog, an entire method epilog, at least a portion of a method epilog.

In some embodiments, the process is focused on generating 504 code 202 and does not necessarily include binding 538. In other embodiments, the process does include binding 538 the intermediate language code 202 and thereby producing 540 executable code 136, namely, code which is executable by a processor 110 on at least one device.

Binding 538 may occur in different contexts. For example, in some embodiments the process includes firstly binding 538 the intermediate language code 202 and thereby producing 540 a first executable code 136 for use with a first version of an execution engine 140, and then secondly binding the same intermediate language code 202 and thereby producing 540 a second executable code 136 for use with a second version of the execution engine 140. In other words, in some cases the same intermediate code can be used to produce different executables for different versions of an engine 140, thereby illustrating resilience of the intermediate code 202 with respect to execution engine changes.

Some embodiments provide a process of managing changes involving a base class 124 of a software product. The process includes obtaining 502 an initial source code A for a module A, including an initial base class A declared in the initial source code A, and obtaining 502 a source code B for a module B which includes a dependency on initial base class A. The process also includes generating 504 an initial intermediate language code A by compiling the initial source code A, and generating 504 an initial intermediate language code B by compiling the source code B. These initial intermediate language codes are used to create executable codes. That is, the process includes preparing 540 an initial executable code A by binding 538 the initial intermediate language code A, and preparing 540 an initial executable code B by binding 538 the initial intermediate language code B.

The foregoing steps may be viewed as preparatory, or contextual. In the context of their performance, an embodiment obtains 502 a revised 542 source code A for a revised base class A in module A which differs from initial base class A in at least one of the following ways: a field has been added, a private field has been removed, field order has been rearranged, a virtual method has been added, virtual method order has been rearranged. The process embodiment at hand generates 504 a revised intermediate language code A by compiling the revised source code A.

Next, the embodiment prepares 540 a revised executable code A by binding 538 the revised intermediate language code A, and prepares 540 a revised executable code B by rebinding 538 the initial intermediate language code B while referencing the revised intermediate language code A. In this manner, the process avoids recompilation of source code B. One may then execute 544 revised executable code A with revised executable code B, in a manner that is free from any field offset collision and free from any virtual method slot assignment collision during execution of revised base class A. That is, the process illustrates resilience of the intermediate language code 202 in the face of changes to a base class 124.

As a further illustration of resilience, consider scenarios that involve at least two modules, for example a module "A" containing a base class "Base", and a module "B" that either contains a class "Derived" derived from "Base", or perhaps just contains code that uses fields or methods from "Base". The initial versions of both modules are compiled to the intermediate language, and then bound to obtain executable modules for A and B. Then module A is changed in one of the ways noted above (field added, private field removed, field order rearranged, virtual method added, virtual method order rearranged), and only module A is recompiled. Then both modules are rebound 538 to obtain new executables.

In such scenarios, correctness can be facilitated by ensuring that the layout of type "Base" is consistent in the executables for both module A and B. For instance, if a field in "Base" is accessed in both module A and B, then both modules use the same offset; the risk of incorrect program behavior is heightened if the offsets are different. Similarly, if a virtual method is accessed in both modules, ensuring that they use the same virtual slot number reduces the risk of incorrect program behavior caused by the change in module A. If a derived type in module B adds more fields, ensuring that their offsets do not collide with any field offsets in A reduces the risk of incorrect program behavior; havoc may occur if the same offset is used for different fields. Similarly, if a derived type in module B adds more virtual methods, ensuring that their virtual slots do not collide with any virtual slots used by A reduces risk; havoc may occur if the same slot number is used for different methods. Some embodiments help reduce risk by ensuring that symbolic labels for types, methods and fields stay the same across versions, even if new methods and fields are added or existing methods and fields rearranged. These symbolic labels are sometimes referred to herein as "tokens" or as symbolic references 248.

In some embodiments, binding 538 intermediate language code 202 involves transforming an intermediate language pseudo instruction 212 that accesses memory 112 into a corresponding native language instruction 134 having a different length in bytes than the intermediate language pseudo instruction. As a result, a binder 214 may be more complicated than a familiar linker. The binder 214 may be configured to adjust jumps in the native code 134 so they still jump to their intended targets, whose positions depend on varied differences in length between particular pseudo instructions 212 and their respective native code 134. By contrast, a familiar fixup may simply add a fixed amount to every jump.

In some embodiments, a size of a local variable is unspecified in the initial intermediate language code B discussed above, and rebinding 538 the initial intermediate language code B involves determining 604 that size and specifying that size in revised executable code B. In some embodiments, a stack frame offset of a local variable is unspecified in the initial intermediate language code B, and rebinding 538 the initial intermediate language code B involves determining 606 that stack frame offset and specifying that stack frame offset in revised executable code B. In some embodiments, a stack frame offset alignment requirement of a local variable is unspecified in the initial intermediate language code B, and rebinding 538 the initial intermediate language code B involves determining 608 that stack frame offset alignment requirement, and determining a stack frame offset of the local variable consistent with the stack frame offset alignment requirement.

For example, with regard to alignment requirements of local variables, the stack frame offset of a local variable may need to be divisible by a certain power of 2 (typically 1, 2, 4, 8 or 16), depending on the variable's type. Such an alignment requirement may change during versioning. For instance, if a struct only contains 32-bit integers, its offset must be aligned to a multiple of 4, but if later on, an 8-byte double field is added, the variable offset may have to be a multiple of 8 instead, depending on processor architecture and operating system conventions. Some embodiments provide change resilience with regard to such alignment requirement changes, e.g., by using 510 symbolic references and/or other aspect(s) of pseudo instruction(s) 212.

In some embodiments, the initial intermediate language code B includes a symbolic reference 248 to a type defined in the revised base class A discussed above, and rebinding 538 the initial intermediate language code B involves transforming that symbolic reference into a reference in revised executable code B that utilizes an address of a data structure describing the type. In other words, the executable code 136 ultimately contains either the address of a data structure describing the type (a type descriptor), or it contains the address of an indirection cell containing the address of the type descriptor. The former way of referring to the type is generally used within a module, the latter way is used to refer to a type descriptor residing in another module. For purposes of step 510 a type descriptor address is "utilized" (that is, used) regardless of whether it's used directly or via an indirection cell.

In some embodiments, the initial intermediate language code B noted above includes a symbolic reference 248 to a field 128, and rebinding 538 the initial intermediate language code B involves transforming that symbolic reference into a numeric offset in revised executable code B. In some cases, a field is not of a primitive type (where the size is known), but of a composite type whose size may change in versioning. Some embodiments accordingly use 622, 626 pseudo instructions such as MDIL INIT_STRUCT, COPY_STRUCT, PUSH_STRUCT pseudo instructions 212 discussed elsewhere herein.

In some embodiments, the initial intermediate language code B noted above includes a symbolic reference 248 to a member defined in Module A, and rebinding 538 the initial intermediate language code B involves transforming that symbolic reference into at least one of the following in revised executable code B: a numeric offset, a direct pointer to a method body, an indirect pointer to a method body, a virtual slot number. For example, in MDIL memberref tokens can refer to either fields or methods. In the case of fields, they are transformed through binding 538 into numeric offsets. In the case of methods, through binding 538 they either become a (direct or indirect) pointer to the body of the method (this is for normal method call), or they become a virtual slot number inserted into an executable code sequence (in the case of a virtual call).

Some embodiments provide a process involving change-resilient intermediate language code 202 for a software product. The process includes obtaining 502 in a memory a source code (for a base class and/or other software item), and generating 504 in the memory from the source code an intermediate language code 202 in which register allocation 206 is execution-ready. The generated intermediate language code 202 contains at a specific location within the code 202 at least one of the pseudo instructions 212 enumerated by name in FIG. 2, that is, at least one of the pseudo instructions 216 through 242.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as pseudo instructions 212 and/or binders 214, in the form of data 118 and instructions 116, read from a removable medium 114 and/or another source such as a network connection, to form a configured medium. The configured medium 112 is capable of causing a computer system to perform process steps for generating and/or transforming resilient intermediate language code 202 as disclosed herein. FIGS. 1 through 7 thus help illustrate configured storage media embodiments and process embodiments, as well as system and process embodiments. In particular, any of the process steps illustrated in FIGS. 3 through 7, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details, including statements of requirements and of results, for instance, are implementation-specific and thus need not pertain to every embodiment.

In particular, use of the term "pseudo instruction" in examples discussing MDIL may be broader or otherwise inconsistent with use of that term above, e.g., by referring to MDIL instructions as pseudo instructions even though they may lack some characteristic of the pseudo instructions 212 discussed above. Likewise, the binder 214 discussed above does not necessarily have every feature or capability of the MDIL binder discussed below.

Nonetheless, although they are not necessarily required to be present here, these details about MDIL are provided because they may help some readers by providing context. MDIL also illustrates some of the many possible implementations of the technology discussed above in connection with intermediate language code 202, pseudo instructions 212, and binders 214.

MDIL Instruction Set: Explaining Instruction Formats and Conventions in MDIL code This section discusses the binary encoding and the semantics of MDIL instructions.

Introduction

What is MDIL? MDIL is a lower level of intermediate language than MSIL. It gives up on the goal of machine independence—in fact the acronym MDIL stands for Machine Dependent Intermediate Language. MDIL doesn't compete with MSIL—rather, going through MDIL is another step in the compilation pipeline going from source code in languages like C#, Visual Basic®, Managed C++ via MSIL to native code (mark of Microsoft Corporation). MDIL doesn't try to abstract properties of the target processor, but it still provides a layer of insulation against versioning of both managed code and the execution engine MDIL code is compiled for.

MDIL is not directly executable. Instead, a binder reads the MDIL code and produces executable machine code from it. MDIL code is thus reminiscent of object files resulting from the compilation of unmanaged code which are run through a linker to produce final executable machine code. However, pseudo instructions in MDIL may go further than fixups in traditional object files—rather than just fixing up parts of instructions (like an address field), MDIL pseudo instructions may generate new native instructions which possibly differ in length from the pseudo instruction. Thus the MDIL binder is more complicated than a linker because the binder has to adjust the jumps in the resulting native code so they still jump to their intended targets. With this added complexity also comes added power—MDIL code can be robust against base types adding new fields or virtual methods, so it can be considered a solution to the "brittle base class problem".

MDIL Code Example

Here is a simple introductory code example in C#:

```
static void Main( )
{
    Test t = new Test(42, 137);
    Console.WriteLine("t.a + t.b = {0}", t.a + t.b);
}
```

And here's what this example might compile to in MDIL, with some comments added:

```
; Disassembly of method Test.Main (06000002)
0000 b2                    EBP_FRAME
0001 b4 06                 PUSH_REGS        esi, edi
0003 b9                    END_PROLOG
;
; Test t = new Test(42, 137);
;
0004 6d 00 03              ALLOC_OBJECT     02000003 ; Test
0007 0e 8b f0 68 89 00 00 00 8b ce ba 2a 00 00 00
                           mov              esi,eax
                           push             00000089
                           mov              ecx,esi
                           mov              edx,0000002a
0016 4d 0b 00              CALL_DEF         0600000b ;
Test..ctor(int,int)
0019 75                    REF_BIRTH_ESI
```

-continued

```
;
; Console.WriteLine("t.a + t.b = {0}", t.a + t.b);
;
001a 6d c0 08           ALLOC_OBJECT    01000008 ;
System.Int32
001d 02 8b f8           mov             edi,eax
0020 9e 01 00 13        LOAD_STRING     ecx, 70000013
0024 13 06 00 11        LOAD            eax,
[esi].04000011
0028 1a 06 00 12        ADD             eax,
[esi].04000012
002c 14 07 ff 08 00 00 01   STORE       [edi].01000008,eax
; System.Int32
0033 02 8b d7           mov             edx,edi
0036 4e 08 00           CALL_REF        0a000008 ;
Console.WriteLine
0039 7d                 REF_DEATH_ESI
;
003a bb                 EPILOG_RET
```

This example demonstrates how MDIL can be close to the actual machine and yet still provide a level of abstraction as protection against changes in the execution engine, the layout of managed objects, or the layout of supporting data structures.

For example, a method's prolog is expressed mostly via pseudo instructions. This helps obey execution engine restrictions and communicates information about the layout of the stack frame.

Also, MDIL code can quote native machine instructions.

Also, allocating objects is expressed via pseudo instructions (ALLOC_OBJECT in this case). This provides flexibility, because the rules and restrictions that apply to the most efficient way of allocation may change in the future.

Also, garbage collector (GC) information is expressed via explicit pseudo instructions embedded in the code stream (REF_BIRTH_ESI and REF_DEATH_ESI in this example).

Also, accessing fields in managed objects is done via pseudo instructions (LOAD, ADD, STORE in this example). This provides flexibility because field offsets may change due to versioning of managed assemblies and of the execution engine itself. MDIL has a rich supply of constructs for putting together MDIL addressing modes.

Also, calling methods is also done via pseudo instructions (CALL_DEF and CALL_REF in the example). This allows the MDIL code to express the intention (make a call) without getting bogged down in details that might depend on the execution engine's conventions and are therefore subject to change.

Also, the method's epilog is expressed as a single pseudo instruction. This is because the prolog contains enough information about the stack frame that the epilog can be constructed from it. This way one can avoid embedding details like the order of pushing or popping callee-saved registers. On the other hand, the register allocation is done substantially or entirely by the compiler producing the MDIL code.

Bearing in mind that the foregoing is only one example of how optimized managed code can be expressed in this MDIL format, the remainder of this section's discussion of MDIL looks more closely at these concepts, which pseudo instructions are used to support them, and how the pseudo instructions are encoded at the binary level.

MDIL File Format

In one prototype system, the result of a compilation to MDIL code is stored in a separate file, with a .mdil extension by convention. Some embodiments may put the MDIL code into one package together with metadata and MSIL code; file format information provided herein may differ in different embodiments.

MDIL File Header

In this particular implementation, the file header is a simple C++ structure having some versioning information and the sizes of the various sections that follow, in either number of elements or bytes:

```
struct MDILHeader
{
    DWORD      hdrSize;           // size of header in bytes
    DWORD      magic;             // 'MDIL'
    DWORD      version;           // currently 0x00020006
    DWORD      typeMapCount;      // number of entries in type
map section
    DWORD      methodMapCount;    // number of entries in method
map secion
    DWORD      genericInstSize;   // size of generic inst
section
    DWORD      extModuleCount;    // number of entries in
external module sect.
    DWORD      extTypeCount;      // number of entries in
external type section
    DWORD      extMemberCount;    // number of entries in
external member sect.
    DWORD      typeSpecCount;     // number of entries in
typespec section
    DWORD      methodSpecCount;   // number of entries in
methodspec section
    DWORD      namePoolSize;      // size of name pool in bytes
    DWORD      typeSize;          // size of compact type layout
section
    DWORD      userStringPoolSize;   // size of user string pool
    DWORD      codeSize;          // size of MDIL code
    DWORD      debugMapCount;     // number of entries in debug
info map
    DWORD      debugInfoSize;     // size of debug info
    DWORD      timeDateStamp;
    DWORD      subsystem;
    LPCVOID    baseAddress;
    DWORD      entryPointToken;   // method def token for the
entry point or 0
    enum Flags
    {
        EntryPointReturnsVoid          = 0x01,
        WellKnownTypesPresent          = 0x02,
        TargetArch_Mask                = 0x0c,
        TargetArch_X86                 = 0x00,
        TargetArch_AMD64               = 0x04,
        TargetArch_IA64                = 0x08,
        // room for future TargetArch_...
        DebuggableILAssembly           = 0x10, // Assembly created
with /debug
        DebuggableMDILCode             = 0x20, // MDIL file created
with /debug
        IsHDRfile                      = 0x40,
    };
    DWORD flags;
    enum PlatformID
    {
        PlatformID_Unknown    = 0,
        PlatformID_Triton     = 1,
    };
    DWORD platformID;
    DWORD platformDataSize;
};
```

MDIL File Sections

After the MDIL file follow several sections in the order given below.

Well Known Types Table. If the WellKnownTypesPresent bit in the flags field of the header is on, a table of typedef tokens follows that define certain basic system types. This table is intended to be only present for the base system library, e.g., mscorlib.dll in the context of the Microsoft® Common Language Runtime (CLR), but one prototype compiler always puts it in. This table is a simple array of dwords, with the slots defined by the following C++ enumeration type:

```
enum WellKnownType
{
  WKT_FIRST,
  WKT_OBJECT = WKT_FIRST,               // System.Object
  WKT_STRING,                           // System.String
  WKT_VALUETYPE,                        // System.ValueType
  WKT_ENUM,                             // System.Enum
  WKT_ARRAY,                            // System.Enum
  WKT_FIRST_PRIMITIVE,
  WKT_BOOLEAN = WKT_FIRST_PRIMITIVE,    // System.Boolean
  WKT_VOID,                             // System.Void
  WKT_CHAR,                             // System.Char
  WKT_I1,                               // System.SByte
  WKT_U1,                               // System.Byte
  WKT_I2,                               // System.Int16
  WKT_U2,                               // System.UInt16
  WKT_I4,                               // System.Int32
  WKT_U4,                               // System.UInt32
  WKT_I8,                               // System.Int64
  WKT_U8,                               // System.UInt64
  WKT_R4,                               // System.Single
  WKT_R8,                               // System.Double
  WKT_I,                                // System.IntPtr
  WKT_U,                                // System.UIntPtr
  WKT_LAST_PRIMITIVE = WKT_U,
  WKT_MARSHALBYREFOBJECT,               //
System. MarshalByRefObject
  WKT_MULTICASTDELEGATE,                //
System. MultiCastDelegate
  WKT_NULLABLE,                         // System.Nullable
  WKT_CANON,                            // System._Canon
  WKT_TRANSPARENTPROXY,                 // System.Runtime.Remoting.
                                        //
                                        Proxies._TransparentProxy
  WKT_COMOBJECT,                        // System._ComObject
  WKT_CONTEXTBOUNDOBJECT,               //
System. ContextBoundObject
  WKT_COUNT,                            // 27 or 1Bh slots at
present
};
```

Type Map Section. This is a simple array of dword entries mapping typedef tokens to offsets in the Compact Type Layout Section. Entry 0 is unused, but should be present.

Method Map Section. This is a simple array of dword entries mapping methoddef tokens to offsets in the MDIL Code Section. At this offset, the MDIL method header starts—see below. The dword may have the high bit set which signifies the offset is an offset into the Generic Instance Section instead.

Generic Instance Section. Generic methods or methods in generic types may have multiple MDIL code bodies, each applicable to different kinds of type arguments. How many different bodies there are, and which body applies to what kinds of type arguments is described by a generic instance descriptor. Each descriptor starts with a header:

```
struct MDILInstHeader
{
  WORD   m_instCount;   // number of method
bodies
  BYTE   m_flags;       // flags - no flags
yet
  BYTE   m_arity;       // number of type
args
};
```

The field m_instCount describes how many different bodies exist for this particular method. The field m_arity described the total number of type arguments, i.e., the sum of both class-level type arguments and method-level type arguments. After the header follows a rectangular matrix of type argument masks. It has m_instCount rows (one for each body) and m_arity columns (one for each type argument). Each type argument mask is a simple bit mask, with each bit signifying applicability of the body to a particular kind of type. The numbering of the bits follows the CorElementType enumeration, with a few additions:

ELEMENT_TYPE_BOOLEAN=0x02,
ELEMENT_TYPE_CHAR=0x03,
ELEMENT_TYPE_CHAR=0x03,
ELEMENT_TYPE_I1=0x04,
ELEMENT_TYPE_U1=0x05,
ELEMENT_TYPE_I2=0x06,
ELEMENT_TYPE_U2=0x07,
ELEMENT_TYPE_I4=0x08,
ELEMENT_TYPE_U4=0x09,
ELEMENT_TYPE_I8=0x0a,
ELEMENT_TYPE_U8=0x0b,
ELEMENT_TYPE_R4=0x0c,
ELEMENT_TYPE_R8=0x0d,
ELEMENT_TYPE_VALUETYPE=0x11,
ELEMENT_TYPE_CLASS=0x12,
NULLABLE=0x17,
SHARED_VALUETYPE=0x1e
SHARED_NULLABLE=0x1f,

So if a particular method has two type arguments, and a particular body is applicable if the first argument is float or double, and the second argument is int, the first column in the row for this body would have the value 3000h ((1<<0x0c)|(1<<0x0d) in C++ notation), and the second column would have the value 100h ((1<<0x08) in C++ notation). If the binder is looking for body taking a float and an int as parameters, then this row would match.

After this rectangular matrix of type masks follows a single-dimensional array of m_instCount DWORD pairs. The first DWORD in each pair is the MDIL code offset (i.e. offset into the MDIL code pool), while the second DWORD in each pair is the debug info offset (i.e., offset into the debug info pool).

Thus, if this embodiment of the binder needs an MDIL code body applicable to a particular set of type arguments, it will first look for a matching row in the matrix of type argument masks. It will then use this row index to index into the array of MDIL code offsets to find the right body. The rows will be searched sequentially from the top. This implies that the compiler should put more optimized and specialized versions before more general and hence less optimized versions.

External Module Section. This is a simple array of dword entries, each containing an offset into the Namepool Section—these are the names of other modules referenced.

External Type Section. This is an array of entries described by the following C++ structure:

```
struct ExtTypeRef
{
  ULONG module    : 14;   // 16383 max modules to
import from
  ULONG ordinal   : 18;   // 262143 max types
within a module
};
```

The module is simply the index into the External Module Section, and the ordinal is the number of the typedef in the other module.

External Member Section. This is an array of entries described by the following C++ structure:

```
struct ExtMemberRef
{
    ULONG      extTypeRid : 15;    // 32767 max types to import
    ULONG      isTypeSpec : 1;     // refers to typespec?
    ULONG      isField : 1;        // is this a field or a method?
    ULONG      ordinal : 15;       // 32767 max fields or methods in a type
};
```

The extTypeRid field is either an index into the External Type Section, or into the Typespec Section, as indicated by the isTypeSpec field. The ordinal field is the index of the field or method within the type, while isField indicates whether we're referring to a field or a method.

Typespec Section. This is a simple array of dword entries containing offsets referring to the Compact Type Layout Section.

Methodspec Section. This is a simple array of dword entries containing offsets referring to the Compact Type Layout Section.

Namepool Section. This is a simple array of bytes containing the names of external modules and P/Invoke entry points.

Compact Type Layout Section. This section contains three kinds of data. Compact Type Layouts describe reference or value types, their base types, interfaces implemented, fields, methods, etc. Type Spec Descriptions describe constructed types like array types, generic instantiations, etc. Method Spec Descriptions describe method instantiations.

User String Pool Section. This is a section containing user strings.

MDIL Code Section. This is the section containing the actual MDIL code. The starting offset of the MDIL code for a given methoddef token is found by indexing into the method map section. For methods in generic types, or for generic methods, that offset will have the high bit set, which means the offset is an offset into the Generic Instance Section which describes the different flavors of generic code compiled for the methods, and what kinds of type arguments they're applicable for. Otherwise, the offset points into the MDIL Code Section, and the first couple bytes are the MDIL Method Header.

Debug Map Section. This is a simple array of dword entries mapping methoddef tokens to offsets in the Debug Info Section. At this offset, the debug info starts—see below.

Debug Info Section. This is the section containing method debug info, see Debug Info below.

A Platform Specific Data section may also be present, with data specific to a particular platform or a particular kind of platform.

MDIL Method Header

This header is a data structure of one or more bytes describing the size of the MDIL method body that follows, and the number of exception clauses in the optional exception clause table that follows the body.

The encoding scheme is optimized for small methods with no exception clauses. Here's how it works:

If the first byte is in the range 00h . . . 0DFh, this means the size of routine is the first byte, there are no exception table entries.

If the first byte is in the range 0E0h . . . 0FFh, then
    bits 0 . . . 2 encode the size of the routine:
        0 . . . 5: size=next byte+(bits 0 . . . 2)256
        6: size=next word
        7: size=next dword
    bits 3 . . . 4 encode the number of exception entries:
        0 . . . 2: (bits 3 . . . 4) exception entries
        3: next byte is number of exception entries
            if nextByte is 0xff, next dword is number of exc entries Debug Info Each method is optionally associated with a debug info data structure. This data structure is consumed by debuggers, such as Microsoft® Visual Studio® debuggers, mdbg, and windbg (marks of Microsoft Corporation). This data structure contains two types of information. Offset mapping information maps intermediate language (IL) instruction offsets to MDIL instruction offsets. The binder translates these into IL instruction offset to native instruction offset mappings, and stores them in the native images. Together with PDB files (which contain IL instruction offsets to source lines mapping), this mapping allows source code level debugging. Variable information stores the locations of method parameters and local variables. This allows debuggers to show the values of these variables.

Logically, the debug info data structure is a collection of structures, as follows. The collection includes a source type structure:

```
enum SourceTypes
{
    SOURCE_TYPE_INVALID         = 0x00,   // Nothing else applies
    SEQUENCE_POINT              = 0x01,   // The debugger asked for it.
    STACK_EMPTY                 = 0x02,   // The stack is empty here
    CALL_SITE                   = 0x04,   // This is a call site.
    NATIVE_END_OFFSET_UNKNOWN   = 0x08    // Indicates a epilog endpoint
};
```

The collection also includes a registers structure:

```
enum RegNum
{
    REGNUM_EAX,
    REGNUM_ECX,
    REGNUM_EDX,
    REGNUM_EBX,
    REGNUM_ESP,
    REGNUM_EBP,
    REGNUM_ESI,
    REGNUM_EDI,
```

```
        REGNUM_COUNT,
        REGNUM_AMBIENT_SP, // Original SP in the non-BP
based frame.
    };
```

The collection also includes variable location structures:

```
    enum VarLocType {
        VLT_REG,                // variable is in a register
        VLT_REG_BYREF,          // variable address is in register
        VLT_REG_FP,             // variable is in an fp register
        VLT_STK,                // variable is on the stack
        VLT_STK_BYREF,          // address of variable is on stack
        VLT_REG_REG,            // variable lives in two registers
        VLT_REG_STK,            // partly in a register and partly
on the stack
        VLT_STK_REG,            // reverse of VLT_REG_STK
        VLT_STK2,               // variable lives in two slots on
the stack
        VLT_FPSTK,              // variable lives on the floating-
point stack
        VLT_FIXED_VA,           // a fixed argument in a varargs
function
        VLT_COUNT,
        VLT_INVALID,
        VLT_MDIL_SYMBOLIC = 0x20,
    };
    struct VarLoc      {
        VarLocType              vlType;
        union          {
            // VLT_REG/VLT_REG_FP/VLT_REG_BYREF
            struct
            {
                RegNum          vlrReg;
            } vlReg;
            // VLT_STK -- Any 32 bit value on the stack
            // eg. [ESP+0x20], or [EBP-0x28]
            struct
            {
                RegNum          vlsBaseReg;
                signed          vlsOffset;
            } vlStk;
// VLT_REG_REG -- TYP_LONG with both DWords enregistred
            // eg. RBM_EAXEDX
            struct   {
                RegNum          vlrrReg1;
                RegNum          vlrrReg2;
            } vlRegReg;
            // VLT_REG_STK -- Partly enregistered TYP_LONG
            // eg { LowerDWord=EAX UpperDWord=[ESP+0x8] }
            struct          {
                RegNum          vlrsReg;
                struct       {
                    RegNum              vlrssBaseReg;
                    signed              vlrssOffset;
                } vlrsStk;
            } vlRegStk;
            // VLT_STK2 -- Any 64 bit value on the stack,
            // in 2 successsive DWords.
            // eg 2 DWords at [ESP+0x10]
            Struct          {
                RegNum          vls2BaseReg;
                signed          vls2Offset;
            } vlStk2;
        };
    };
```

The collection also includes additional structures:

```
    // This is used to report implicit/hidden arguments
    enum ILNUM
    {
        VARARGS_HND_ILNUM       = -1,   // Value for the
CORINFO_VARARGS_HANDLE
        RETBUF_ILNUM            = -2,   // Pointer to the return-
buffer
        TYPECTXT_ILNUM          = -3,
//CORINFO_GENERICS_CTXT_FROM_PARAMTYPEARG
        UNKNOWN_ILNUM           = -4,   // Unknown variable
        MAX_ILNUM               = -4    // Sentinal value
    };
    DWORD cbOffsetMapping                // Number of bytes in
                                          offset
mappings
    DWORD cbVariableInfo //Number of bytes in variable info
    DWORD iOffsetMapping //Number of entries in offset
mappings
    for (i = 0; i < iOffsetMapping; i++)
    {
        DWORD           mdilOffset;
        DWORD           ilOffset;
        SourceTypes     source;
    }
    DWORD iVariableInfo // Number of entries in variable
info
    for (i = 0; i < iVariableInfo; i++)
    {
        DWORD           startOffset;
        DWORD           endOffset;
        DWORD           varNumber;
        VarLoc          loc;
    }
```

For each variable stored on the stack, the debug info either contains the offset of the variable relative to a register (if VLT_MDIL_SYMBOLIC bit is not set), or the MDIL variable number (if VLT_MDIL_SYMBOLIC bit is set). In the latter case, the binder will be responsible for convert the variable number into the actual stack offset, and then clear the VLT_MDIL_SYMBOLIC bit. The varNumber in variable info is either an IL variable number, or one of the values in enum ILNUM.

Since all the values in the debug info data structure are relatively small integers, a nibble-based compression scheme is used to reduce the size of the data structure. This compression scheme converts each value into one or more nibbles (4-bit values), using the following algorithm:

```
    void WriteEncodedU32(DWORD dw)
    {
        int i = 0;
        while ((dw >> i) > 7)
        {
            i += 3;
        }
        while(i > 0)
        {
            WriteNibble((NIBBLE) ((dw >> i) & 0x7) | 0x8);
            i -= 3;
        }
        WriteNibble((NIBBLE) dw & 0x7);
    }
    void WriteEncodedI32(int x)
    {
        DWORD dw = (x < 0) ? (((-x) << 1) + 1) : (x << 1);
        WriteEncodedU32(dw);
    };
```

The nibbles are stored in the memory in the order they are generated. Inside each byte, the first nibble is stored in the four least-significant bits, and the second nibble is stored in the four most-significant bits. Each unsigned integer (including enum values) is written into the nibble stream with WriteEncodedU32, and each signed integer is written with WriteEncodedI32, with the following exceptions. The endOffset in variable info is written with WriteEncodedU32(endOffset−startOffset). The varNumber in variable info is written with WriteEncodedU32(varNumber−MAX_ILNUM). When VLT_MDIL_SYMBOLIC bit is not set, the stack offset is divided by sizeof(DWORD) before writing out with WriteEncodedI32. Note that current CLR implementation doesn't support stack variables that are not aligned on a DWORD boundary. When VLT_MDIL_SYMBOLIC bit is set, the MDIL variable number is written with WriteEncodedU32.

The following three values always start on a byte-boundary: cbOffsetMapping, iOffsetMapping, and iVariableInfo. The preceding byte can be padded with an unused nibble if needed. All other values do not necessarily start on byte-boundaries.

Quoting Native Machine Instructions

Native machine instructions are embedded in MDIL via a family of pseudo instructions that act as quotes. The pseudo instruction contains the number of bytes of native machine instructions, which then immediately follow. In native code, most blocks of machine instructions are fairly short, so there are 16 short forms in MDIL to embed 0 to 15 bytes of machine instruction bytes. There are also three longer forms that express the number of machine instruction bytes as an unsigned byte, unsigned word and unsigned dword, respectively.

Thus, one has the following family of pseudo instructions:
- LIT_MACHINE_INST_0 . . . LIT_MACHINE_INST_15 (opcodes 00h . . . 0Fh): 0 . . . 15 bytes of native machine instruction bytes follow
- LIT_MACHINE_INST_B<byte count>: (opcode 10h): byte follows that gives the number of machine instruction bytes following
- LIT_MACHINE_INST_W<word count>: (opcode 11h): word follows (in little endian order) that gives the number of machine instruction bytes following
- LIT_MACHINE_INST_L<dword count>: (opcode 10h): dword follows (in little endian order) that gives the number of machine instruction bytes following As an example MDIL code bytes, consider:
05 0f af d1 8b c2
This is a five byte native instruction sequence that disassembles to:

| | |
|---|---|
| imul | edx,ecx |
| mov | eax,edx |

When translating this sequence to native code, the binder will just strip the pseudo instruction quote (in this case the initial 05 byte), and copy the remaining 5 bytes of native machine instructions verbatim into the output code stream.

General concepts in encoding of MDIL pseudo instructions.

This chapter introduces ways of encoding frequently occurring components of MDIL pseudo instructions.

Encoding of type tokens. Many MDIL pseudo instructions have type tokens as arguments (e.g. allocation, casting), and type tokens may also occur in immediates and addressing modes. MDIL uses a compressed encoding of type tokens that is compact in the common case.

In MDIL (as in MSIL), types may be specified by three different kinds of type tokens:
- Typedef tokens (with the most significant byte 02h) are used to express references to types defined in the current module.
- Typeref tokens (with the most significant byte 01h) are used to express references to types defined in other modules.
- Typespec tokens (with the most significant byte 1Bh) are used to express references to constructed types like array types, generic instantiations, type parameters etc.

In modules of a reasonable size, there are usually thousands of typedef tokens, significantly fewer typeref tokens, and again fewer typespec tokens being used. MDIL uses the following encoding to express type tokens in 2 bytes in most cases:
- If the token is a typedef token, and the typedef token is in the range 02000000h . . . 0200BFFFh, the token is encoded as the high byte of the low word of the type token, followed by the low byte of the low word.
- If the token is a typeref token, and the typeref token is in the range 01000000h . . . 01002FFFh, the token is encoded as 0C0h plus the high byte of the low word of the type token, followed by the low byte of the low word.
- If the token is a typespec token, and the typespec token is in the range 1B000000h . . . 1B000EFFh, the token is encoded as 0F0h plus the high byte of the low word of the type token, followed by the low byte of the low word.
- Otherwise the token is encoded as the byte 0FFh, followed by 4 bytes representing the type token in little endian order.

Type token encoding example. Here's an example:
6d 00 03 ALLOC_OBJECT 02000003
In this example, the byte "6d" is the opcode of the MDIL pseudo instruction ALLOC_OBJECT, and the following two bytes are the type token encoding. Thus the low word of the type token is 0003, and the high word is implied to be 0200, so the whole token is 02000003h.

Encoding of field tokens. Field tokens are often encoded as parts of addressing modes. In MDIL (as in MSIL), a field token can be of two main kinds:
- It can either be a fielddef token (most significant byte 04h) which is used to refer to fields of non-generic types in the current modules
- Or it can be a memberref token (most significant byte 0Ah) which is used to refer to fields of types in other modules, or to fields of instantiated generic types.

As a special case, in MDIL a field token can also be a type token. This is used to refer to the contents of a boxed representation of a value type. As with type tokens, field tokens have short representations for common cases:
- If the token is a fielddef token in the range 04000000h . . . 0400BFFFh, it is encoded as the high byte of the low word of the token (guaranteed to be 0BFh or less), followed by the low byte of the low word.
- If the token is a memberref token in the range 0A000000h . . . 0A001FFFH, it is encoded as 0C0h plus the high byte of the low word of the type token, followed by the low byte of the low word.
- If the token is a fielddef token in the range 0400C000h . . . 040FFFFFFh, it is encoded as 0E0h plus the low byte of the high word of the token, followed by the high byte of the low word, followed by the low byte of the low word.
- If the token is a member ref token in the range 0A002000h . . . 0A0EFFFFh, it is encoded a 0F0h plus the low byte of the high word of the token, followed by the high byte of the low word, followed by the low byte of the low word.
- Otherwise the token is encoded as the byte 0FFh, followed by 4 bytes representing the field token in little endian order.

Field token encoding example. Here's an example:

13 06 00 11 LOAD eax, [esi]0.04000011 (Test.a)
Here the byte '13' is the opcode of the LOAD pseudo instruction. The byte '06' encodes base and destination register, and also implies that a field token follows. The field token consists of the bytes '00' and '11', which are the low word of the field token in big endian order. Thus the low word of the field token is 0011h, and the whole field token is 04000011h.

Encoding of string tokens. String tokens are used by MDIL to refer to string literals (in the LOAD_STRING and PUSH_STRING pseudo instructions). The most significant byte of string tokens is 70h. The encoding for these tokens again tries to make the common case compact:
- If the token is in the range 70000000h . . . 7000BFFFh, it is encoded as the high byte of the low word of the token, followed by the low byte of the low word.
- If the token is in the range 7000C000h . . . 703EFFFFh, it is encoded as 0C0h plus the low byte of the high word of the token, followed by the high byte of the low word, followed by the low byte of the low word.
- Otherwise the token is encoded as the byte 0FFh followed by 4 bytes representing the string token in little endian order.

String token encoding example. Here's an example:
9e 01 00 13 LOAD_STRING ecx, 70000013
The '9e' byte is the opcode of the LOAD_STRING pseudo instruction. The following '01' byte contains the target register (ECX in this case). The following two bytes are the string token encoding for the string token 70000013h.

Encoding of immediates. MDIL uses a special encoding of immediates, i.e., bind-time constants, for two reasons:
- Many constants are small, and MDIL code size can be important, so it makes sense to optimize for this case.
- Some constants are not constants at compile time, and so the compiler needs to express them symbolically. Example: the sizes of value types are constants at bind time, but they may not be known to the compiler.

The encoding can be described by the following grammar:

```
MDILimmediate = SignedByte
    | SignedWord
    | Dword
    | ArrayElementSize Multiplier
  AdditiveConstant
    | ArgumentSize Multiplier
  AdditiveConstant
Where:
    SignedByte = single byte excluding 0bbb, 0bdh, 0dbh,
    0bdh // represents a signed byte.
    SignedWord = 0xbb LowByte HighByte // represents a
    signed word (in little-endian order).
    DWord = 0xdd LowWord HiWord // represents a dword (in
    little-endian order)
    ArrayElementSize = 0bdh TypeToken // size of type as
    array element (in bytes)
    ArgumentSize = 0dbh TypeToken // size of type as
    argument (in bytes)
    Multiplier = MDILImmediate
    AdditiveConstant = MDILImmediate
```

Symbolic constants (encodings starting with 0bdh and 0dbh) are mainly used in address arithmetic, in three contexts:
- Popping the stack arguments after calls to varargs or cdecl functions
- Similarly, indicate for gc info how many values on the stack have been popped or invalidated after a call
- Walking arrays of value types with (interior) pointers Note that a type can have two different sizes in MDIL—one if a value of this type is used as a stack argument, another one (sometimes smaller) if it's used as an array element—that explains why one implementation uses both ArrayElementSize and ArgumentSize. For instance, for the type System.Int16, ArrayElementSize would be 2, but ArgumentSize would be 4. This is because the size of stack arguments is always rounded up to a multiple of 4.

Here are some MDIL immediate encoding examples:
03h stands for the constant 3 or 0x00000003
0fch stands for the constant −4 (or 0xfffffffc)
0bbh 0bbh 00h stands for the constant 187 (or 0x000000bb)
0ddh 78h 56h 34h 12h stands for the constant 305419896 (or 0x12345678)
0dbh 00h 0dh 03h 04h stands for ArgumentSize (0200000d)*3+4. This could be used for instance to clean up the stack after calling a method taking 3 arguments of (value type) 0200000d and a DWord.

Addressing Modes

Accessing memory. There is a family of MDIL instructions that serve to access memory. They are translated to equivalent native instructions with certain details like field offsets or access sizes filled in by the binder.

For instance, a simple property getter may get a this pointer passed in register ECX, and may want to return a field off of this in register EAX. MDIL code bytes for this might look like:
13 01 00 09
Which the MDIL disassembler would turn into:
LOAD eax, [ecx]0.04000009
Note this looks very similar to a native code instruction like:
mov eax, dword ptr [ecx+8]
which is indeed what the binder might translate this particular instruction into.

There are a number of differences between the MDIL instruction and its native counterpart:
- The MDIL instruction uses a field token (the 04000009) instead of a direct offset to indicate which field it references. So this is a symbolic reference to the field (even though it's still a number of sorts)—the binder will lay out the object, and determine the offset of this particular field. Some sort of declaration for the field is not done in MDIL proper, but in related metadata information.
- The size of the access (DWORD in this case) is not determined by the MDIL opcode (the 13), but by the type of the field. So had one wanted to load a field of type byte instead, one would use the same opcode, but a different field token—one of a field of type byte. The binder would then translate this to a native instruction accessing a byte, say something like mov al, byte ptr [ecx+0ch].
- There is no simple relationship between the size of the MDIL instruction (4 bytes in this case) and the size of the native instruction (3 bytes). Had the field offset determined by the binder been bigger (more than 127 bytes), the binder would have had to use a larger native instruction, but the MDIL instruction would not change at all.

Of course fields of objects are not the only kind of thing that can be accessed with MDIL pseudo instructions—there are also local variables, array elements, and more, and also combinations thereof. As in native code, MDIL has a distinction between an instruction (which conveys what is to be done to a data item) and an addressing mode (which serves to designate the data item that is being operated on). How MDIL addressing modes work in detail is discussed in more detail in the following paragraphs.

What kinds of accesses are expressable as MDIL address modes? MDIL address modes express accesses to objects on the heap and on the stack (versionable structs, generics), to literal constants in the constant pool, and to static fields. Sometimes parts of data objects are accessed—fields of objects, elements of arrays and strings, length fields of arrays and strings. This section describes address modes for x86 and x64 processors.

What aspects are abstracted? First, it will be appreciated that "abstract", "abstraction" and so forth are used herein in a software development sense, not in a patent case law sense. In software development, abstraction involves decisions as to where and when to bring implementation details into play. Thus, a programming language such as C++ or LISP abstracts details such as which processor will be used and how much memory will be available to execute a program. Similarly, document section headings, chapter titles, tables of content, indexes, and—of course—abstracts in a book, article, or other document abstract details of the document's contents.

In some embodiments, an intermediate language such as MDIL hides—abstracts—details such as:
  The exact layout of heap and stack objects (where fields are, what their ordering is etc.)
  In generic code, sometimes exact types so one can use the same machine code regardless of size, gc layout and signed-ness of type parameters.
  In certain cases (versionable structs on the stack, generic code) it's also necessary to hide the stack layout to some extent—in other words, some or all argument and variable stack offsets are allocated by the binder rather than the compiler.

Elements of address modes. Here are the elements of address modes that can be used to construct simple or more complex MDIL address modes.
  Field offsets
  Explicit Types
  Indices
  Array and string lengths
  Explicit offsets
  Scaling, implied or explicit Encoding of address modes. The encoding of address modes is very flexible—a lot of elements may be optionally present. In most cases, though, there is a base register and a source/destination register required in the instruction. Thus, address modes in MDIL as presently defined always start with a single byte containing two register fields, each 4 bits wide in x64 code:
  AddrRegsByte: rrrrbbbb, where
  rrrr=4 bit source/dest register field, and
  bbbb=4 bit base register field In the case of x86 MDIL code, the register fields are only 3 bits wide each, and thus one has two more bits that can be used to describe frequently address modes:
  AddrRegsByte: ffrrrbbb, where
  ff=2 bit flags field (see below)
  rrr=3 bit source register field, and
  bbb=3 bit base register field In x64 code the AddrRegsByte is always followed by one or more address mode modifiers, in x86 code this is only the case if the if field in the AddrRegsByte has the value 11b—the other possible values of the if field are used to encode frequent address modes (described in more detail below). Some instructions don't need a source/destination register field. In those cases, that field is used instead to hold a sub opcode, or flags.

Address Mode Modifiers. Address mode modifiers are used to adjust the meaning of an address mode:
  You can specify a field (of a class or struct)—this means the field offset is added to whatever offset is already present, and the type of the field becomes the type of the address mode—so when the field is say of type char the address mode now refers to an unsigned value of size 2 bytes. As a special type, a type token referring to a value type can also be used as a field token—this is used to refer to the contents of a boxed representation of the value type.
  You can specify an index—this means you specify what the index register is, and you also specify the element type of the array. The element type becomes the type of the address mode.
  You can add an explicit offset.
  You can specify that the address mode refers to the constant pool of a method.
  You can specify that the address mode refers to a local variable.
  You can specify that the address mode refers to the base register directly, rather than to what the base register points to.
  You can specify that you want to reference the length field(s) of a single- or multidimensional array. This adds the offset of the length field is added to the offset of the address mode, and the type becomes the type of the length field.
  You can change the type of the address mode explicitly—this sometimes useful for casting, for example when you want to refer to a dword sized field as a byte.

Address mode modifiers can be concatenated—for example, to address the high dword of a long field in a struct element of an array of structs, you would specify an index (to get at the array element), then specify a field (to get at the field within the struct), then specify an explicit offset of 4 (to get at the high dword), and finally specify an explicit type of DWORD.

Encoding of Address Mode Modifiers. Address mode modifiers consist of a least single leading byte (the AddrmodeByte), possibly followed by additional information. The high bit in the Add rmodeByte is used to indicate whether this is the last address mode modifier (the bit is clear), or there are more address mode modifiers following (the bit is set). The lower 7 bits are encoded as follows:
  01h: (AM_FIELD) means this is a reference to a field—field token follows (encoding explained in chapter "Encoding of field tokens").
  02h: (AM_INDEX) means this is a reference to an array element—a so-called index byte follows detailing the element type of the array, and the index register (details explained below).
  03h: (AM_OFFSET) means an explicit offset is added to the address mode—the offset follows and is encoded as an MDIL immediate (explained in the chapter about immediate encoding).
  04h: (AM_CONSTPOOL) means this is a reference to the CONST_DATA section in the routine. The base register should be ESP/RSP and is ignored
  05h: (AM_LOCALVAR) means this is a reference to a local variable. The local variable number follows encoded as an immediate. The type of the local variable becomes the type of the address mode.
  06h: (AM_REGISTER) means this is a reference to the base register directly, rather than the memory it points to.
  09h-0fh: reserved for future expansion
  10h-17h: reference to length fields of arrays and strings:
    10h: (AM_BYTEARRAY_LEN) means this is a reference to the length of a byte array
    11h: (AM_WORDARRAY_LEN) means this is a reference to the length of a word array
    12h: (AM_DWORDARRAY_LEN) means this is a reference to the length of a dword array 13h: (AM_QWORDARRAY_LEN) means this is a reference to the length of qword array
14h: (AM_REFARRAY_LEN) means this is a reference to the length of an array of references
15h: (AM_STRUCTARRAY_LEN) means this is a reference to the length of an array of structs—a type token follows specifying the element type of the array
16h: (AM_STRING_LEN) means this is a reference to the length of a string
17h: (AM_MDIM_ARRAY_LEN) means this is a reference to one of the lengths of a multidimensional array. A MdimArrayByte follows further describing the multidimensional array. After this, a MdimBoundByte follows specifying the dimension of the bound one wants, and whether one is referring to the low bound or the length in that dimension.

18h-1eh: explicit typing of address modes:
18h: (AM_EXPLICIT_BYTE): type address mode as size byte
19h: (AM_EXPLICIT_WORD): type address mode as size word
1Ah: (AM_EXPLICIT_DWORD): type address mode as size dword
1Bh: (AM_EXPLICIT_QWORD): type address mode as size qword
1Ch: (AM_EXPLICIT_DQWORD): type address mode as size 16 bytes
1Dh: (AM_EXPLICIT_TOKEN): type given by following type token
1Eh: (AM_EXPLICIT_REF): type address mode as reference
20h-3Fh: (AM_SMALL_OFFSET): space saving variant of AM_OFFSET—offset of 0 thru 31 given by low 5 bits.
40h-7Fh: (AM_LOCAL_FIELD): space saving variant of AM_FIELD—low 5 bits give relative field number in type enclosing current method.
Potential future change: reduce number of encodings for AM_LOCAL_FIELD to get shorter encodings for local variable references.

Short encodings on x86. As mentioned above, the AddrRegsByte contains additional flags in the high bits used to indicate popular addressing modes. The purpose of these alternate encodings is to save a byte of MDIL code space over the more general encodings listed above. The flags have the following meanings:
00b: (AF_FIELD): indicates this is a reference to a field—a field token follows
01b: (AF_INDEX): indicates this is a reference to an array element—an index byte follows detailing the type of the array elements and the index register
10b: (AF_INDIR): indicates this is a simple indirection—no information follows and the access size is dword. This may be repurposed at some time to change this encoding for shorter references to locals.
11: (AF_AMODE): this is the general mode indicating one or more address mode modifiers follow as detailed above IndexByte encoding. Index bytes are reminiscent of SIB bytes in native x86/x64 addressing modes. They indicate index registers, scaling, and what kind of data object is being indexed.
The low 4 bits indicate the index register:
0h: index register is register eax (or rax in 64-bit code)
1h: index register is register ecx/rcx
2h: index register is register edx/rdx
3h: index register is register ebx/rbx
4h: no index register
5h: index register is register ebp/rbp
6h: index register is register esi/rsi
7h: index register is register edi/rdi
8h: index register is register r8
. . .
0fh: index register is register r15

The high 4 bits indicate what kind of data object is to be indexed:
00h: (IB_BYTE_PTR): Indexing from a byte pointer, i.e. scale=1, no additional offset
10h: (IB_WORD_PTR):
20h: (IB_DWORD_PTR):
30h: (IB_QWORD_PTR):
40h: (IB_BYTE_ARRAY): Indexing into a managed byte array–scale factor=1, size of array header is to be added as an additional offset
50h: (IB_WORD_ARRAY):
60h: (IB_DWORD_ARRAY):
70h: (IB_QWORD_ARRAY):
80h: (IB_STRUCT_ARRAY): Indexing into an array of user-defined structs. Type token follows. This is to be used with the ELEM_SCALE pseudo instruction to achieve part of the scaling, the indexing will achieve the remainder of the scaling as appropriate. For instance, if the user-defined structs are 12 bytes in size, the ELEM_SCALE would multiply by three, and the actual array access would scale the index by 4.
0A0h: (IB_REF_ARRAY): Indexing into an array of references.
0B0h: (IB_STRING): Indexing into an array of strings.
0C0h: (IB_MDIM_ARRAY): Indexing into a multidimensional array. MdimArrayByte follows indicating rank and element type of the multidimensional array.
0E0h: (IB_EXPLICIT_SCALE): The data object to be indexed into and the scale factor are given separately in the next byte. The low 4 bits of this byte give the kind of object to be indexed into (same encoding as the high 4 bits of the index byte), and the high 4 bits give the binary logarithm of the scale factor (in the range 0.3).

MdimArrayByte encoding. MdimArrayBytes are used to describe the rank and element type of multidimensional arrays. They are used either for indexing into a multidimensional array, or for accessing the bounds of a multidimensional array (in which case they are followed by an MdimBoundByte).

The encoding puts the rank of the array in the low five bits of the byte (limiting the rank to 31 or less). The upper three bits contain an encoding of the element type:
00h (MAB_KIND_BYTE): element type is byte (signed or unsigned)
20h (MAB_KIND_WORD): element type is word
40h (MAB_KIND_DWORD): element type is dword
60h (MAB_KIND_QWORD): element type is qword
80h (MAB_KIND_REF): element type is reference
0A0h (MAB_KIND_STRUCT): element type is struct (type token follows specifying elem type)

MdimBoundByte encoding. This specifies which dimension of a multidimensional array one is referring to, and whether one is referring to the low bound or the length in that dimension.

Similar to MdimArrayBytes, the dimension is put in the low 5 bytes. The upper three bits distinguish between the low bound and the length:
00h (MBB_LOW_BOUND): one is referring to the low bound in that dimension.

20h (MBB_LENGTH): one is referring to the length in that dimension.

Simple address mode examples:

Increment a field of type short, assuming 0400000e is a field def token for a field of type short:
2f 02 00 0e Disassembly: INC_[edx]0.0400000e Initialize a (symbolically addressed) local:
30 c4 05 00 01 Disassembly: STORE_IMM [esp].var#0, 0x1

Check index in register edi against high bound of array pointed at by register esi:

| | |
|---|---|
| 1d fe 12 | CMP edi, dword ptr [esi].DWordArrayLength |

Load value from double array in register esi—index is in register edi:

| | |
|---|---|
| 37 46 77 | FLD qword ptr [esi.QWordArray + edi* 8] |

Complex address mode examples:

Load a long (i.e. 64-bit signed integer value) from a field in an object. This consists of two instructions:

| | |
|---|---|
| 13 c1 81 00 0f 1a | LOAD eax, dword ptr [ecx].0400000f |
| 13 d1 81 00 0f a4 1a | LOAD edx, dword ptr [ecx + 0x4].0400000f |

Note in the first instruction an explicit type override (the trailing 1ah byte). Note in the second instruction the explicit offset of 4 (the 0a4h byte) to address the upper dword half of the long value.

Load a literal double value from offset 8 in the routine's constant pool:
37 c4 84 a8 1b FLD qword ptr [ConstPool+0x8]

Here there are three address mode modifiers. The first one (084h) means the addressing is relative to the constant pool (the base register esp implied by the AddrRegsByte is disregarded), the second one (0a8h) means there is an additional offset of 08h, and the third (1bh) means that the size of the access is qword.

Store double value at index 3 in a double array (range check not shown):
37 d9 82 74 38 FSTP qword ptr [ecx.QwordArray+0x18]

In this example, the AddrRegsByte (0d9h) has the two most significant bits set, i.e. a full address mode is following. The next three bits are part of the subopcode for FSTP. The least significant three bits are 001b, which is the register code for ecx. What follows next is the address modifier 082h (or AM_CONTINUE|AM_INDEX), which signifies that more address mode modifiers follow, and also that an index byte follows. The index byte is 74h (IB_QWORD_ARRAY|MDIL_REGISTER_ESP) meaning that we're indexing into an array of Qwords, and that the index register is esp, i.e. there is no index. Lastly, the address mode Modifier 038h signifies an additional offset of 018h.

MDIL instructions translating directly to machine instructions. Here is a list of MDIL pseudo instructions that behave very similarly to the LOAD pseudo instruction (except some affect the cpu flags just like the native instruction would):

LOAD (opcode 13h): load register from managed memory location described by an address mod—translates into mov reg,mem native instruction STORE (opcode 14h): just like load, translates into a mov mem,reg native instruction LOAD_SX (opcode 16h): load with sign extend, translates into a movsx reg,mem native instruction. The size of the memory access is implied by the address mode (say the type of a field).

LOAD_ZX (opcode 17h): load with zero extend, translates into a movzx reg,mem native instruction. The size of the memory access is again implied by the address mode.

LOAD_X (opcode 18h): load with "natural extend", i.e. according to the size and signedness of the address mode. The primary use of this instruction is in generic code.

LOAD_ADDR (opcode 19h): load effective address, translates into a lea reg,mem native instruction ADD (opcode 1Ah): add to register from memory, translates into a add reg,mem native instruction. The condition codes are thus affected as in the native instruction ADC (opcode 1Bh): add with carry to register from memory AND (opcode 1Ch): and register with memory CMP (opcode 1Dh): cmp register with memory OR (opcode 1Eh): or register from memory SUB (opcode 1Fh): sub memory from register SBB (opcode 20h): subtract with borrow XOR (opcode 21h): exclusive or register with memory Some of these MDIL instructions have "reverse" forms where the destination operand is memory instead of a register:

ADD_TO (opcode 22h): add register to memory

ADC_TO (opcode 23h): add register to memory with carry

AND_TO (opcode 24h): and register to memory

CMP_TO (opcode 25h): cmp register to memory

OR_TO (opcode 26h): or register to memory

SUB_TO (opcode 27h): sub register from memory

SBB_TO (opcode 28h): sub register from memory with borrow

XOR_TO (opcode 29h): xor register to memory

There are also variants where the source operand is an immediate constant instead of a register. The opcode is OP_IMM (opcode 31 h). The register field in the AddrRegsByte in the address mode (see chapter on address mode below) is used as a sub opcode to express the operation:

ISO_ADD (0h): add immediate to memory

ISO_OR (1h): or immediate to memory

ISO_ADC (2h): add immediate to memory with carry

ISO_SBB (3h): sub immediate from memory with borrow

ISO_AND (4h): and immediate to memory

ISO_SUB (5h): sub immediate from memory

ISO_XOR (6h): xor immediate to memory

ISO_CMP (7h): cmp immediate to memory

The encoding of these instructions has the immediate following the address mode description. The immediate is encoded as an MDIL immediate—this has small forms for small constants and the ability to express symbolic constants (those that are not constants at compile time, but are at bind time). See a longer description under "encoding of immediates".

There are more MDIL instructions referencing memory that for the most part translate very directly to native instructions. All of them contain an address mode. Sometimes there is a subopcode between the opcode and the address mode, and sometimes there is an immediate (always encoded in the standard MDIL way—see "encoding of immediates") following at the very end. In many cases the register field of the address mode is used for a subopcode, in other case the register field is not used and should be 0 (all 0 bits).

Some of the additional MDIL instructions referencing memory include:

TEST (opcode 2Ah): test reg, memory
MUL_DIV_EAX (opcode 2Bh): not/neg/mul/imul/div/idiv memory instruction group, sub opcode given by register field in address mode:
  MDSO_NOT (2h): not memory
  MDSO_NEG (3h): neg memory
  MDSO_MUL_EAX (4h): mul eax/ax/al, memory (size implied by address mode)
  MDSO_IMUL_EAX (5h): imul eax/ax/al, memory
  MDSO_DIV_EAX (6h): div eax:edx/ax:dx/ax, memory
  MDSO_IDIV_EAX (7h): idiv eax:edx/ax:dx/ax, memory
IMUL (opcode 2Ch): imul register, memory
IMUL_IMM (opcode 2Dh): imul register, memory, immediate
INC_DEC_PUSH (opcode 2Fh): inc/dec/push memory instruction group, subopcode given by register field in address mode:
  IDP_INC (0h): inc memory
  IDP_DEC (1h): dec memory
  IDP_PUSH (6h): push memory (memory must be word or dword-sized)
STORE_IMM: (opcode 30h): mov memory, immediate. Register field of the address mode is unused in this instruction and must be 0.
TEST_IMM (opcode 32h): test memory, immediate. Register field of the address mode is unused and must be 0.
SHIFT_1 (opcode 33h): rol/ror/rcl/rcr/shl/shr/sar memory, 1. The operation is encoded in the register field of the address mode as follows:
  SSO_ROL (0h): rotate left
  SSO_ROR (1h): rotate right
  SSO_RCL (2h): rotate left circular
  SSO_RCR (3h): rotate right circular
  SSO_SHL (4h): shift left
  SSO_SHR (5h): shift right
  SSO_SAR (7h): shift right arithmetic
SHIFT_IMM (opcode 34h): rol/ror/rcl/rcr/shl/shr/sar memory, immediate. The operation is encoded in the register field of the address mode as above for SHIFT_1.
SHIFT_CL (opcode 35h): rol/ror/rcl/rcr/shl/shr/sar memory, cl. The operation is encoded in the register field of the address mode as above for SHIFT_1.
OP_XMM (opcode 36h): xmm instructions—next byte contains a subopcode as follows:
  XSO_LOAD (0h): movss/movsd xmmReg, memory
  XSO_STORE (1h): movss/movsd memory, xmmReg
  XSO_ADD (2h): addss/addsd xmmReg, memory
  XSO_SUB (3h): subss/subsd xmmReg, memory
  XSO_MUL (4h): mulss/mulsd xmmReg, memory
  XSO_DIV (5h): divss/divsd xmmReg, memory
  XSO_CMP (6h): ucomiss/ucomisd xmmReg, memory
  XSO_F2D (7h): cvtss2sd xmmReg, memory
  XSO_F2I (8h): cvtss2si/cvtsd2si reg, memory
  XSO_FT2I (9h): cvttss2si/cvttsd2si reg, memory—truncating version
  XSO_F2L (0Ah): cvtss2si/cvtsd2si reg, memory
  XSO_FT2L (0Bh): cvttss2si/cvttsd2si reg, memory—truncating version
  XSO_F2S (0Ch): cvtsd2ss xmmReg, memory
  XSO_I2D (0Dh): cvtsi2sd xmmReg, memory
  XSO_I2S (0Eh): cvtsi2ss xmmReg, memory
  XSO_LOAD_16 (0Fh): movdqa xmmReg, memory
  XSO_STORE_16 (10h): movdqa memory, xmmReg
  ... more subopcodes may be added in the future
LD_ST_FPU (opcode 37h): fld/fst/fstp memory instruction group. The operation is encoded in the register field of the address mode as follows:
  LSO_FLD (0h): fld memory
  LSO_FST (2h): fst memory
  LSO_FSTP (3h): fstp memory
OP_FPU (opcode 38h): fadd/fmul/fcom/fcomp/fsub/fsubr/fdiv/fdivr memory instruction group. The operation is encoded in the register field of the address mode as follows:
  FSO_FADD (0h): fadd memory
  FSO_FMUL (1h): fmul memory
  FSO_FCOM (2h): fcom memory
  FSO_FCOMP (3h): fcomp memory
  FSO_FSUB (4h): fsub memory
  FSO_FSUBR (5h): fsubr memory
  FSO_FDIV (6h): fdiv memory
  FSO_FDIVR (7h): fdivr memory
ILOAD_FPU (opcode 39h): fild memory. The register field of the address mode is unused and must be 0.
ISTORE_FPU (opcode 3Ah): fistp memory. The register field of the address mode is unused and must be 0.
SET_CC (opcode 3Bh): setcc memory—next byte contains condition code (this follows the normal x86 encoding for condition codes):
  SET_O (0h): set on overflow
  SET_NO (1h): set on no overflow
  SET_C (2h): set on carry (unsigned <)
  SET_NC (3h): set on no carry (unsigned >=)
  SET_Z (4h): set on zero (==)
  SET_NZ (5h): set on no zero (!=)
  SET_BE (6h): set on below or equal (unsigned <=)
  SET_A (7h): set on above (unsigned >)
  SET_S (8h): set on negative (<0)
  SET_NS (9h): set on positive or zero (>=0)
  SET_PE (0Ah): set on parity even
  SET_PO (0Bh): set on parity odd
  SET_L (0Ch): set on less (signed <)
  SET_GE (0Dh): set on greater equal (signed >=)
  SET_LE (0Eh): set on less equal (signed <=)
  SET_G (0Fh): set on greater (signed >)
XADD (opcode 3Ch): lock xadd memory, register
XCHG (opcode 3Dh): xchg memory, register
CMPXCHG (opcode 3Eh): lock cmpxchg memory, register Operation of ELEM_SCALE pseudo instruction. The ELEM_SCALE (opcode 2Eh) instruction takes a destination register, an address mode, and a type token referring to a value type. It is used to prescale an array index into a register so that it can be used to index an array of structs. The assumption is that the precise size of the struct is unknown to the compiler (as it might change in versioning, for instance).

The operation of the binder is to first compute the size of the struct when it is used as an array element. As a native address mode can include a scale factor of 1, 2, 4 or 8, the binder will then divide the struct size by the largest of those factors that divide it. For a example, if the struct size is 12, the binder will divide it by 4 and get 3. Finally the binder will generate instructions to scale the address mode by that final factor.

As moves, shifts, lea, and imul instructions will be used by the binder as appropriate, the cpu condition code register must be considered trashed by this instruction. Otherwise, only the destination register is set to the prescaled value. This value may of course be used by multiple instructions as a scaled array index in an address mode referring to an array of structs.

Garbage Collection (GC) Info

Introduction. The garbage collector will stop managed threads and inspect the stack frames of methods on each thread's stack. In some implementations, it must be possible for the garbage collector to find all locals (i.e. registers and stack locations) containing pointers into the garbage collector's heap. This set of so-called "gc roots" may of course depend on where exactly execution has reached within the method, i.e. where the instruction pointer or return address is pointing within the method.

As a first approximation, you can thus think of gc information for a method as a mapping (offset within the method)-> (set of registers and stack locations containing managed pointers). There are some complications to this picture that we'll consider next.

Flavors of pointers. The CLR and languages running on it like C# allow different flavors of pointers that are treated differently by the garbage collector:

The simplest and most common type of pointer is a pointer to a managed object. It must always point to the beginning of an object, or else it must be null.

Another type of pointer (a so-called interior pointer) may point into the middle of an object, or at a stack location or unmanaged memory, or it may be null. These are frequently generated by C# ref parameters or their equivalents in other CLR languages. They may also be generated by optimizing compilers, e.g. to efficiently walk through managed arrays.

CLR also allows pinning pointers. Having a pinning pointer point at (or into) an object tells the garbage collector to keep this object in place for the time being, e.g. it should not be moved elsewhere for heap compaction.

In certain contexts, CLR requires managed code to mark a method's this pointer specially.

Interruptible locations. The CLR is a multi-threaded environment. That implies that sometimes a thread will have to be stopped for garbage collection because some other thread did an allocation and ran out of space on the garbage collected heap. Thus, in some implementations each thread currently executing a managed code must be able to be stopped in a short amount of time, and it must be able to be stopped at a location where the current gc roots are discoverable by the garbage collector.

A general rule in the CLR is that a thread can be stopped when a routine is about to return to its caller. Thus a (JIT-) compiler has to be able to describe the gc roots at least at each call site.

For tight, long running loops without calls an additional rule is used to make sure threads can be stopped without delaying executing of the whole program for too long. Two techniques have been used in the context of the CLR to accomplish this:

Fully interruptible code has accurate gc root information everywhere. The CLR supports fully interruptible code for whole methods on x86, it also supports fully interruptible regions on x64. Two pseudo instructions START_FULLY_INTERRUPTIBLE/END_FULLY_INTERRUPTIBLE express this concept in MDIL where on x86, the fully interruptible region must be the whole body of the method except for prolog and epilog.

GC probes are explicit instructions inserted into tight loops to check for a pending garbage collection. There is a pseudo instruction GC_PROBE to express this concept in MDIL—how exactly this is implemented is a detail left to the binder. Clearly, at GC_PROBE pseudo instructions, the GC information has to be accurate.

On systems running a Microsoft® Windows operating system, a frequently used technique is fully interruptible code because it gives the best code performance (there are no extra instructions to check for a pending garbage collection). The downside is that the size of the gc information is substantially larger.

How GC information is expressed in MDIL. MDIL uses special instructions to convey which registers or stack locations contain which kind of pointer at what locations in a method:

REF_BIRTH_REG (opcode 73h). This means that a register starts containing a gc pointer starting at the current code offset. An additional byte follows containing a register number in the high 5 bits, and flags in the low 3 bits. The assignment of the flags is as follows:
Bit 0 is 1 if the pointer is an interior pointer, 0 otherwise
Bit 1 is 1 if the pointer is a pinning pointer, 0 otherwise
Bit 2 is 1 if the pointer is the this pointer, 0 otherwise REF_DEATH_REG (opcode 7Bh): This means that a register no longer contains a gc pointer starting at the current code offset. An additional byte follows containing a register number in the high 5 bits. The low 3 bits must all be 0.

REF_BIRTH_EAX (opcode 6Fh): short encoding for REF_BIRTH_REG with a register number of 0 and the flags all 0. Note that in x64 code, this refers to the full register RAX.

REF_BIRTH_ECX (opcode 70H): same idea . . .
REF_BIRTH_EDX (opcode 71h): ditto . . .
REF_BIRTH_EBX (opcode 72h): ditto . . .
REF_BIRTH_EBP (opcode 74h): ditto . . .
REF_BIRTH_ESI (opcode 75h): ditto . . .
REF_BIRTH_EDI (opcode 76h): ditto . . .

REF_DEATH_EAX (opcode 77h): short encoding for REF_DEATH_REG with a register number of 0.
REF_DEATH_ECX (opcode 78h): same idea . . .
REF_DEATH_EDX (opcode 79h): ditto . . .
REF_DEATH_EBX (opcode 7Ah): ditto . . .
REF_DEATH_EBP (opcode 7Ch): ditto . . .
REF_DEATH_ESI (opcode 7Dh): ditto . . .
REF_DEATH_EDI (opcode 7Eh): ditto . . .

REF_BIRTH_EBP_V (opcode 7Fh): variable addressed via EBP/RBP becomes live. MDIL immediate follows indicating flags in the low 3 bits (values are as detailed under REF_BIRTH_REG), and the EBP/RBP relative offset in the high bits. There is a requirement that the offset be 4-byte aligned on x86 and 8-byte aligned on x64. The bits thus required to be zero are not represented, i.e. the offset contained in the MDIL immediate constant is shifted right by 2 bits on x86 and 3 bits on x64.

REF_DEATH_EBP_V (opcode 80h): variable addressed via EBP/RBP no longer contains a gc pointer. MDIL immediate follows as with REF_BIRTH_EBP_V, except the flags in the low 3 bits must be all 0.

REF_BIRTH_ESP_V (opcode 81h): similar for variables addressed via ESP/RSP.

REF_DEATH_ESP_V (opcode 82h): ditto . . .

REF_BIRTH_LOCAL (opcode 83h): similar for variables address symbolically via variable numbers. MDIL immediate follows containing flags in the low 3 bits and the variable number in the high bits. The semantics of this instruction depend on whether the variable was just given a local size, or it was given an explicit type:

The variable was given just a size: the variable is considered a gc pointer. The size must be the size of a pointer (4 bytes on x86, 8 bytes on x64).

The variable was given an explicit type and the type is a gc reference (a class, or an array)—the instruction is taken to mean that the stack location referred to by the variable contains a gc pointer starting at the current offset.

The variable is a value type not containing any gc references: the instruction is completely ignored The variable is a value type containing one or more gc references: the contained gc references are considered valid starting from the current offset.

REF_DEATH_LOCAL (opcode 84h): ditto . . .

REF_BIRTH_LCLFLD (opcode 85h): address mode follows referring to a field in a local struct or block. The usual flags are contained in the reg field of the AddrRegsByte.

REF_DEATH_LCLFLD (opcode 86h): ditto . . .

REF_UNTR_EBP_V (opcode 87h): This means an EBP relative variable contains a gc reference during the whole body of the method (excluding prolog and epilog). This means the liveness of this variable was not tracked by the MDIL compiler. MDIL immediate follows as with REF_BIRTH_EBP_V.

REF_UNTR_ESP_V (opcode 88h): similar idea . . .

REF_UNTR_EBP_VS (opcode 89h): Multiple untracked EBP variables. MDIL immediate follows containing start offset and flags, another MDIL immediate follows containing the number of variables.

REF_UNTR_ESP_VS (opcode 8Ah): similar idea . . .

REF_UNTR_LOCAL (opcode 8Bh): Symbolically addressed local is untracked

REF_UNTR_LCLFLD (opcode 8Ch): Symbolically addressed local field is untracked

Some MDIL instructions relating to full interruptibility and gc probes:

START_FULLY_INTERRUPTIBLE (opcode 8Dh): the code is fully interruptible starting from the current offset.

END_FULLY_INTERRUPTIBLE (opcode 8Eh): the code is no longer fully interruptible starting at the current offset.

GC_PROBE (opcode 8Fh): insert a check for pending garbage collection.

As some parameters are pushed on the stack in x86 code, there are additional instructions on this architecture to allow tracking both the current ESP level and what has been pushed:

NONREF_PUSH (opcode 92h): a dword not containing a gc pointer has been pushed on the stack.

GCREF_PUSH (opcode 93h): a dword containing a normal gc pointer has been pushed on the stack.

BYREF_PUSH (opcode 94h): a dword containing an interior gc pointer has been pushed on the stack.

REF_PUSH (opcode 95h): a dword containing a gc pointer has been pushed on the stack. Byte follows containing the usual flags.

REF_POP_1 (opcode 96h): one dword is popped from stack, e.g. by the parameter cleanup in a called method.

REF_POP_N (opcode 97h): MDIL immediate follows indicating how many dwords (containing both gc pointers and non-gc pointers) have been popped from the stack.

REF_INV_N (opcode 98h): MDIL immediate follows indicating how many dwords previously pushed on the stack are no longer valid. This typically occurs after a call to a method using the cdecl or varargs calling convention.

REF_DEATH_REGS_POP_N (opcode 99h): space-saving variant typically used after a call in fully interruptible code. Lower 6 bits are a register mask indicating which registers no longer contain gc references:

Bit 0 is 1 if EAX no longer contains a gc reference, 0 otherwise (i.e. no change)

Bit 1 is 1 if EDX no longer contains a gc reference, 0 otherwise

Bit 2 is 1 if ECX no longer contains a gc reference, 0 otherwise

Bit 3 is 1 if EBX no longer contains a gc reference, 0 otherwise

Bit 4 is 1 if ESI no longer contains a gc reference, 0 otherwise

Bit 5 is 1 if EDI no longer contains a gc reference, 0 otherwise

Upper 2 bits are a number of dwords (0.3) that are popped from the stack. If more dwords are popped, this must be expressed with an additional REF_POP_N instruction.

Because in partially interruptible code, gc information is only reported at call sites, and pushed arguments are usually consumed by the called method, the pseudo instructions reporting stack changes will be relatively rare in partially interruptible code. There are two situations where they are required:

Methods with no frame pointer. In this case tracking of stack pointer changes is necessary even at non-callsites. Otherwise the CLR cannot find the location of the return address on the stack, which is required so it can stop the thread when a garbage collection starts.

Nested calls where arguments to an outer call are pushed on the stack before arguments to an inner call are pushed. In this case, the arguments to the outer call need to be reported, because they have not yet consumed by the outer call.

MDIL code example with GC info instructions. Here's an example compiled from the following C# code example which takes an array of strings and concatenates them using a "," as a separator.

```
string List(string[ ] a)
{
    StringBuilder sb = new StringBuilder( );
    string separator = "";
    for (int i = 0; i < a.Length; i++)
    {
        sb.Append(separator);
        separator = ", ";
        sb.Append(a[i]);
    }
    return sb.ToString( );
}
```

The MDIL code for this example looks like this (the MDIL disassembler uses UPPER CASE for pseudo instructions, and lower case for native machine instructions):

0000 b2        EBP_FRAME

-continued

```
0001 b4 07       PUSH_REGS         ebx, esi, edi
0003 a7 04       LOCAL_BLOCK       04 (define is var#0)
0005 b8 00       FRAME_SIZE        00
0007 02 8b fa    mov               edi,edx
000a b9          END_PROLOG
; StringBuilder sb = new StringBuilder( );
000b 6d c0 07    ALLOC_OBJECT      01000007        ; allocate a
StringBuilder
000e 76          REF_BIRTH_EDI ; EDI live during allocation
                                  ; (see explanation below)
000f 09 8b f0 8b ce ba 10 00 00 00
                 mov               esi,eax
                 mov               ecx,esi
                 mov               edx,00000010
0019 4e 0a 00    CALL_REF          0a00000a        ; call
StringBuilder..ctor
001c 75          REF_BIRTH_ESI     ; ESI live during call
; string separator = "";
001d 9e 00 00 13 LOAD_STRING       eax, 70000013
0021 14 c5 05 00 STORE             [ebp].var#0, eax
0025 83 00       REF_BIRTH_LOCAL   var#0           ; var#0 becomes
live
; for (int i = 0; i < a.Length; i ++)
0027 02 33 db    xor               ebx,ebx
002a 31 ff 10 00 CMP               dword ptr
[edi].ByteArrayLength, 0x0
002e 61 28       JUMP_LE           0x58
;       sb.Append (separator);
0030 13 d5 05 00 LOAD              edx, [ebp].var#0
0034 02 8b ce    mov               ecx,esi
0037 84 00       REF_DEATH_LOCAL   var#0           ; var#0 dies
0039 4e 08 00    CALL_REF          0a000008        ; call
StringBuilder.Append
;       separator = ", ";
003c 9e 00 00 15 LOAD_STRING       eax, 70000015
0040 14 c5 05 00 STORE             [ebp].var#0, eax
0044 83 00       REF_BIRTH_LOCAL   var#0           ; var#0 becomes
live
;       sb.Append(a[i]);
0046 13 57 a3    LOAD              edx, dword ptr
[edi.RefArray + ebx*4]
0049 02 8b ce    mov               ecx,esi
004c 4e 08 00    CALL_REF          0a000008        ; call
StringBuilder.Append
; for (int i = 0; i < a.Length; i++)
004f 03 83 c3 01 add               ebx,01
0053 25 df 10    CMP_TO            dword ptr
[edi].ByteArrayLength, ebx
0056 62 d8       JUMP_GT           0x30
; return sb.ToString( );
0058 84 00       REF_DEATH_LOCAL   var#0           ; var#0 no
longer needed
005a 02 8b ce    mov               ecx,esi
005d 50 09 00    CALL_VIRT_REF     0a000009        ; call
sb.ToString
0060 7d          REF_DEATH_ESI     ; ESI no longer live
0061 7e          REF_DEATH_EDI     ; EDI no longer live
0062 bb          EPILOG_RET
```

Note the following points:

This is partially interruptible code, i.e. the information about live gc pointers is only valid at call sites (ALLOC_OBJECT and few other pseudo instructions count as call sites).

A prototype compiler emits liveness information for registers as late as possible—in fact it emits it after the call site it's valid for. The return address points after the call site as well, and the gc info instructions are not "real" instructions, so one could argue this is acceptable. But it may be confusing, so one might move these instructions to some place before the call site instead.

In contrast, liveness information for stack locals is emitted eagerly by the prototype compiler, just after the stack location becomes valid for a stack local's birth, or very soon after it has been used for the last time for the local's death.

Although this is unrelated to gc information, it may be noted that one compiler doesn't properly keep track of the type of an array when one has an explicit comparison of the array's length—this is why the for-loop test at offset 0053 comes out as "CMP_TO dword ptr [edi] .ByteArrayLength, ebx", even though we're iterating through a string array. But this is acceptable in terms of the correctness of the final machine code in the pertinent version of the CLR.

When one adds a tight loop without calls to the example, one gets different gc information, because now fully interruptible code is called for. Below the example was changed to precompute the total length of the final string, to avoid the StringBuffer having to grow:

```
string List1(string[ ] a)
{
    string separator = "";
    int totalLength = 0;
    for (int i = 0; i < a.Length; i++)
    {
        totalLength += separator.Length;
        separator = ", ";
        totalLength += a[i].Length;
    }
    StringBuilder sb = new StringBuilder(totalLength);
    separator = "";
```

```
    for (int i = 0; i < a.Length; i++)
    {
        sb.Append(separator);
        separator = ", ";
        sb.Append(a[i]);
    }
    return sb.ToString( );
}
```

The resulting MDIL code looks like the following, divided here into four parts for more convenient reference; here is the first part:

```
0000 b2              EBP_FRAME
0001 b4 07           PUSH_REGS                 ebx, esi, edi
0003 a7 04           LOCAL_BLOCK               04 (defines var#0)
0005 a7 04           LOCAL_BLOCK               04 (defines var#1)
0007 b8 00           FRAME_SIZE                00
0009 02 8b da        mov                       ebx,edx          ; use ebx to store the array
000c 72              REF_BIRTH_EBX                              ; ebx is a gc pointer now
000d 8d              START_FULLY_INTERRUPTIBLE                  ; whole method body is fully
                                                                ; interruptible
;
; string separator = "";
;
000e 9e 07 00 13     LOAD_STRING               edi, 70000013 ; use edi for separator
0012 76              REF_BIRTH_EDI                              ; edi is a gc pointer now
;
; int totalLength = 0;
;
0013 02 33 d2        xor                       edx,edx
0016 14 d5 05 00     STORE                     [ebp].var#0, edx
;
; for (int i = 0; i < a.Length; i++)
;
001a 02 33 c9        xor                       ecx,ecx
001d 13 d3 10        LOAD                      edx, dword ptr [ebx].ByteArrayLength
0020 02 85 d2        test                      edx,edx
0023 61 1f           JUMP_LE                   0x44
;
;        totalLength += separator.Length;
;
0025 13 c7 16        LOAD                      eax, dword ptr [edi].StringLength
0028 22 c5 05 00     ADD_TO                    [ebp].var#0, eax
;
;        separator = ", ";
;
002c 9e 07 00 15     LOAD_STRING               edi, 70000015
;
;        totalLength += a[i].Length;
;
0030 13 43 a1        LOAD                      eax, dword ptr [ebx.RefArray + ecx*4]
0033 6f              REF_BIRTH_EAX                              ; eax is a gc pointer
0034 13 c0 16        LOAD                      eax, dword ptr [eax].StringLength
0037 77              REF_DEATH_EAX                              ; eax no gc pointer anymore
0038 22 c5 05 00     ADD_TO                    [ebp].var#0, eax
```

Now for the second part:

```
;
; for (int i = 0; i < a.Length; i++)
```

```
;
003c 05 83 c1 01 3b d1
                     add                       ecx,01
                     cmp                       edx,ecx
```

-continued

```
0042 62 e1            JUMP_GT               0x25
;
; StringBuilder sb = new StringBuilder(totalLength);
;
0044 7e               REF_DEATH_EDI                      ; don't
need separator
                                                         ; anymore
0045 6d c0 07         ALLOC_OBJECT          01000007     ; allocate
StringBuilder
0048 6f               REF_BIRTH_EAX                      ; eax is a
gc pointer
0049 02 8b f0         mov                   esi,eax
004c 75               REF_BIRTH_ESI                      ; esi is a
gc pointer too
004d 13 d5 05 00      LOAD                  edx, [ebp].var#0
0051 02 8b ce         mov                   ecx,esi
0054 70               REF_BIRTH_ECX                      ; ecx is a
gc pointer too
0055 4e 0b 00  CALL_REF                     0a00000b ; call
StringBuilder..ctor
0058 99 03            REF_DEATH_REGS_POP_N     eax ecx 0 ;
eax, edx are trashed
                                                         ; by the call, and
so are
                                                         ; not gc pointers
afterwards
;
; separator = "";
;
005a 9e 07 00 13      LOAD_STRING           edi, 70000013 ; re-
assign separator
005e 76               REF_BIRTH_EDI                      ; edi is again
a gc pointer
```

This is the third part:

```
;
; for (int i = 0; i < a.Length; i++)
;
005f 02 33 d2 xor                     edx,edx
0062 14 d5 05 01     STORE             [ebp].var#1, edx
0066 13 d3 10        LOAD              edx, dword ptr
[ebx].ByteArrayLength
0069 02 85 d2        test              edx,edx
006c 61 31           JUMP_LE           0x9f
;
; sb.Append(separator);
;
006e 02 8b d7        mov               edx,edi
0071 71              REF_BIRTH_EDX                ; edx is
now a gc pointer
0072 02 8b ce        mov               ecx,esi
0075 70              REF_BIRTH_ECX                ; and so
is ecx
0076 4e 08 00        CALL_REF          0a000008   ; call
StringBuilder.Append
0079 99 26           REF_DEATH_REGS_POP_N    ecx edx edi 0 ;
after the call,
                                                 ; ecx, edx, and edi
are not
                                                 ; gc pointers
anymore
;
; separator = ", ";
;
007b 9e 07 00 15     LOAD_STRING       edi, 70000015 ; re-
assign separator
007f 76              REF_BIRTH_EDI                ; edi is again
a gc pointer
;
; sb.Append (a[i]);
;
0080 13 c5 05 01     LOAD              eax, [ebp].var#1
0084 13 53 a0        LOAD              edx, dword ptr
[ebx.RefArray + eax*4]
0087 71              REF_BIRTH_EDX                ; edx is a
gc pointer
0088 02 8b ce        mov               ecx,esi
008b 70              REF_BIRTH_ECX                ; ecx is a
gc pointer
008c 4e 08 00        CALL_REF          0a000008   ; call
StringBuilder.Append
008f 99 06           REF_DEATH_REGS_POP_N    ecx edx 0 ;
after the call,
                                                 ; ecx, edx are not
gc
                                                 ; pointers anymore
```

And finally, here is the fourth part:

```
;
; for (int i = 0; i < a.Length; i++)
;
0091 31 c5 05 01 01
              ADD                      [ebp].var#1, 0x1
0096 13 d3 10        LOAD              edx, dword ptr
[ebx].ByteArrayLength
0099 1d d5 05 01     CMP               edx, [ebp].var#1
009d 62 cf           JUMP_GT           0x6e
;
; return sb.ToString( );
;
009f 7a              REF_DEATH_EBX                ; don't need
the array
00a0 7e              REF_DEATH_EDI                ; don't
need separator
00a1 02 8b ce        mov               ecx,esi
00a4 70              REF_BIRTH_ECX                ; is has
now gc pointer
00a5 50 09 00        CALL_VIRT_REF     0a000009   ; call
sb.ToString
00a8 99 12           REF_DEATH_REGS_POP_N    ecx esi 0
; ecx is not a gc pointer anymore, plus don't need the
; StringBuilder anymore
00aa 6f              REF_BIRTH_EAX    ; but do need the result
;
00ab bb              EPILOG_RET
```

One may note the following points about fully interruptible gc info, in some implementations:

- The compiler should mark a register or local as containing a gc pointer as soon as it has stored such a value in it. In other words, there no tolerance concerning where births are emitted.
- Conversely, there is some tolerance concerning where deaths are emitted. The earliest place they can be emitted is after the last use of the variable (computed by a live variable analysis of sorts). The latest place they can be emitted is after an instruction that overwrites the gc pointer with a non-gc pointer (or one with a different set of flags).
- If one register or local is copied to another, both should be appropriately marked as containing a gc pointer. While one register or local would be enough to keep a heap object from being treated as garbage by the garbage collector, the garbage collector should know about all locations referring to an object so it can update them appropriately if it decides to move an object.
- There is no requirement that registers and locals be precisely tracked throughout the prolog and epilog. At the transition locations though to fully interruptible code or out of fully interruptible code, the set of gc roots should be accurate. This is the reason for a REF_BIRTH_EBX just before the START_FULLY_INTERRUPTIBLE instruction, and a REF_BIRTH_EAX just before the EPILOG_RET instruction.

Prologs and Epilogs. At the beginning of a method, a compiler will generally generate a prolog sequence that may set up a frame pointer, save some registers, copy parameter values from their incoming locations to other locations, initialize locals and so on. Conversely, at the end of the method there is normally an epilog sequence that conceptually undoes most of what the prolog did, so restore the context of the caller and get ready to return to it.

In a managed code environment like the CLR, the prolog sequence is highly structured and there are restrictions to make sure the execution engine can unwind the stack, find where register values are saved, how many bytes of parameters were pushed on the stack and so on. In MDIL this is reflected in that most of the instructions in a typical prolog are pseudo instructions that have a dual purpose: on the one hand, they get translated into actual machine instructions that perform the frame setup, on the other hand they produce side tables that inform the execution engine about how exactly the frame is laid out. This also gives the binder enough information so that it can produce a valid epilog given the prolog. To save MDIL code space, the epilog is therefore represented by a single instruction in the common case.

In contrast to machine code where the layout of the frame is under complete control of the compiler, in MDIL parts of the frame may be laid out at bind time when the sizes of all value types are known. In other words, some parts of the frame may be variables or parameters whose sizes are not known until bind time. Instead of being able to assign them fixed offsets, and refer to them using these offsets, the compiler assigns them variable numbers and refers to them using these numbers.

Prolog example. Let's look at a simple prolog example and discuss the pseudo instructions occurring in it:

```
0000 b2          EBP_FRAME
0001 b4 07       PUSH_REGS                  ebx, esi , edi
0003 a7 04       LOCAL_BLOCK                04 (defines var#0)
0005 a7 04       LOCAL_BLOCK                04 (defines var#1)
0007 b8 00       FRAME_SIZE                 00
0009 02 8b da    mov                        ebx,edx
000c 72          REF_BIRTH_EBX
000d 8d          START_FULLY_INTERRUPTIBLE
```

In this example:
The EBP_FRAME pseudo instruction indicates that an ebp frame is to be used. It generates the simple sequence "push ebp; mov ebp, esp", and it also generates information in the side tables marking this method as having an ebp frame.
The PUSH_REGS pseudo instruction pushes the callee-saved registers on the stack, and it also generates information in the side tables to reflect which registers where saved.
The two LOCAL_BLOCK instructions reserve space in the stack frame for local variables. In this particular case, the compiler could have calculated the offsets itself, as all the locals are of a fixed, known size.
The FRAME_SIZE instruction reserves space for locals allocated by the compiler (rather than the binder). There is a restriction that all LOCAL_BLOCK/LOCAL_STRUCT instructions must occur before FRAME_SIZE, so when encountering FRAME_SIZE, the binder knows that it can allocate all locals and compute the final stack frame size. It takes this opportunity to decrement esp by an appropriate amount, and to reflect the final stack frame size in the side tables.

The mov ebx,edx instruction simply copies an incoming to a callee-saved register.
The REF_BIRTH_EBX instruction marks this register as containing a gc reference (see section on gc info).
Finally, the START_FULLY_INTERRUPTIBLE instruction serves to mark the end of the prolog. There is also an END_PROLOG instruction for use in partially interruptible code.

Prolog and epilog instructions. As to symbolic stack layout:
LOCAL_BLOCK (opcode 0A7h)<MDIL immediate>: This reserves a block of local storage and assigns it a variable number. The immediate is just the number of bytes to be reserved. Compilers generally cannot assume consecutive local blocks are contiguous (i.e. without intervening padding) or even necessarily allocated in the order given.
LOCAL_STRUCT (opcode 0A8h)<MDIL type token>: This reserves a block of local storage for a value type given by the type token. The binder will compute the size of the type and reserve appropriately sized local block. Again, a variable number is assigned by which the compiler can reference the local block.
PARAM_BLOCK (opcode 0AAh)<MDIL immediate>: This reserves a block of parameter space. Again there is a variable number assigned.
PARAM_STRUCT (opcode 0ABh)<MDIL type token>: This reserves a block of parameter space for a parameter of the type given by the type token. Again, there is a variable number assigned.
PRESERVE_REGISTER_ACROSS_PROLOG (opcode 0D0h)<byte register> Allocate a local var and store the value of the specified register into that local var *as* part of the prolog of the function.
As to information about the frame:
ARG_COUNT (opcode 0B1h)<MDIL immediate>: This gives the number of argument dwords (or qwords in the case of x64) allocated by the compiler (i.e. not declared by PARAM_BLOCK or PARAM_STRUCT pseudo instructions).
EBP_FRAME (opcode 0B2h): Set up an ebp frame.
DOUBLE_ALIGN_ESP (opcode 0B3h): Align esp downwards to a multiple of 8 bytes. This implies that locals will be addressed based on esp, while parameters will be addressed via ebp. This implies that EBP_FRAME must have occurred before. This instruction is useful for floating point code with heavily used locals of type double.
PUSH_REGS (opcode 0B4h)<byte register mask>: Push callee saved registers. The bits in the byte mask are assigned as follows:
Bit 0: EBX/RBX is pushed if this bit is 1
Bit 1: ESI/RSI
Bit 2: EDI/RDI
Bit 3: EBP/RBP
Bit 4: R12
Bit 5: R13
Bit 6: R14
Bit 7: R15
If the EBP_FRAME pseudo instruction occurred before, bit 3 should not be set in the register mask.
SAVE_REG (opcode 0B5h)<byte register> <MDIL immediate>: save callee-saved register into an offset in the stack frame. This is only used in x64 code.
SAVE_XMMREG (opcode 0B6h)<byte register> <MDIL immediate>: save callee-saved xmm register into an offset in the stack frame. This is only used in x64 code.

FRAME_PTR (opcode 0B7h)<byte>: establish frame pointer in x64 code. Byte follows encoding frame pointer register in the low 4 bits and offset from rsp in the high 4 bits (in units of 16 bytes).

FRAME_SIZE (opcode 0B8h)<MDIL immediate>: The immediate is the size in bytes of the part of the local frame allocated by the compiler, i.e. not including any reservations via LOCAL_BLOCK or LOCAL_STRUCT.

SECURITY_OBJECT (opcode 0BDh)<MDIL immediate>: The frame contains a pointer-sized "security object", and the immediate is its offset. Potential change: the offset is actually constrained by the CLR and so the offset is redundant and may be eliminated.

GS_COOKIE_OFFSET (opcode 0BEh)<MDIL immediate>: The frame contains a "gs cookie" (safeguard against stack overwrite exploits). The immediate gives its offset.

LOCALLOC_USED (opcode 0BFh): The routine makes use of allocations on the stack (localloc, or _alloca in C parlance).

VAR_ARGS (opcode 0C0h): The routine has a variable argument list.

PROFILER_CALLBACKS (opcode 0C1h): The routine contains profiler callbacks.

EDIT_AND_CONTINUE (opcode 0C2h): The routine was compiled for edit-and-continue.

SYNC_START (opcode 0C3h): For synchronized routines, where the monitor was entered.

SYNC_END (opcode 0C4h): For synchronized routines, where the monitor was exited.

END_PROLOG (opcode 0B9h): Marks the end of the prolog. At this point, the stack must be walkable by the execution engine.

PINVOKE_RESERVE_FRAME (opcode 0CCh)<mask of registers saved in the ebp frame that are not used in the function> Can only be used in methods that are EBP framed.

PINVOKE_RESERVE_FRAME_WITH_CURRENTMETHOD_DESCRIPTOR (opcode 0CFh) <mask of registers saved in the ebp frame that are not used in the function> <dword local var index of variable containing method descriptor value> Can only be used in methods that are EBP framed. Local var specified must be initialized before the stack walker is permitted to execute.

As to Epilogs, there are a few instructions that generate an epilog or convey information about it:

EPILOG_RET (opcode 0BBh): This is the most frequent form of epilog. It generates instructions to deallocate the stack frame, restore callee-saved registers and return to the calling routine, popping the appropriate amount of parameter space.

EPILOG (opcode 0BAh): This is a form of epilog used for tail calls. It will just deallocate the stack frame and restore the callee-saved registers, but not do the return.

END_EPILOG (opcode 0BCh): this marks the end of the epilog for an epilog started by the EPILOG pseudo instruction. It is not required or permitted for an epilog generated by an EPILOG_RET instruction.

Access to Static Fields

Access to static fields in the CLR is complicated for two main reasons: a class constructor may need to be run before the access is made, and there is a separate copy of the static fields per app domain. To allow some compiler optimization of static access, the access is split into two parts. First, there is a pseudo instruction (taking a type token) that returns the base of the statics for the class designated by the type token. Second, the individual static fields can be referenced with the normal addressing modes you would use to refer to instance fields, but using the base of the statics as a base register.

The first step only has to be done once for a class, i.e. it can be hoisted by a compiler. The CLR optimizes garbage collector performance by separating static fields containing gc pointers from fields containing plain old data. Thus, there are actually two static areas per class, and thus one approach uses two different pseudo instructions to obtain the static base:

GET_STATIC_BASE (opcode 45h)<type token>: This obtains the base of the statics not containing gc pointers (i.e. int, double, bool etc.)

GET_STATIC_BASE_GC (opcode 46h)<type token>: This obtains the base of the statics containing gc pointers. This also includes user-defined struct types.

Both pseudo instructions translate into helper calls and thus must be considered trashing the usual caller-saved registers. For purposes of gc reporting, they must be considered returning an interior pointer in eax.

Static field access example. Here's some simple C# code initializing static fields:

```
static int s__i, s__j;
static string s__s;
static void Init( )
{
    s__i = 42;
    s__j = 137;
    s__s = "Hello";
}
```

Corresponding MDIL code produced by a compiler might look like this:

```
0000 b9                              END_PROLOG
;
;       s__i = 42;
;
0001 45 00 03                        GET_STATIC_BASE 02000003
0004 30 00 00 11 2a                  STORE_IMM
[eax].04000011, 0x2a
;
;       s__j = 137;
;
0009 30 00 00 12 bb 89 00            STORE_IMM
[eax].04000012, 0x89
;
;       s__s = "Hello";
;
```

| | |
|---|---|
| 0010 46 00 03 02000003 | GET_STATIC_BASE_GC |
| 0013 9e 01 00 1b 7000001b | LOAD_STRING ecx, |
| 0017 19 10 00 13 [eax].04000013 | LOAD_ADDR edx, |
| 001b 4b 58 CORINFO_HELP_ASSIGN_REF_ECX ; | HELPER_CALL |
| 001d bb | EPILOG_RET |

Note how the result of the GET_STATIC_BASE pseudo instruction could be used for both integer assignments.

Thread static fields. The CLR also implements thread static fields. Access to them is supported by two pseudo instructions:

GET_THREADSTATIC_BASE (opcode 0CCh)<type token>: get the base of the thread static fields not containing gc pointers for the type designated by <type token>.

GET_THREADSTATIC_BASE_GC (opcode 0CDh) <type token>: get the base of the thread static fields containing gc pointers for the type designated by <type token>.

These pseudo instructions are analogous to GET_STATIC_BASE and GET_STATIC_BASIC_GC in their function and usage.

RVA static fields. CLR supports data fields at absolute addresses within an image, called RVA static fields. Access to them is supported by two MDIL pseudo instructions:

LOAD_RVA_FIELD_ADDR (opcode 0A3h)<byte encoding register> <field token>: load address of RVA field into a register. Next byte encodes the register, field token follows.

LOAD_RVA_FIELD (opcode 0A4h)<byte encoding register> <field token>: load RVA field into a register. Next byte encodes register, field token follows.

These pseudo instructions are analogous to GET_STATIC_BASE and GET_STATIC_BASIC_GC in their function and usage.

Calls. MDIL code has the ability to express calls to either other methods or the runtime system. Here's a list of the MDIL pseudo instructions supporting calls:

CALL (opcode 47h)<method token>: call the method designated by <method token> (this is expressed as a dword in little endian byte order and may be a method def, member ref, or method spec token). The parameters are assumed to be loaded into registers or stored on the stack already, as required by the calling convention.

CALL_VIRT (opcode 48h)<method token>: make a virtual call to the method designated by <method token>. Register eax/rax is assumed to be available as a temp—this fine because no available calling convention uses eax/rax as a parameter register. Note that the actual virtual call mechanism is abstracted by this pseudo instruction, so the implementation is not restricted to use a virtual table implementation.

CALL_INDIRECT (opcode 49h)<address mode>: make an indirect call via the pointer designated by the address mode. The register field of the address mode is used for flags:

CIF_NORMAL (0h): normal operation

CIF_METHOD_TOKEN (1h): method token follows. This variant is used for shared generic code where the method token indicates the intended target of the call.

TAIL_CALL (opcode 4Ah)<method token>: jump to the method designated by <method token>.

HELPER_CALL (opcode 4Bh)<MDIL immediate>: call a runtime helper. The MDIL immediate is the helper number. The list of helper numbers is to be specified.

CONSTRAINT (opcode 4Ch)<type token>: this is a prefix for virtual calls when the compiler was able to figure out the precise runtime type of the type of the this pointer. That type is designated by the type token. In the case of value types, the this pointer refers to an unboxed representation of the type, and thus the binder needs to generate a direct call to the ultimate target method, rather than a virtual call (there is no virtual table to indirect through). This is mostly used in generic code, because in other cases the compiler is usually able to express a call to the ultimate target directly.

CALL_DEF (opcode 4Dh)<method rid word>: this is a more compact encoding of CALL. A word follows (little endian byte order) that encodes the low 16 bits of the method token. The upper 16 bits are assumed to be 0600h. Thus this is a compact way to call methods in the same module, provided the method def token called is in the range 06000000h to 0600FFFFh.

CALL_REF (opcode 4Eh)<method rid word>: this is a more compact encoding of CALL. A word follows (little endian byte order) that encodes the low 16 bits of the method token. The upper 16 bits are assumed to be 0A00h. Thus this is a compact way to call methods in other modules, or methods in generic instantiations, provided the member ref token called is in the range 0A000000h to 0A00FFFFh.

CALL_VIRT_DEF (opcode 4Fh)<method rid word>: more compact encoding of CALL_VIRT. See explanation for CALL_DEF.

CALL_VIRT_REF (opcode 50h)<method rid word>: more compact encoding of CALL_VIRT. See explanation for CALL_REF.

Call example. Here's a small C# example doing some virtual and non-virtual calls:

```
void WriteIntHashCode(int i)
{
    Console.WriteLine(i.GetHashCode( ));
    object o = i;
    Console.WriteLine(o.GetHashCode( ));
}
```

Here's the MDIL code this might get compiled to:

| | | |
|---|---|---|
| 0000 b2 | EBP_FRAME | |
| 0001 b4 02 | PUSH_REGS | esi |

| | | | |
|---|---|---|---|
| 0003 a7 04 | LOCAL_BLOCK | 04 (defines var#0) | |
| 0005 b8 00 | FRAME_SIZE | 00 | |
| 0007 14 d5 05 00 | STORE | [ebp].var#0, edx | |
| 000b b9 | END_PROLOG | | |

```
;
; Console.WriteLine(i.GetHashCode( ));
;
```

| | | | |
|---|---|---|---|
| 000c 19 cd 05 00 | LOAD_ADDR | ecx, [ebp].var#0 | |
| 0010 4e 0c 00 | CALL_REF | 0a00000c ; Int32.GetHashCode | |
| 0013 02 8b c8 | mov | ecx,eax | |
| 0016 4e 0d 00 | CALL_REF | 0a00000d ; Console.writeLine | |

```
;
; object o = i;
;
```

| | | | |
|---|---|---|---|
| 0019 6d c0 09 | ALLOC_OBJECT | 01000009 ; System.Int32 | |
| 001c 02 8b f0 | mov | esi,eax | |
| 001f 13 c5 05 00 | LOAD | eax, [ebp].var#0 | |
| 0023 14 06 ff 09 00 00 01 eax | STORE | [esi].01000009, | |

```
;
; Console.WriteLine(o.GetHashCode( ));
;
```

| | | | |
|---|---|---|---|
| 002a 02 8b ce | mov | ecx,esi | |
| 002d 50 0e 00 | CALL_VIRT_REF | 0a00000e ; Object.GetHashCode | |
| 0030 02 8b c8 | mov | ecx,eax | |
| 0033 4e 0d 00 | CALL_REF | 0a00000d ; Console.writeLine | |
| 0036 bb | EPILOG_RET | | |

Note how the compiler was able to use a non-virtual call at offset 0010, but was unable to do so at offset 002d—a smarter compiler would be able to track the type of the boxed integer and perhaps even eliminate the boxing.

Managed to Native Calls. MDIL code has the ability to generate calls from managed code to native code. This requires emission of mdil instructions in a particular sequence.
1. PINVOKE_LEAVE_RUNTIME instruction.
2. Call instruction, or REMOVEME_CALL_INDIRECT_STACK_ARGUMENT_SIZE instruction followed by CALL_INDIRECT instruction.
3. MDIL or literal machine instructions that do not depend on the being in managed state. It is recommended that the developer restrict themselves to pop instructions.
4. PINVOKE_ENTER_RUNTIME instruction.

Here is a list of the pseudo instructions specific to managed to native call support. These functions may only be used in a function which contained a PINVOKE_RESERVE_FRAME or PINVOKE_RESERVE_FRAME_WITH_CURRENTMETHOD_DESCRIPTOR instruction in the prolog.

PINVOKE_LEAVE_RUNTIME (opcode 0CDh)<byte mask of registers> The mask of registers is the set of registers not in use by mdil code at this point. This mask may contain both preserved and non-preserved registers.

PINVOKE_ENTIRE_RUNTIME (opcode 0CEh)<byte mask of registers> The mask of registers is the set of non-preserved registers not in use by mdil code at this point. The preserved registers from the previous PINVOKE_LEAVE_RUNTIME instruction are assumed to be still available for use.

REMOVEME_CALL_INDIRECT_STACK_ARGUMENT_SIZE (opcode 0D2h)<dword stack argument size> This is an instruction used in the current mdil format to describe the amount of stack space that is logically popped off by the native call made through CALL_INDIRECT. It is hoped to remove this instruction before the MDIL specification is finalized by removing the need for this instruction.

CALL_PINVOKE (opcode 0D1h)<byte register> Call a native method through a methoddescriptor found in the register.

Instructions modified by the pinvoke mechanism are shown below.

CALL_DEF When used as part of a pinvoke call, the call is made to the native function that this function represents instead of to the managed function. This is only useable for DllImport methods.

CALL_REF When used as part of a pinvoke call, the call is made to the native function that this function represents instead of to the managed function. This is only useable for DllImport methods.

CALL When used as part of a pinvoke call, the call is made to the native function that this function represents instead of to the managed function. This is only useable for DllImport methods.

CALL_INDIRECT When used as part of a pinvoke call, this function must be preceded with a REMOVEME_CALL_INDIRECT_STACK_ARGUMENT_SIZE instruction.

Here is an example:

```
[SuppressUnmanagedCodeSecurity]
[DllImport("somedll.dll")]
public static extern unsafe void Function(int x, int y);
public unsafe static void Call Function( )
{
    Function(2, 3);
}
EBP_FRAME
PUSH_REGS esi, edi, ebx
PINVOKE_RESERVE_FRAME (esi, edi, ebx)
FRAME_SIZE 0
END_PROLOG
push 3
push 2
PINVOKE_LEAVE_RUNTIME (eax,ecx,edx,esi,edi,ebx)
CALL_DEF <MethodToken of Function>
PINVOKE_ENTER_RUNTIME (eax,ecx,edx)
EPILOG_RET
```

Here is an example:

```
.method public hidebysig static int64
CallFunctionWithCalli(native int ptr, char* pStr) cil
managed
{
    .maxstack 8
    ldarg.1
    ldarg.0
    calli unmanaged stdcall void(char *)
} // end of method Test: :CallFunctionWithCalli
EBP_FRAME
PUSH_REGS esi, edi, ebx
PINVOKE_RESERVE_FRAME (esi, edi, ebx)
FRAME_SIZE 0
END_PROLOG
push edx
PINVOKE_LEAVE_RUNTIME (eax, esi, edi, ebx)
REMOVEME_CALL_INDIRECT_STACK_ARGUMENT_SIZE 4
CALL_PINVOKE_INDIRECT ecx
PINVOKE_ENTER_RUNTIME (eax, ecx, edx)
EPILOG_RET
```

Jumps

MDIL has a full set of conditional and unconditional jumps just like native machine code does. The reason there are pseudo instructions for this is that the jump distances in the resulting native code are generally different from what they were in the MDIL code. Thus, the jumps need to be processed by the binder and their distances adjusted rather than copied verbatim to the native code output.

It is on the other hand perfectly legal to have native code jumps in the MDIL code, but only if the jump distances are guaranteed not to change. As in native machine code, the jump target is indicated by a signed jump distance measured from the first byte of the next instruction. If possible, the distance is expressed by a signed byte (with the exception of JUMP_LONG where a dword is used always). Otherwise the byte is −1 (or 0FFh) to indicate a dword distance (in little endian order) is following.

MDIL jumps are only allowed within a method—a jump to another method is expressed by the TAIL_CALL pseudo instruction (see chapter on calls).

Here are the jump pseudo instructions that MDIL provides:
JUMP (opcode 051h): unconditional jump
JUMP_LONG (opcode 052h): unconditional jump with a 32-bit distance
JUMP_O (opcode 053h): conditional jump if overflow bit is set
JUMP_NO (opcode 054h): conditional jump if overflow bit is not set
JUMP_ULT (opcode 055h): conditional jump on unsigned <
JUMP_UGE (opcode 056h): conditional jump on unsigned >=
JUMP_EQ (opcode 057h): conditional jump on ==
JUMP_NE (opcode 058h): conditional jump on !=
JUMP_ULE (opcode 059h): conditional jump unsigned <=
JUMP_UGT (opcode 05Ah): conditional jump on unsigned >=
JUMP_S (opcode 05Bh): conditional jump if sign bit is set
JUMP_NS (opcode 05Ch): conditional jump if sign bit is not set
JUMP_PE (opcode 05Dh): conditional jump on parity even
JUMP_PO (opcode 05Eh): conditional jump on parity odd
JUMP_LT (opcode 05Fh): conditional jump on signed <
JUMP_GE (opcode 060h): conditional jump on signed >=
JUMP_LE (opcode 061h): conditional jump on signed <=
JUMP_GT (opcode 062h): conditional jump on signed >
Jump example. Here's some simple C# code:

```
static int compare(uint x, uint y)
{
    if (x == y)
        return 0;
    else if (x < y)
        return −1;
    else
        return 1;
}
```

Here's the resulting MDIL code making use of conditional jumps:

```
0000 b2                 EBP_FRAME
0001 b9                 END_PROLOG
```

```
; if (x == y)
;
0002 02 3b ca           cmp              ecx,edx
0005 58 04              JUMP_NE          0xb
;
;       return 0;
;
0007 02 33 c0           xor              eax,eax
000a bb                 EPILOG_RET
;
; else if (x < y)
;
000b 02 3b ca           cmp              ecx,edx
000e 56 05              JUMP_UGE         0x15
;
;       return −1;
;
0010 03 83 c8 ff        or               eax,ff
0014 bb                 EPILOG_RET
;
;       return 1;
;
0015 05 b8 01 00 00 00  mov
eax, 00000001
001b bb                 EPILOG_RET
```

Note how for the JUMP_NE instruction at offset 0005h the distance is given as 04h bytes, which is to be understood as 4 bytes from the start of the next instruction which is at offset 0007h. Thus the target of this conditional jump is 04h+0007h or 000bh. This is also what the disassembler shows as the jump target.

Loading tokens, strings literals, function pointers, RVA fields etc.

There is a group of MDIL pseudo instructions that allow managed code to refer to data structures maintained by the execution engine:
LOAD_TOKEN (opcode 9Ch)<dest reg byte> <dword token>: this loads a handle to the runtime data structure representing token into a register.
PUSH_TOKEN (opcode 9Dh)<dword token>: this pushes a handle to the runtime data structure representing token on the stack (x86 only).
LOAD_STRING (opcode 9Eh)<dest reg byte> <string token>: this loads a reference to a string literal into the destination register. Possible future change: use the upper bits of <dest reg byte> to represent flags so the compiler can indicate whether the code path is likely to be frequently taken (in this case eager loading of the string literal make sense) or is unlikely to be taken at all (e.g. error path). In the latter case we'll want to delay loading of the string literal.
PUSH_STRING (opcode 9Fh)<temp reg byte> <string token>: push reference to string literal string on the stack—for argument passing (x86 only). A trashable temporary register must be indicated in the <temp reg byte>.
LOAD_FUNCTION (opcode 0A0h)<flags and dest reg byte> <dword method token>: Load the address of the code of the method designated by <method token> into the destination register. The upper nibble of <flags and dest reg byte> contains flags that are only relevant in certain shared generic code scenarios:
LFF_NORMAL (0h): normal operation. In some cases involving shared generic code this will return the address of an "instantiating stub" that loads an instantiation parameter before proceeding to the shared generic code.

LFF_SHARED_CODE (1h): This will provide the actual address of the code, which may in some shared generic cases need an additional instantiation parameter to work correctly.

LOAD_VIRT_FUNCTION (opcode 0A1h)<dest reg byte> <dword method token>: loads the address of a virtual or interface method into a register. The object instance whose virtual method is loaded should be passed in register ecx. Currently this is always implemented via a helper call, and thus dest reg is constrained to be eax, and furthermore, the edx and ecx registers (plus r8-r11 on x64) are trashed.

PUSH_FUNCTION (opcode 0A2h)<dword method token>: similar to LOAD_FUNCTION, except the method address is pushed on the stack, and there are no flags.

LOAD_GS_COOKIE (opcode 0A5h)<dest reg byte>: load the global gs cookie into a register.

LOAD_STATIC_SYNC_OBJ (opcode 0A6h)<dest reg byte>: load a handle to the monitor object for a synchronized static method LOAD_VARARGS_COOKIE (opcode 0C9h)<dest reg byte> <dword member ref token>: This loads the varargs cookie describing the actual parameters for a callsite to a printf-like function.

PUSH_VARARGS_COOKIE (opcode 0CAh)<dword member ref token>: This pushes the varargs cookie describing the actual parameters for a callsite to a printf-like function on the stack (x86 only).

Some of these pseudo instructions accept flags in the upper bits of the token—see discussion of Generics for details.

Exception Handling

Exception handling is supported in MDIL by exception tables similar in spirit to those used in MSIL. The encoding is different though-see below. Exception support is also provided by a local array of pointer-sized variables in the stack frame of any method containing try clauses (there is one element per try-clause nesting level). Some MDIL pseudo instructions related to exceptions are listed here.

Encoding of Exception Tables. The number of exception clauses is given by the MDIL Method Header. Each exception clause consists of six compressed dwords:

A dword containing flags (same flags as in MSIL exception clauses)
A dword containing the MDIL offset of the try-clause
A dword containing the length of the try-clause
A dword containing the MDIL offset of the handler
A dword containing the length of the handler
A dword containing either a type token or a filter offset Each dword is compressed in the sense that it's given as a sequence of bytes in big-endian order, each byte giving 7 bits of the dword to be compressed, and the most significant bit serving as a flag that dword still continues. Thus:

12h is encoded as the single byte 12h
123h is encoded as the two bytes 82h 23h

MDIL pseudo instructions supporting exception handling:

THROW (opcode 63h): Throw exception object passed in register ecx/rcx.

RETHROW (opcode 64h): Rethrow current exception (must occur in a catch clause).

BEGIN_FINALLY (opcode 65h)<distance dword>: push absolute address of label on the stack (x86 only)

END_FINALLY (opcode 66h): pop address from the stack and jump there (trashes eax) (x86 only).

Object Allocation. MDIL has pseudo instructions for object allocation that translate into calls to appropriate helpers:

ALLOC_OBJECT (opcode 6Dh)<type token>: allocates an object with type designated by <type token>. Constructor is to be run via an explicit call to it generated by the compiler.

ALLOC_ARRAY (opcode 6Eh)<type token>: allocates an array of the type designated by <type token>. Number of elements is passed in edx/rdx.

These instructions trash the usual caller-saved registers.

Casting. MDIL has pseudo instructions for casting that translate either to calls to appropriate helpers, or to inline code, or a mixture of both. These instructions all trash the usual caller-saved registers.

ISINST (opcode 69h)<type token>: can object in register edx/rdx be cast to type designated by <type token>? Set eax/rax to input parameter edx/rdx if so, to null if not.

CASTCLASS (opcode 6Ah)<type token>: check if object in register edx/rdx can be cast to type designated by <type token>. Throw exception if not.

BOX (opcode 6Bh)<type token>: allocate a boxed representation for the type designated by <type token>. Copy value referred to by register edx/rdx to it. Return result in eax/rax.

UNBOX (opcode 6Ch)<type token>: check whether the object reference in edx/rdx is in fact a boxed representation of the value type designated by <type token>. If so, return a reference to the contents in eax/rax, otherwise throw exception.

Switches. Native code compilers may apply substantial optimization to switch statements—the best code sequences to use mostly depend on the number of cases and how densely clustered the case label values are. If they are pretty sparse, or there are very few of them, it's usually best to implement switches via sequences of compares and jumps, perhaps combined with a few adds or subtracts. If they are dense, and there are many of them, it's usually best to use an indirect jump via a jump table.

MDIL has special support for table jumps:

The SWITCH (opcode 09Ah) pseudo instruction implements the indirect jump via a jump table. It is followed by a byte indicating the register to be used as an index in the low 4 bits. On x64, another register to be used as a temporary is encoded in the high 4 bits. After this follows a dword (little endian byte order) which is the offset in the constant pool (see chapter on the constant pool below) where the table resides. It is the responsibility of the compiler to check the index register against the bounds of the table.

The SWITCH_TABLE (opcode 09Bh) pseudo instruction implements the jump table itself. It is followed by a dword (little endian byte order) which is the number of entries the jump table is supposed to have. After that follow the contents of the jump table itself—each entry being the MDIL offset within the current method where the entry is supposed to jump.

The binder will take care of generating the appropriate machine code for SWITCH as well as translating the entries in the SWITCH_TABLE to appropriate absolute addresses or offsets. On x64, the MDIL code will give the entries in the SWITCH_TABLE still as dwords representing MDIL offsets, but they will be translated into qwords representing absolute addresses. The compiler should take this into account when computing constant pool offsets.

Switch example. Here's an example of a method using a switch statement in C#, and what the resulting MDIL might look like:

```
            int log2(uint i)
            {
                switch (i)
                {
                    case 1: return 0;
                    case 2: return 1;
                    case 4: return 2;
                    case 8: return 3;
                    case 16: return 4;
                    default: return -1;
                }
            }
```

MDIL code out of a prototype compiler looks like this:

```
0000 b2                              EBP_FRAME
0001 b9                              END_PROLOG
; switch (i)
0002 19 c2 03 ff         LOAD_ADDR   eax, [edx-0x1]; compute i-1
0006 03 83 f8 04         cmp         eax,04 ; i-1 >= 4?
000a 56 06               JUMP_UGE    0x12
000c 9a 00 00 00 00 00   SWITCH      eax, 00000000
0012 03 83 fa 08         cmp         edx,08 ; i == 8 ?
0016 57 1d               JUMP_EQ     0x35
0018 03 83 fa 10         cmp         edx,10 ; i == 16 ?
001c 57 1f               JUMP_EQ     0x3d
001e 51 25               JUMP        0x45
;
; case 1: return 0;
;
0020 02 33 c0                        xor         eax,eax
0023 51 24                           JUMP        0x49
;
; case 2: return 1;
;
0025 05 b8 01 00 00 00              mov         eax,00000001
002b 51 1c                          JUMP        0x49
;
; case 4: return 2;
;
002d 05 b8 02 00 00 00              mov         eax,00000002
0033 51 14                          JUMP        0x49
;
; case 8: return 3;
;
0035 05 b8 03 00 00 00              mov         eax,00000003
003b 51 0c                          JUMP        0x49
;
; case 16: return 4;
;
003d 05 b8 04 00 00 00              mov         eax,00000004
0043 51 04                          JUMP        0x49
;
; default: return -1;
;
0045 03 83 c8 ff                    or          eax,ff
0049 bb                              EPILOG_RET
004a 9b 04 00 00 00 20 00 00 00 25 00 00 00 45 00 00 00 2d 00 00 00
SWITCH_TABLE    4
                0    00000020
                1    00000025
                2    00000045
                3    0000002d
```

Note that the compiler employed a mixed strategy—it implemented cases 1 thru 4 via a jump table, but used explicit compares to check for cases 8 and 16. The switch table therefore had 4 entries. Before jumping through the jump table (using eax as the index register), the compiler made sure the index was in the range 0 . . . 3 using an unsigned comparison against 4.

Entry 0 in the switch table is for the case i==1. It contains the value 020h, which is the MDIL offset of where to jump to. The listing at this offset does indeed contain code to zero out eax and then jump to offset 049h, which is the epilog sequence.

Entry 1 in the switch table is for the case i==2. It contains the value 025h. This offset indeed contains code to load eax with the value 1 and then jump to the epilog sequence.

Entry 2 in the switch table is for the case i==3. It contains the value 045h, which is the offset of the "default" case of the switch. Therefore the code there loads the value -1 into eax (using an or instruction to save code space), and then falls thru to the epilog sequence.

Entry 3 in the switch table is for the case i==4. Thus it jumps to offset 2dh, which loads the value 2 into eax and then jumps to the epilog sequence.

Because the method was very simple, the switch table was at the very beginning of the method's constant pool, thus the offset of the switch table happened to be 0.

Constant pool. MDIL has provisions to declare a region of read-only data in a method. This is used not only to store floating point literals, but also to store jump tables used in switch statements (see the chapter on switches). It could be used as well to store additional constant lookup tables, for instance, to implement switch statements that can be represented as table lookups.

There are two components to the MDIL support for constant data:

- There is a CONST_DATA (opcode 0C8h) pseudo instruction to introduce constant data. It is followed by a dword (little endian byte order) which is a count of actual data bytes that follow.
- There is a special address mode modifier (AM_CONST-POOL) which allows MDIL to reference constant data. This refers to the beginning of the constant pool, so in general an additional AM_SMALLOFFSET or AM_OFFSET modifier will be need to refer to the appropriate offset within the constant pool.

The compiler lays out the constant pool and refers to constant data items using their constpool-relative offsets. As switch tables also go into the constant pool, their sizes are taken into account for this layout as well.

Constant pool example. Here's some simple C# code doing floating point arithmetic:

```
static double sinapprox(double x)
{
    double xsqr = x * x;
    return x * (1.0 + xsqr * ((1.0 / 6.0) + xsqr * (1.0 / 120.0)));
}
```

And here's the MDIL code a compiler might turn this into:

```
0000 aa 08              PARAM_BLOCK   08 (defines var#0)
0002 b8 00              FRAME_SIZE    00
0004 37 c4 05 00        FLD           [esp].var#0
0008 b9                 END_PROLOG
```

-continued

```
;
; double xsqr = x * x;
;
0009 08 d9 c0 d8 c9 d9 c0 d9 c9    fld          st(0)
                                   fmul         st(0),st(1)
                                   fld          st(0)
                                   fxch         st(1)
;
; xsqr * (1.0 / 120.0)
;
0012 38 cc 84 1b                   FMUL         qword ptr
[ConstPool]
;
; ((1.0 / 6.0) + ...
;
0016 38 c4 84 a8 1b                FADD         qword ptr
[ConstPool + 0x8]
;
; xsqr * ...
;
001b 08 de c9 d9 e8 de c1 de c9    fmulp        st(1),st
;
; 1.0 + ...
;
                                   fld1
                                   faddp        st(1),st
;
; x * ...
;
                                   fmulp        st(1),st
0024 bb                            EPILOG_RET
0025 c8 08 00 00 00 11 11 11 11 11 11 81 3f
                                   CONST_DATA   8
                                                11 11 11 11
11 11 81 3f
0032 c8 08 00 00 00 55 55 55 55 55 55 c5 3f
                                   CONST_DATA   8
                                                55 55 55 55
55 55 c5 3f
```

In this example, the double constant 1.0/120.0=0.008333 . . . was placed as the first item in the constant pool (addressed with offset 0), and the double constant 1.0/6.0=0.16666 . . . was placed as the second item (addressed with offset 8). The compiler was smart enough to realize the constant 1.0 could be loaded by a native machine instruction (the fld1 instruction) and thus did not need to be placed into the constant pool.

Write Barriers. Systems with a generational garbage collector generally use some flavor of write barrier to track intergenerational pointers. MDIL has a pseudo instruction STORE_REF (opcode 15h) to express the concept of a write barrier. It takes a source register and a destination address mode just like a regular STORE pseudo instruction would. However, as this pseudo instruction is turned into a helper call behind the scenes, the register conventions are unusual:

On x86, STORE_REF trashes edx. There is also the restriction that the source register stored may not be edx.
On x64, STORE_REF trashes RAX, RCX, RDX, R8.

In addition, no write barrier is required to store a null pointer. In other words, a regular STORE or STORE_IMM pseudo instruction may be used if the value stored is null. Also, no write barrier is required if the destination of the store can be proved by the compiler to be outside the garbage collected heap (i.e. if the destination is on the stack or in unmanaged memory). At the time of writing, an experimental compiler did not generate STORE_REF yet—instead it directly generated the helper calls STORE_REF would turn into.

Versionable Structs

MDIL code may have to deal with value types whose size and layout changes after the compiler has generated code using them. In other words, a compiler generating MDIL code may not make assumptions regarding the size and layout of structs. This is strictly speaking only true for structs defined in other modules—for structs in the current module, the compiler may compute and use a size and layout, provided it communicates the layout decisions by making the struct explicit layout and persisting the field offsets and struct size in CTL.

In the general case, the compiler should generate MDIL code that is robust against changes in size and layout of struct types. This is also to fully support code generation for generics, where the size and layout of generic parameters is unknown to the compiler.

Some features supporting this:
 MDIL immediates have the ability to express the concept of a bind time constant which may not be a constant at compile time, e.g. the size of a struct. This is useful mainly for doing address arithmetic, e.g. for cleaning up the stack after calls or walking arrays of structs using interior pointers.
 Prologs have the ability to add variables of struct type to the stack frame, putting the burden of stack frame layout on the binder to some extent.
 Address modes have the ability to address variables by variable number rather than explicit offset.
 GC info has the ability to make "whole variables" live, i.e. fully defined and valid, with the binder figuring out which embedded fields contain gc pointers which need to be tracked.

There are also some pseudo instructions in MDIL explicitly provided to support versionable structs:
 COPY_STRUCT (opcode 03Fh)<dest addr mode> <source addr mode>: this is an instruction to copy a (struct) type. It copies some struct value from the location given by the source address mode to the location given by the destination address mode. The register field of the destination address mode contains some flags:
  If bit 0 is 1, this means that the binder-generated code for the struct copy may trash the ecx/rcx register. In other, this signals to the binder that ecx/rcx is available as a temp register. If bit 0 is 0, this means ecx/rcx may not be trashed.
  If bit 1 is 1, this means that no write barrier is required for embedded gc pointers. This is true for instance if the destination can be proved by the compiler not to reside on the garbage collected heap (e.g. if the destination is known to be on the stack).
 Registers eax/rax and edx/rax may always be trashed by the binder-generated struct copy code.
 PUSH_STRUCT (opcode 040h)<addr mode>: Push struct at location given by addr mode on the stack. This will also cause the binder to generate appropriate gc info to track changes of esp and pushing of embedded gc pointers. Possible future change: add flags in the register field of the addr mode communicating a temp register that may be used. This instruction is only valid in x86 code.
 INIT_VAR (opcode 0AFh)<MDIL immediate varNum>: this initializes the local variable given by varNum. Possible future change: add a flags byte that communicates which registers may be trashed, whether eax (or some other register) already contains a 0, whether multiple variables need to be initialized etc.
 INIT_STRUCT (opcode 0B0h)<addr mode>: initialize struct at location given by addr mode. Potential future change: add flags in the register field of the addr mode communicating to the binder which temp registers may be used.

Versionable structs may also be viewed as follows. First, versionable structs are value types whose layout can change in versioning, e.g., their size can change, the fields can shift (and with them the position of GC references), new fields can be added, and non-public fields can be removed. Usually versionable structs are from other modules (or other versioning bubbles), but a struct from the same module can also become versionable, e.g. because it embeds versionable structs from other modules. There may be some leeway in deciding which structs are going to be versionable for a particular embodiment. For instance, a struct in another module may be marked as non-versionable by the programmer, or the implementation may decide to keep structs versionable even in the same module for some reason.

Where they occur and what operations need to be supported. Versionable structs can occur as:
- Incoming parameters
- Local variables
- Outgoing parameters
- Return values
- Elements of arrays
- Instance fields in structs or classes
- Static fields
- May have byrefs referring to them
- May have pointers pointing to them Potentially desirable or even required capabilities may include:
- Access fields in a versionable struct, wherever it is stored
- Access the whole struct—copy it, pass it as a parameter
- Box and unbox the struct
- Report GC information
- Do pointer arithmetic in the absence of compiler knowledge of the size of the struct
- Do stack packing of versionable structs, i.e. the compiler should be able to indicate to the binder which structs can occupy the same bytes in the stack frame layout.
- Initialize local versionable structs appropriately.

Incoming parameters. Incoming parameters may be versionable structs. With the usual allocation scheme, only the offset for the first such parameter can be determined by the compiler, subsequent parameters may shift. For this reason, the stack layout for parameters and locals is done in the binding phase, when the sizes of versionable structs are known. Note that this reasoning for parameters only really applies to calling conventions where struct value parameters are pushed on the stack (e.g. the usual convention for x86), for calling conventions where struct value parameters are passed by reference, one doesn't have this challenge for parameters.

One may run into problems if the calling convention passes small structs in registers. If such a struct grows bigger in versioning, it may no longer be passed in a register, so this would affect the register numbers of incoming arguments. It seems complicated to allow this kind of change in versioning, so one may either disallow register-sized structs from growing, or change the calling convention so versionable structs are never passed in registers.

Local variables. Similar considerations apply to local variables of versionable struct type. As their size can change, subsequent local variables would shift in memory. Two ways to solve this problem are either to address these variables via indirections and pay a price in terms of code density and speed, or to defer the physical stack layout to the binding phase, and have the compiler emit a symbolic stack layout rather than a physical one.

Outgoing parameters. This is mainly an issue for x86-like calling conventions, where value types are physically pushed on the stack. Because the size of the parameters can vary, the parameter passing code has to be virtualized, i.e. the actual machine code has to be generated by the binder. Not only that, but the gc info associated with parameter passing (stack depth, where gc references are etc.) has to be also virtualized. On the other hand, when value types are passed by reference, the compiler needs to able to copy the struct to a temp (see below), but there are no additional needs regarding gc info.

Return values. Assuming return values of versionable struct type are always treated as "big value types" where the caller passes a pointer to return value, there are no additional issues here.

Elements of arrays. Arrays of versionable structs are problematic because the sizes of the structs may change and thus the optimal code sequences for indexing into the array may change too. Optimizing compilers may also want use strength reduction when walking such arrays. That means that they must be able to emit instructions to increment or decrement pointers by an immediate value that is known at bind time, but not at compile time.

Instance fields in structs or classes. These don't represent additional issues, given the capability to express the full access path including multiple field tokens in MDIL.

Static fields. As the compiler cannot know how a versionable struct may change in the future, it's problematic if the MDIL code generated for accessing static fields of versionable struct type depends on the layout of the struct. For instance, if a struct wrapping just an int is accessed one way, but a struct containing two ints another way, one has a versioning hole.

Byrefs or pointers referring to versionable structs. No additional issues here—just be able to tell whether one is referring to a boxed struct (in which case the vtable size needs to be added to the field offset), or to an unboxed struct.

Incoming parameters and local variables. One approach describes the stack layout in a symbolic fashion. An additional goal is that determining the physical layout from the symbolic one should require only a simple, linear-time algorithm, as opposed to graph coloring, for example.

Pseudo instructions to describe parameters and locals. The following pseudo instructions are used to describe parameters and locals:
- PARAM_STRUCT <type token> describes an incoming parameter. <type token> can be a typedef, typeref, or typespec token. It can (but does not have to) refer to a versionable struct.
- PARAM_BLOCK <size in bytes> describes a block of stack parameters that don't contain any gc references.
- LOCAL_STRUCT <type token> describes a local variable. Usage of <type token> is the same as for PARAM_STRUCT.
- LOCAL_BLOCK <size in bytes> describes a block of local storage that does not contain any gc references.

Each of these pseudo instructions allocates a block of local storage. The parameters are specified in order of increasing distance from the current stack pointer, i.e. those pushed last by the caller must be specified first. The blocks of storage are assigned variable numbers to allow subsequent MDIL code to refer to them—the first is given variable number 0, the second variable number 1, and so on. Alternately, one could number the arguments as they appear, and use a different number space for locals, at a slight increase in binder complexity. To allow the binder to do code-expansion in one pass, all blocks of local or parameter storage must be specified before referring to any of them. One may consider relaxing this rule for EBP frames.

Also, it's the compiler's responsibility to track ESP changes resulting from any pushes other than PUSH- _STRUCT (see below) and add additional offsets resulting from pushes to ESP relative local variable accesses. Additionally, local space can be allocated using FRAME_SIZE—this space will always be closest to EBP or ESP, so its offset is known to the compiler. This allows compilers to allocate locals of known sizes/layouts together, so efficient code can be generated for initializing those locals etc. Additional provisions are made to describe stack packing—see below.

Referring to parameters and locals. One may add an address mode element that allows one to specify a local variable number. The binder will look up the offset it assigned to that local, and add it to any additional field offsets or explicit offsets specified in the instruction.

Example MDIL Code:

---

EBP_FRAME
PARAM_STRUCT 02000002 (MyStruct)
...
LOAD eax, [ebp].var#0.04000001 (MyStruct.IntField)
...

---

The encoding scheme for address modes can express an arbitrary number of field tokens, e.g. to access a field nested in a field of struct type inside an enclosing struct.

Specifying liveness of parameters and locals. Some pseudo instructions track the liveness of versionable parameters and locals:

REF_BIRTH_LOCAL <variable number> states that a parameter or local becomes live at this instruction boundary in the MDIL code stream. The binder will look at the internal layout of the parameter or local and determine which gc references are now live in the stack frame (if any).

REF_DEATH_LOCAL <variable number> states that a parameter or local becomes dead.

REF_UNTR_LOCAL <variable number> states that a parameter or local is live during the whole duration of the method.

There is an interaction between these liveness instructions, fully interruptible code, and the fact that a COPY_STRUCT pseudo-instruction in general expands to multiple machine instructions. If a local variable is dead before a COPY_STRUCT that targets it, and is live afterwards, the native gc info has to reflect the assignments of gc reference components as they occur—otherwise one would have gc holes if interrupted in the middle of the copy. The only other way is to zero-initialize the struct before it is being assigned, which is wasteful. There is also the reverse case, where a local variable is the source of a COPY_STRUCT, the local is live before the copy, and dead after the copy. In this case correctness is not a concern, but it may be still desirable to mark gc references dead as soon as they have been copied. There are also situations where a finer granularity for gc liveness tracking may be desirable—see "Initializing local structs" below.

Copying versionable structs. There will be cases where a struct has to be copied around. As the compiler does not know the size or layout, it makes use of a new pseudo instruction:

COPY_STRUCT <dest addr mode>, <source addr mode>

The type being copied is implied by the dest or source addr modes (if they both specify a type, they must agree). The binder will expand COPY_STRUCT into a sequence of machine instructions, inserting write barriers and updates to gc info as appropriate. There is an architecture-dependent set of temporary registers trashed by this pseudo-instruction.

Passing versionable structs as (value) parameters. With the usual x86 calling conventions, this involves pushing the versionable struct on the stack. Again, there is a new pseudo instruction that takes care of the details:

PUSH_STRUCT <addr mode>

This will not only emit the necessary machine code to do the pushing, it will also emit gc info to track stack depth, and possibly emit gc info to track liveness of the components of the source.

One may also express how much stack space is consumed by a call—for this purpose, the REF_POP_N and REF_INV_N pseudo instructions are extended to take an MDIL immediate that can also contain bind-time constants like sizes of types—see pointer arithmetic below for details.

Versionable structs as elements of arrays. A difficulty here is that the size of the elements is not known to the compiler, so it cannot emit native code to scale indices. On the other hand, it may be desirable to use the scaling capabilities of the native address modes so unnecessary multiplies can be avoided. For instance, if the size of the array elements is 12, the index should be scaled by 3, and the array access should use an additional scaling factor of 4.

To support this scaling, the following pseudo instructions are supported:

STRUCT_ELEM_SCALE <reg>, <addr mode>, <type token> is used as the initial step in indexing. The size in bytes of the type specified by <type token> is split into two factors, where the first one is 1, 2, 4, or 8. STRUCT_ELEM_SCALE multiplies the contents of <addr mode> by the second factor and puts the result in <reg>.

Indexed address modes support specifying an element type token, and then scale the access by 1, 2, 4, or 8, as appropriate assuming the index has been scaled using STRUCT_ELEM_SCALE.

Examples

Assume the size of the elements turns out to be 4 at bind time. Then STRUCT_ELEM_SCALE does a simple move to the destination register (effectively multiplying by 1), and indexed address modes using this type scale the index by 4.

Assume the size of the elements is 10. The STRUCT_ELEM_SCALE multiplies by 5 (using IMUL, LEA, or shift/add), and indexed address modes scale the index by 2.

Because STRUCT_ELEM_SCALE generates different instructions depending on the actual size of the versionable struct, the state of the machine flags after this instruction is unspecified. In fact, STRUCT_ELEM_SCALE may fail to generate any instructions at all. However, the compiler may assume that multiple copies of STRUCT_ELEM_SCALE instructions with the same index value, the same type token, and the same source value return the same value, i.e. STRUCT_ELEM_SCALE instructions can be CSE'd, moved out of loops, and so on.

Pointer arithmetic. Some implementations support "bind-time-immediates" that can be <immediate constant 0+<sizeof(type1)>*<immediate constant1>+<sizeof(type2)>*<immediate constant2>.... Those can be used in ADD and SUB pseudo instructions, among others. To support adding to registers, one may also support registers as an address mode in pseudo instructions. So, for example, one could generate efficient code for the following loop:

```
MyStruct[ ] a = ...;
for (int i = 0; i < a.Length; i += 2)
{
    ...
}
```

One would generate this pseudo instruction to advance a pointer into the array:
ADD reg, ElementSizeOf(myStruct)*2

The immediate constant would be computed by the binder. Note the use of "ElementSizeof(MyStruct)" instead of "Sizeof(MyStruct)" to make clear one is talking about the distance between two adjacent array elements—the size of MyStruct may well be smaller when embedded as a field in a class or struct. There is a subtle case of pointer arithmetic when calling varargs methods that are passed versionable structs as parameters—in this case, the stack needs to be cleaned up by an amount that cannot be determined by the compiler. However, the amount can also be expressed as an MDIL immediate value that can be computed at bind time. The alignment rules are slightly different though—the sizes of array elements have to be rounded up to a multiple of their alignment, while the size of stack arguments is rounded up to a multiple of 4 bytes or their alignment, whichever is bigger. Thus structs consisting of 1, 2, or 3 bytes are rounded up to 4 bytes on the stack, but not when they are array elements. The intention is to restrict pointer arithmetic to array walking, stack pointer adjustment, and updating the stack gc information after a call (using REF_POP_N and REF_INV_N as described above). It would not be valid to use pointer arithmetic to go from one field in a struct or class to the next field. This is because (as already mentioned above) the same struct may be more tightly packed when it is a field in a class than when it is an element of an array.

Pointers or Byrefs to versionable structs. Nothing additional is required to reference a field from the struct—the field token is specified as usual. To copy or push the whole struct one needs a way to specify what struct type one is referring to. One way to do this is to add a size override address mode component that takes a type token.

Stack packing. This may be done similar to the way one would specify a struct layout in C/C++ using the struct and union keywords. In order to specify that local variables #1 and #2 are live together, but #3 can reuse the same storage, one would basically say:

```
union
{
    struct
    {
        LOCAL_STRUCT      MyFirstStruct  // var#1
        LOCAL_BLOCK            12 bytes         // var#2
    }
        LOCAL_STRUCT      MySecondStruct         // var#3
}
```

Possible pseudo instructions include:

```
struct { ("SEQUENTIAL_GROUP")
union { ("PARALLEL_GROUP")
}           ("END_GROUP")
```

The binder would keep track of the nesting and the current offset within a sequential group, or the maximum offset for a parallel group. One would still specify all these regions up front—the stack packing has no bearing on gc liveness at all, other than the assigned stack offsets.

Initializing local structs. The compiler knows when a local struct becomes live, so it can emit a pseudo instruction to initialize the struct—say INIT_STRUCT <variable number>. It may also know that certain fields are initialized, so there is a potential here for optimization. However, there may be new fields added, so the binder would take responsibility for those. Also, for fully interruptible code the compiler would specify when specific fields become live, so in this case tracking gc liveness on a field granularity level may be desirable.

Example. To illustrate how the pseudo instructions may be used for versionable structs, here is another example. Assume the following declaration is in some other module:

```
struct Pixel
{
public float red, green, blue;
}
```

Assume also the following code using the declaration:

```
class Whatever
{
static void SetPixel(int dummyArg1, int dummyArg2,
        Pixel[ ] a, Pixel p, int index)
{
    a [index] = p;
}
static void TestSetPixel( )
{
    Pixel p;
    p.red = 0f;
    p.blue = 1.0f;
    p.green = 1.0f;
    Pixel[ ] a = new Pixel[10];
    SetPixel(1, 2, a, p, 3);
}
}
```

The compiler would generate the following MDIL code for SetPixel:

```
; Prolog
ARG_COUNT          01                       ; fixed argument
PARAM_STRUCT       01000001 (Pixel)         ; defines var#0
PARAM_STRUCT       1b000001 (Pixel[ ])      ; defines var#1
REF_UNTR_LOCAL     var#0
REF_UNTR_LOCAL     var#1
```

-continued

```
      END_PROLOG
; Range test
      mov              eax,[esp+04]           ; no pseudo instruction
                                              required
      LOAD             edx,var#1              ; need pseudo
                                              instruction here
      CMP              eax, dword ptr [edx].StructArrayLength
      JUMP_UGE         RangeTestFail
; Scale index, copy struct
      STRUCT_ELEM_SCALE        eax, eax, 01000001 (Pixel)
      COPY_STRUCT              [edx.StructArray<01000001>(Pixel) +
      eax*X], var#0
; Epilog
      EPILOG_RET
; Range check error
RangeTestFail:
      HELPER_CALL              CORINFO_HELP_RNGCHKFAIL
      int              3
```

This would be transformed by the binder into:

```
; Prolog
; ARG_COUNT           01                      ; fixed argument
; PARAM_STRUCT        01000001 (Pixel)        -> var#0 @ esp+8
; PARAM_STRUCT        1b000001 (Pixel[ ])     -> var#1 @ esp+20
; REF_UNTR_LOCAL      var#0                   -> gc info
; REF_UNTR_LOCAL      var#1                   -> gc info
; END_PROLOG                                  -> gc info
; Range test
mov                   eax,[esp+04]            ; no pseudo instruction
                                              required
; LOAD                edx,var#1               ; need pseudo
                                              instruction here
mov                   edx, [esp+20]
; CMP                 eax, dword ptr [edx].StructArrayLength
cmp                   eax, dword ptr [edx+4]
; JUMP_UGE            RangeTestFail
jae                   RangeTestFail
; Scale index, copy struct
; STRUCT_ELEM_SCALE eax, eax, 01000001 (Pixel)
lea                   eax, [eax + eax*2]
; COPY_STRUCT         [edx.StructArray<01000001>(Pixel) +
eax*X], var#0
mov                   ecx,[esp+8]
mov                   [edx + eax*4 + 8], ecx
mov                   ecx,[esp+12]
mov                   [edx + eax*4 + 12], ecx
mov                   ecx,[esp+16]
mov                   [edx + eax*4 + 16], ecx
; Epilog
; EPILOG_RET
ret                   20
; Range check error
; HELPER_CALL         CORINFO_HELP_RNGCHKFAIL
call                  JIT_RangeCheckFail
int                   3
```

The following MDIL code would be generated for TestSet-Pixel:

```
; Prolog
EBP_FRAME
LOCAL_STRUCT          01000001 (Pixel)   ; defines var#0
END_PROLOG
; Initialize p
INIT_STRUCT                        var#0 ; this is a redundant
initialization
REF_BIRTH_LOCAL var#0 ; here even though Pixel contains
no gc refs
                                   ; - it may in the future...
fldz
```

```
                -continued
FSTP                  var#0.0a000001 (Pixel.red)
fld1
FSTP                  var#0.0a000002 (Pixel.green)
fld1
FSTP                  var#0.0a000003 (Pixel.blue)
; Allocate a
mov                   edx.0000000a
ALLOC_ARRAY           01000001 (Pixel)
; setPixel(1, 2, a, p, 3)
push                  eax
PUSH_STRUCT           var#0
push                  03
mov                   edx,00000002
lea                   ecx, [edx − 0x1]
CALL_DEF              06000001 (Test.SetPixel)
; Epilog
EPILOG_RET
```

This would be transformed by the binder into:

```
; Prolog
; EBP_FRAME
push                  ebp
mov                   ebp, esp
; LOCAL_STRUCT 01000001 (Pixel)            ; var#0 @ ebp − 12
sub                   esp, 12
; END_PROLOG
; Initialize p
; INIT_STRUCT         var#0
xor                   eax, eax
mov                   [ebp−12], eax
mov                   [ebp−8], eax
mov                   [ebp−4], eax
; REF_BIRTH_LOCAL     var#0               -> gcinfo
fldz
; FSTP                var#0.0a000001 (Pixel.red)
fstp                  [ebp−12]
fld1
; FSTP                var#0.0a000002 (Pixel.green)
fstp                  [ebp−8]
fld1
; FSTP                var#0.0a000003 (Pixel.blue)
fstp                  [ebp−4]
; Allocate a
mov                   edx.0000000a
; ALLOC_ARRAY         01000001 (Pixel)
mov                   ecx, MethodTable(Pixel[ ])
call                  JIT_AllocArray
; setPixel(1, 2, a, p, 3)
push                  eax
; PUSH_STRUCT         var#0
push                  dword ptr [ebp−4]
push                  dword ptr [ebp−8]
```

-continued

```
push        dword ptr [ebp–12]
push        03
mov         edx,00000002
lea         ecx, [edx – 0x1]
; CALL_DEF              06000001 (Test.SetPixel)
call        Test.SetPixel
; Epilog
; EPILOG_RET
mov         esp, ebp
pop         ebp
ret
```

Generics

The features discussed elsewhere on versionable structs also helps for generating generic MDIL code. Rather than generating specialized MDIL code for each instantiation, compilers would generate a few different flavors of the code per type argument—say one for the type argument being some flavor of integral type, another one for the type argument being a reference type, another one for the type argument being a struct type and so on. For a particular instantiation, the binder then picks the right flavor of MDIL code (using the information in the Generic Instance Section), plugs in the type arguments, and generates the final machine code.

Here's a short example of generic C# code:

```
T GetElem<T>(T[ ] a, int i)
{
    return a[i];
}
```

Here's MDIL code that might be generated from it for integral types that fit into integer registers:

```
0000 aa 04              PARAM_BLOCK     04 (defines var#0) ; i
0002 b8 00              FRAME_SIZE      00
0004 02 8b ca           mov   ecx,edx
0007 b9                 END_PROLOG
;
; return a[i];
;
0008 13 c4 05 00        LOAD            eax, [esp].var#0
000c 1d c1 15           CMP             eax, dword ptr
[ecx].StructArrayLength
000f 56 0b              JUMP_UGE        0x1c
0011 2e c0 07 f0 01     ELEM_SCALE      eax, eax, 1b000001
0016 18 41 80 f0 01     LOAD_X          eax,
[ecx.1b000001Array + eax]
;
001b bb                 EPILOG_RET
;
001c 4b 39              HELPER_CALL
   CORINFO_HELP_RNGCHKFAIL
001e 01 cc              int 3
```

Here are "generic" features of this code:

The ELEM_SCALE pseudo instruction prescales the index appropriately. It is supplied with the typespec token 1b000001 in this case which just stands for the formal argument type T. It's up to the binder to plug in T and determine what scaling is required. Strictly speaking, the ELEM_SCALE is not necessary here, because the available integral types are 1, 2, 4, or 8 bytes in size, and thus the CPU scaling abilities are always sufficient.

The LOAD_X pseudo instruction is defined to do the "natural" extend appropriate for the element type. The element type of the array is given as 1B000001 which just means "T". So if the argument type had been "short", for instance, the LOAD_X pseudo instruction would be translated into a movsx machine instruction. Had the argument type been "byte" instead, we'd get a movzx instruction, and had it been "int", we'd just get a mov instruction.

So generally, for generic code the MDIL code is the same for a group of argument types, but the generated native code is different.

Shared Generic Code

For reference types, the generated native code is going to be so similar that it makes sense to share even the native code. So rather than having three separate copies of the native code for say "object", "string" and your own reference type "FooBar", there will be just one copy of it that works for all reference types.

For instance, here's the MDIL code for reference types for the above generic C# example:

```
0000 aa 04              PARAM_BLOCK     04 (defines var#0) ; i
0002 aa 04              PARAM_BLOCK     04 (defines var#1) ;
inst. parameter
0004 b8 00              FRAME_SIZE      00
0006 02 8b ca           mov   ecx,edx
0009 b9                 END_PROLOG
000a 13 c4 05 00        LOAD            eax, [esp].var#0
000e 1d c1 15           CMP             eax, dword ptr
[ecx].StructArrayLength
0011 56 0b              JUMP_UGE        0x1e
0013 2e c0 07 f0 01     ELEM_SCALE      eax, eax, 1b000001
0018 18 41 80 f0 01     LOAD_X          eax,
[ecx.1b000001Array + eax]
001d bb                 EPILOG_RET
001e 4b 39              HELPER_CALL
   CORINFO_HELP_RNGCHKFAIL
0020 01 cc              int 3
```

This is in fact almost exactly the same code as earlier for integral types. The only difference is an additional (but unused) parameter—the comment says "inst. parameter". The reason for this is that there are situations where the native code needs to know the exact instantiation to be able to do the right thing. For instance, if the code wants to allocate a T, or a T[ ] etc., or cast to such a type (where T is a formal argument type), that would be a situation where the native code needs to find out the precise type of T. To allow it to do so, there is a so-called dictionary either attached to the this pointer (in the case of non-generic instance methods on generic reference types), or passed explicitly (in the case of methods on struct types, of generic methods (i.e. where the method itself has type arguments, not just it's enclosing type), or of static methods). This is an example of the instantiation parameter.

To lookup a particular type, field, or method, the native code performs a dictionary lookup. This is abstracted by the MDIL pseudo instruction GENERIC_LOOKUP (opcode 0C5h), followed by a token. As an additional argument, the instantiation parameter is being passed, or, in the case of non-generic instance methods on classes, the method table that the this pointer contains. GENERIC_LOOKUP behaves like a normal helper call in that it trashes the usual caller-saved registers and delivers its result in eax/rax. But it's optimized so that repeated lookups of the same token will not normally perform a call, but just a couple of indirections.

Here's a simple C# example:

```
T[ ] AllocArrayOf<T>(int n)
{
    return new T[n];
}
```

This translates to the following MDIL code (for shared reference types):

```
0000 b4 02              PUSH_REGS          esi
0002 aa 04              PARAM_BLOCK        04 (defines
var#0);inst. parameter
0004 b8 00              FRAME_SIZE         00
0006 02 8b f2           mov                esi,edx
0009 b9                 END_PROLOG
;
; return new T[n];
;
000a 13 cc 05 00        LOAD               ecx, [esp].var#0
000e c5 01 00 00 5b     GENERIC_LOOKUP     5b000001
0013 04 8b c8 8b d6     mov                ecx,eax
                        mov                edx,esi
0018 6e ff 01 00 00 5b  ALLOC_ARRAY        5b000001
;
001e bb                 EPILOG_RET
```

The following observations may be helpful:
The instantiation parameter is loaded into ecx before GENERIC_LOOKUP.
The GENERIC_LOOKUP instruction takes a token of 5b000001. This is just 1b000001 standing for the formal argument type T, plus a flag set in the high bits that modify to rather mean T[ ].
The code leading up to the ALLOC_ARRAY pseudo instruction loads the result of the GENERIC_LOOKUP into ecx. The ALLOC_ARRAY will just be translated into a helper call to the binder, and the result of the GENERIC_LOOKUP is one of the parameters to the helper call.
The ALLOC_ARRAY pseudo instruction has the same token passed to it. Here though the additional flag means "the type has been obtained already from a generic lookup—don't try to load it".
There are other MDIL pseudo instructions that may be used together with GENERIC_LOOKUP—here's a list:
  ALLOC_OBJECT
  ALLOC_ARRAY
  ISINST
  CASTCLASS
  BOX
  UNBOX
  GET_STATIC_BASE
  GET_STATIC_BASE_GC
  GET_THREADSTATIC_BASE
  GET_THREADSTATIC_BASE_GC
  CALL_VIRT (for calls to interface methods)
  LOAD_TOKEN
  PUSH_TOKEN
  LOAD_FUNCTION
  PUSH_FUNCTION
As seen above, the token after GENERIC_LOOKUP may sometimes have additional flags in the upper bits of the token. Here is a list:
  40000000h in the upper bits of a type token means (as seen above): give me an array of this type, not the type itself.
  0C000000h in the upper bits of a method token means: give me an indirection cell I can call through (for calling methods in generic interfaces), as opposed to a handle to a data structure representing the method.
There are also more flags possible on the token of the instruction consuming the result of GENERIC_LOOKUP:
  40000000h in the upper bits instructs the binder that whatever the token stands for has already been loaded by a dictionary lookup (as seen above).
  80000000h in the upper bits means in a sense the opposite—use a static lookup even though this is a token involving type parameters that would normally need a dictionary lookup at runtime. This used mostly to obtain the handle representing the current method in shared generic code.

Generic support may also be viewed as follows. As in IL, the generic types and methods, and associated method bodies are kept in the defining module, and the using module will just refer to them. For placing the native code and supporting data structures for the generic instantiation generated by the binder, one approach follows a strategy similar to what ngen does today.

However, some things are different with MDIL—as the compiler handles calling conventions and register allocation, it makes a difference to the generated code whether the actual generic type arguments are primitive types like int or float, or reference type, or structs. So in general the compiler will generate multiple method bodies for generic methods in MDIL. Discussion below describes how these multiple method bodies are represented and how the binder finds the appropriate method body to expand for a given set of generic type arguments.

Because MDIL may be characterized as being at a slightly higher level than native code, it's possible to hide some differences between different instantiations in MDIL. In other words, more MDIL code is shared between instantiations than native code. On the other hand, the representation of generic types and methods in Microsoft® Compact Type Layout (CTL) is very similar to its counterpart in metadata, some details are changed slightly in CTL. CTL is a way to describe Types—it lists the fields and methods, what the base type is, what virtual methods override methods in the base type and so on.

CTL Additions and Changes. Few changes and additions to CTL are required to represent generic types and methods, and their instantiations. One may generally follow the way generic IL refers to generic types and methods. Thus one may use:
  1. A representation of generic type instantiations. In IL metadata, there are TypeSpec tokens which refer to an IL signature representing the generic instantiation. CTL already has TypeSpecs to represent array types. One may carry over the IL way of representing generic type instantiations, which is reasonably compact. One changes the representation of type references to the CTL representation, but very little else.
     Example: a program might be referring to List<int> using type spec token 1b000002. An entry in the CTL type spec table at index 2 would be referring to something like the following sequence of bytes:
       15//ELEMENT_TYPE_GENERICINST
       12//ELEMENT_TYPE_CLASS
       0E//Compressed representation of type ref 01000003, i.e. List
       01//byte giving the number of type args, 1.
       08//ELEMENT_TYPE_I4
  2. A MemberRef token in IL can refer to a method inside a generic type instantiation. Allow the same thing in CTL.

One may use the external type index to indicate whether the type index refers to an external type or a type spec.

3. A MethodSpec token is the way IL can refer to a generic method instantiation. A method spec token represents the method referred to (as a method def or member ref token), and the type arguments. Similarly to type specs, this is implemented as a new table containing offsets to sequences of bytes in the MDIL code pool. The sequence of bytes represent the method def or member ref token (usual CTL encoding), followed by the number of type arguments and the type arguments themselves.
Example: Code wants to refer to Array.Sort<int>(int [ ] a). This is expressed (say) by the method spec token 2b00003. At index 3 in the new method spec table you will find the offset of the following byte sequence:
12//Compressed rep. of member ref 0a000004 (Array.Sort)
01//byte giving number of type arguments, 1.
08//ELEMENT_TYPE_I4

One may also need a way for a generic type or method to indicate the number of type arguments. This may be used mostly for error checking and dumping the CTL, so it may not be strictly speaking necessary.

Representing generic method bodies. As mentioned above, there may be multiple MDIL method bodies for the same IL method body. To express for each MDIL method body what kinds of type arguments it should apply to, one may categorize runtime types. One way to do this is to use the CorElementType. This assumes that the MDIL code for say ELEMENT_TYPE_I1 could well be different from the MDIL code for ELEMENT_TYPE_U2, but the code for all ELEMENT_TYPE_VALUETYPE instances is the same (there are some complications to this described below).

The categorization proposed splits the space of possible argument types finely—in general generate the same MDIL body for types that behave similarly (they can be stored in the same registers, passed in the same way etc.). Thus, rather than have an MDIL method body per CorElementType per generic type argument, allow the compiler to specify a set of CorElementTypes per generic type argument that a given MDIL method body is valid for. The CorElementType encodings that need to be supported are all numerically less than 32, so a set of CorElementTypes can be conveniently represented in a single DWORD. Using the sets, one can also efficiently support the situation where the MDIL bodies don't depend at all on one or more type arguments.

Putting it all together, one may use a data structure for each generic method containing:
The number of type arguments
The number of different MDIL flavors of this particular method
For each flavor, one wants
   For each type argument, the set of CorElementTypes that are valid
   The MDIL code offset
So, in a C-like pseudo code, define a data structure like this:

```
struct MdilGenericMethodDesc
{
    unsigned short m_flavorCount;
    unsigned char  m_typeArgCount;
    typedef   DWORD CorElementTypeSet;
    struct FlavorDesc
    {
        CorElementTypeSet
        m_typeSet[m_typeArgCount];
```

-continued

```
        DWORD           m_mdilCodeOffs;
    };
    FlavorDesc       m_flavorTable[m_flavorCount];
};
```

The table that maps method def tokens to the MDIL code offset of their implementation points to the offset of a MdilGenericMethodDesc instead. Set the high bit of the offset to indicate that the method body is generic, i.e. that the offset refers to a MdilGenericMethodDesc rather than directly to a MDIL method body.

Note that it's allowable for two entries in m_flavorTable to have the exact same m_mdilCodeOffs. This will indeed often happen if the compiler is smart enough to merge identical MDIL method bodies, and the regions with identical bodies don't have a nice, "rectangular" shape. Note also that one may do a sequential search of the m_flavorTable and pick the first entry that matches. That makes it possible to have highly specialized and optimized bodies first, followed by slower "catch-all" bodies.

Example—a dump of this data structure for a particular method might look like this (each line gives the offset and size of a generic method body, followed by the set(s) of CorElementTypes it's applicable for—this is output from a prototype implementation):

```
7 Instances for generic method 06001a39 - 7 unique
bodies totaling 223 bytes
    001f955f( 32): 000000fc 000000fc //
    <bool..ushort;bool..ushort>
    001fe4c6( 34): 000000fc c0863f00 //
    <bool..ushort;struct,float...>
    001f72ed( 26): 00040300 000000fc //
    <ref,int;bool..ushort>
    000741aa( 28): 00040300 c0863f00 //
    <ref,int;struct,float...>
    002093e7( 34): c0823c00 000000fc //
    <struct,float...;bool..ushort>
    00214a1a( 28): c0823c00 00040300 //
    <struct,float...;ref,int>
    00210a9c( 41): c0823c00 c0823c00 //
    <struct,float...;struct,float...>
```

Note that the bit masks 80000000, 40000000 and 00800000 don't really correspond to CorElementTypes that make sense here. This is because at the time bodies on struct were further split up to handle the special cases of Nullable<T> and of generic structs that contain gc refs and thus need shared implementations. One may eliminate these distinctions.

Generic MDIL code. Some MDIL instructions allow one to abstract from the specific instantiation type argument in many situations. This allows the compiler to cut down on the number of method body flavors it needs to generate. Of course there is a tradeoff—generating more specific code will sometimes allow more optimizations.

Here is a list of some MDIL instructions that help support generic code:

1. Related to structs and symbolic stack layout:

```
LOCAL_BLOCK <number of bytes> // define local var
LOCAL_STRUCT <type token>
PARAM_BLOCK <number of bytes> // define stack
```

```
param
PARAM_STRUCT <type token>
COPY_STRUCT <dest addr mode>,<src addr
mode>[,flags]
PUSH_STRUCT <addr mode>[,temp reg]
REF_BIRTH_LOCAL var#
REF_DEATH_LOCAL var#
REF_UNTR_LOCAL var#
INIT_LOCAL var#
INIT_STRUCT <addr mode>
REF_BIRTH_REG <type token>
```

2. Abstractions for primitive types

```
LOAD_X reg,<addr mode>  // zero, sign extend or
just load
LOAD_RESULT <addr mode>  // load value into eax,
(eax,edx), or st(0)
STORE_RESULT <addr mode>
PUSH_RESULT <addr mode>
DISCARD_RESULT    <addr mode>     // pop fpu
stack
vREF_BIRTH_REG <type token> // liveness
information - only generates gc info if <type
token> is a ref type
STORE_REF <addr mode>, reg // store, inserting
wb if necessary
```

3. Abstractions for shared/non-shared code

```
INST_ARG      <reg or stack>,<reg or stack> //
indicates where the instantiation argument is
passed, and what to do with it - no-op for
unshared code.
LOAD_INST reg, <method token> // pass
instantiation arg, no-op for unshared code
PUSH_INST <method token>
```

4. Abstractions for Nullable types

```
UNBOX   <temp var#>,<typeToken> // unbox
instance
in ecx, using <temp var#> as storage, leave ref
to result in eax
COND_LOCAL <type token> // reserve local space
```

-continued conditionally (say only if <type token> is

Nullable<T>)

Some examples of generic MDIL code. Here are some simple examples of generic MDIL code. First, assume the following C# code:

```
struct Pair<T,U>
{
    T   first;
    U   second;
    internal Pair(T t, U u)
    {
        first = t;
        second = u;
    }
    T First
    {
        get
        {
            return first;
        }
        set
        {
            first = value;
        }
    }
    U Second
    {
        get
        {
            return second;
        }
        set
        {
            second = value;
        }
    }
}
```

The MDIL code for the constructor might look like this (where T is some integral type, and U is any type):

```
a8 f0 03                PARAM_STRUCT       1b000003 (defines
var#0)
b2 00                   FRAME_SIZE         00
88 00                   REF_UNTR_LOCAL     var#0
b3                      END_PROLOG
14 11 c0 04             STORE              [ecx].0a000004, edx
3c 01 c0 05 c4 05 00    COPY_STRUCT
[ecx].0a000005,[esp].var#0
b5                      EPILOG_RET
```

This flavor is only applicable if T is passed in a register, and U is not. So there would be other flavors in some impolementations, for example in case T is passed on the stack, and U is passed in EDX:

| | | |
|---|---|---|
| b1 01 | PUSH_REGS | ebx |
| a8 f0 02 | PARAM_STRUCT | 1b000002 (defines var#0) |
| b2 00 | FRAME_SIZE | 00 |
| 88 00 | REF_UNTR_LOCAL | var#0 |
| 02 8b da | mov | ebx,edx |
| b3 | END_PROLOG | |
| 3c 01 c0 04 c4 05 00 | COPY_STRUCT | [ecx].0a000004,[esp].var#0 |
| 14 19 c0 05 | STORE | [ecx].0a000005, ebx |
| b5 | EPILOG_RET | |

There is yet another flavor in case both parameters are passed on the stack:

| | | |
|---|---|---|
| a8 f0 02 | PARAM_STRUCT | 1b000002 (defines var#0) |
| a8 f0 03 | PARAM_STRUCT | 1b000003 (defines var#1) |
| b2 00 | FRAME_SIZE | 00 |
| 88 00 | REF_UNTR_LOCAL | var#0 |
| 88 08 | REF_UNTR_LOCAL | var#1 |
| b3 | END_PROLOG | |
| 3c 01 c0 04 c4 05 00 | COPY_STRUCT | [ecx].0a000004,[esp].var#0 |
| 3c 01 c0 05 c4 05 01 | COPY_STRUCT | [ecx].0a000005,[esp].var#1 |
| b5 | EPILOG_RET | |

On the other hand, some methods don't depend on some type arguments at all—for instance, the property getter get_First gets this MDIL body for T of integral or reference type:

| | | |
|---|---|---|
| b3 | END_PROLOG | |
| 18 01 c0 04 | LOAD_X | eax, [ecx].0a000004 |
| b5 | EPILOG_RET | |

One could also make use of LOAD_RESULT mentioned above and subsume long/ulong and float/double type arguments as well. In all cases above, the type of U does not matter.

Here's a generic stack example:

```
class Stack<A>
{
    int nitems;
    A[ ] items;
    public Stack( )
    {
        nitems = 0;
        items = new A[10];
```

-continued

```
    }
    public void Push(A item)
    {
        items[nitems++] = item;
    }
    public A Pop( )
    {
        return items[--nitems];
    }
    bool IsEmpty( )
    {
        return nitems == 0;
    }
}
```

Both the constructor and IsEmpty don't depend on the specific CorElementType of the type argument at all, and thus are not as interesting. Here's the method body for Push, applicable if A is an integral type:

| | | |
|---|---|---|
| b1 06 | PUSH_REGS | esi, edi |
| b3 | END_PROLOG | |
| 18 31 c0 05 | LOAD_X | esi, [ecx].0a000005 |
| 18 39 c0 04 | LOAD_X | edi, [ecx].0a000004 |
| 19 c7 21 | LOAD_ADDR | eax, [edi + 0x1] |
| 14 01 c0 04 | STORE | [ecx].0a000004, eax |
| 1d fe 15 | CMP | edi, dword ptr [esi].StructArrayLength |
| 53 0b | JUMP_UGE | 0x22 |
| 2e c7 07 f0 02 | ELEM_SCALE | eax, edi, 1b000002 |

| | | |
|---|---|---|
| 14 56 80 f0 02 | STORE | [esi.1b000002Array + eax], edx |
| b5 | EPILOG_RET | |
| 48 39 | HELPER_CALL | CORINFO_HELP_RNGCHKFAIL |
| 01 cc | int 3 | |

Note there are some inefficiencies/idiosyncrasies here that could be eliminated:
- The two LOAD_X instructions should really be LOAD (but this doesn't really matter).
- The ELEM_SCALE instruction can be eliminated (if the parameter is passed in EDX, this implies its size is 1, 2, or 4).

In case the parameter gets passed on the stack, we'd have something like this:

| | | |
|---|---|---|
| b1 06 | PUSH_REGS | esi, edi |
| a8 f0 02 | PARAM_STRUCT | 1b000002 (defines var#0) |
| b2 00 | FRAME_SIZE | 00 |
| 88 00 | REF_UNTR_LOCAL | var#0 |
| b3 | END_PROLOG | |
| 18 31 c0 05 | LOAD_X | esi, [ecx].0a000005 |
| 18 39 c0 04 | LOAD_X | edi, [ecx].0a000004 |
| 19 c7 21 | LOAD_ADDR | eax, [edi + 0x1] |
| 14 01 c0 04 | STORE | [ecx].0a000004, eax |
| 1d fe 15 | CMP | edi, dword ptr [esi].StructArrayLength |
| 53 0e | JUMP_UGE | 0x2c |
| 2e c7 07 f0 02 | ELEM_SCALE | eax, edi, 1b000002 |
| 3c 46 80 f0 02 c4 05 00 | COPY_STRUCT | [esi.1b000002Array + eax],[esp].var#0 |
| b5 | EPILOG_RET | |
| 48 39 | HELPER_CALL | CORINFO_HELP_RNGCHKFAIL |
| 01 cc | int 3 | |

Multidimensional Arrays

Creating Multidimensional Arrays. Even though C# syntax for creating multidimensional arrays is straightforward and similar to single-dimensional arrays, the MSIL created for it by the compiler is quite different. For instance, this fragment of C# code:

double [,] m=new double [10, 20];

will generate the following MSIL code:

| | | |
|---|---|---|
| IL_0000: | ldc.i4.s | 10 |
| IL_0002: | ldc.i4.s | 20 |
| IL_0004: | newobj | instance void float64[0...,0...]/*1B000003*/::.ctor(int32, int32) /* 0A000015 */ |
| IL_0009: | stloc.0 | |

So this looks much more like new-ing a regular object than it does like allocating a single-dimensional array.

In MDIL code, a helper should be called with the bounds as arguments, along with handles referring to the desired type and the constructor method. The helper has a variable argument list, so the caller should clean up the stack. This gives the following code sequence (this is fully interruptible code in the bigger method it came from):

...

;
; double[,] m = new double [10, 20];
;

| | | |
|---|---|---|
| 0008 02 6a 0a | push | 0a |
| 000b 92 | NONREF_PUSH | |
| 000c 02 6a 14 | push | 14 |
| 000f 92 | NONREF_PUSH | |
| 0010 9d 15 00 00 0a | PUSH_TOKEN | 0a000015 |
| 0015 92 | NONREF_PUSH | |
| 0016 9d 03 00 00 1b | PUSH_TOKEN | 1b000003 |
| 001b 92 | NONREF_PUSH | |
| 001c 4b 1e | HELPER_CALL | CORINFO_HELP_NEW_MDARR_NO_LBOUNDS |
| 001e 6f | REF_BIRTH_EAX | |
| 001f 98 10 | REF_INV_N | 10 ; invalidate 4 dwords on stack |
| 0021 03 83 c4 10 | add | esp,10 |
| 0025 97 10 | REF_POP_N | 10 ; pop 4 dwords from stack |
| 0027 02 8b d8 | mov | ebx,eax ; ebx contains m |

Accessing Bounds of Multidimensional Arrays. In the CLR, multidimensional arrays have a lower bound and a length in each dimension. As noted in the discussion of address modes, there is an address mode modifier AM_MDIM_ARRAY_LEN that allows one to access the lower bounds and the length in each dimension. A following MdimArrayByte specifies the array's rank and element type, and a MdimBoundByte specifies which dimension and whether to access the low bound or the length in that dimension.

Accessing Elements of Multidimensional Arrays. In MDIL, this involves computing a "flattened index", as it were, i.e. an index where the fact that the array is really multidimensional has disappeared. The index in each dimension thus is multiplied by the number of sub-elements in that dimension, and at the end, one adds up all these scaled indices. For instance, the statement in the example above allocates a rectangular matrix with 10 rows and 20 columns. If you index into this array, the row index is multiplied by the number of columns, and to that, one adds the column index.

Multidimensional Array Example

Here's an example of two nested for-loops running through the matrix allocated above—the C# code looks like this:

```
double[,] mdim( )
{
    double[,] m = new double[10, 20];
    for (int i = 0; i < 10; i++)
    {
        for (int j = 0; j < 20; j++)
        {
            m[i, j] = 1.0/(i+j+1);
        }
    }
    return m;
}
```

The generated MDIL might look like this (without much optimization)—starting with the matrix allocation:

```
0000 b2                  EBP_FRAME
0001 b4 07               PUSH_REGS              ebx, esi, edi
0003 a7 04               LOCAL_BLOCK            04 (defines var#0)
0005 b8 00               FRAME_SIZE             00
0007 8d                  START_FULLY_INTERRUPTIBLE
;
; double[,] m = new double[10, 20];
;
0008 02 6a 0a            push                   0a
000b 92                  NONREF_PUSH
000c 02 6a 14            push                   14
000f 92                  NONREF_PUSH
0010 9d 15 00 00 0a      PUSH_TOKEN             0a000015
0015 92                  NONREF_PUSH
0016 9d 03 00 00 1b      PUSH_TOKEN             1b000003
001b 92                  NONREF_PUSH
001c 4b 1e               HELPER_CALL
CORINFO_HELP_NEW_MDARR_NO_LBOUNDS
001e 6f                  REF_BIRTH_EAX
001f 98 10               REF_INV_N              10
0021 03 83 c4 10         add                    esp,10
0025 97 10               REF_POP_N              10
0027 02 8b d8            mov                    ebx,eax  ; m is in ebx
002a 72                  REF_BIRTH_EBX
```

Next come the loops:

```
;
; for (int i = 0; i < 10; i++)
;
002b 02 33 ff            xor                    edi,edi   ; i is in edi
002e 77                  REF_DEATH_EAX
;
;   for (int j = 0; j < 20; j++)
;
002f 02 33 f6            xor                    esi,esi   ; j is in esi
;
;     m[i, j] = 1.0/(i+j+1);
;
0032 04 8b c7 8b d6      mov                    eax,edi
                         mov                    edx,esi
; compute i - m.GetLowBound(0) & range check
0037 1f c3 17 62 00      SUB
    eax,[ebx].QWordArrayRank2.LowBound0
003c 1d c3 17 62 20      CMP
    eax,[ebx].QWordArrayRank2.Length0
0041 56 41               JUMP_UGE               0x84
; compute j - m.GetLowBound(1) & range check
0043 1f d3 17 62 01      SUB
    edx,[ebx].QWordArrayRank2.LowBound1
0048 1d d3 17 62 21      CMP
    edx,[ebx].QWordArrayRank2.Length1
004d 56 35               JUMP_UGE               0x7a
; compute flat index as (i-
m.GetLowBound(0))*m.GetLength(1)
;                      + (j - m.GetLowBound(1))
004f 2c c3 17 62 21      IMUL
    eax,[ebx].QWordArrayRank2.Length1
0054 02 03 c2            add                    eax,edx
; compute 1.0/(i+j+1)
0057 19 d7 82 06 21      LOAD_ADDR              edx,byte ptr [edi +
esi*1 + 0x1]
005c 14 d5 05 00         STORE                  [ebp].var#0, edx
0060 39 c5 05 00         ILOAD_FPU              [ebp].var#0
0064 04 d9 e8 de f1      fld1
                         fdivrp                 st(1),st
; store into m[i,j]
0069 37 5b c0 62         FSTP                   qword ptr
[ebx.QWordArrayRank2 + eax*8]
;     for (int j = 0; j < 20; j++)
;
006d 06 83 c6 01 83 fe 14
                         add                    esi,01
                         cmp                    esi,14
```

-continued

```
0074 5f bc               JUMP_LT                0x32
;
; for (int i = 0; i < 10; i++)
;
0076 06 83 c7 01 83 ff 0a
                         add                    edi,01
                         cmp                    edi,0a
007d 5f af               JUMP_LT                0x2e
```

Finally is the return sequence, and range checking:

```
;
; return m;
;
007f 02 8b c3            mov                    eax,ebx
0082 6f                  REF_BIRTH_EAX
;
0083 bb                  EPILOG_RET
; raise range check exception
0084 77                  REF_DEATH_EAX
0085 7a                  REF_DEATH_EBX
0086 4b 39               HELPER_CALL
    CORINFO_HELP_RNGCHKFAIL
0088 01 cc                int 3
```

As the prototype compiler doesn't generate MDIL for accessing multidimensional array low bounds and lengths, this MDIL disassembly listing has been heavily edited by hand. Thus, there may be mistakes in some of the details. Other examples herein may also be only partially verified, and are not necessarily generated by existing code generators.

This sort of loop is amenable to many compiler optimizations. For instance, range checks are not really necessary in this loop, one can use induction variables to eliminate the index computations, the inner loop can be unrolled to some extent, and so on.

A Code Example

Consider now an example illustrating how fields and methods are declared and accessed. We begin with the following C# source code:

```
using System;
public struct MyStruct
{
    public int intField;
    public double doubleField;
}
public class BaseClass
{
    public int intField;
    public double doubleField;
    private MyStruct structField;
    private bool boolField;
    public virtual int FirstVirtual( )
    {
        return 42;
    }
    public virtual int SecondVirtual( )
    {
        return 137;
    }
}
```

This source code 120 gets compiled by one compilation system into binary intermediate code 202. A partial disassembly of the intermediate code follows, annotated by comments. Comments are marked by H. Whitespace has also been modified in code listings herein, to facilitate compliance with patent document format guidelines.

```
External modules referenced: 1: mscorlib
Type Refs: module ( name ) typedef token
    01000001:  1 ( mscorlib ) 02000009 // System.ValueType
    01000002:  1 ( mscorlib ) 02000002 // System.Object
*** Types ***
// describes type MyStruct, gives it symbolic token 02000002
StartType 02000002 flags = 100109 baseTypeToken = 01000001
// derives from System.ValueType
        fieldCount = 2
        // this describes the intField in MyStruct
        Field 04000001 storage = instance protection = public
type = int
        // this describes the doubleField in MyStruct
        Field 04000002 storage = instance protection = public
type = double
EndType
// describes BaseClass, gives it symbolic token 02000003
StartType 02000003 flags = 100001 baseTypeToken = 01000002
// derives from System.Object
        fieldCount = 4
        methodCount = 3
        newVirtualMethodCount = 2
        // this describes the doubleField in BaseClass
        Field 04000004 storage = instance protection = public
type = double
        // this describes the intField in BaseClass
        Field 04000003 storage = instance protection = public
type = int
        // this describes the boolField in BaseClass
        Field 04000006 storage = instance protection = private
type = bool
        // this describes the structField in BaseClass - note
reference to
        // symbolic type token 02000002
        Field 04000005 storage = instance protection = private
type = valuetype
            valueTypeToken = 02000002
        // this describes method FirstVirtual
        Method 06000001 attrs = 1c6 (public, virtual) flags =
0 hints = 800
        // this describes method SecondVirtual
        Method 06000002 attrs = 1c6 (public, virtual) flags =
0 hints = 800
        // this describes a compiler-generated constructor method
        Method 06000003 attrs = 1886 (public) flags = 0 hints =
830
```

```
EndType
// intermediate code for method 06000001 (FirstVirtual)
0000 b9                              END_PROLOG
0001 05 b8 2a 00 00 00               mov   eax,0000002a
0007 bb                              EPILOG_RET
// intermediate code for method 06000002 (SecondVirtual)
0000 b9                              END_PROLOG
0001 05 b8 89 00 00 00               mov   eax,00000089
0007 bb                              EPILOG_RET
// intermediate code for method 06000003 (compiler-generated
constructor)
0000 b9                              END_PROLOG
0001 bb                              EPILOG_RET
```

The following may be noted. All modules in the compilation system have a compiler-generated reference to the lowest level library (mscorlib). The type system in this example distinguishes between reference types (those derived directly or indirectly from System.Object), and value types (those derived from System.ValueType). Of perhaps greater interest with regard to resilience and other topics also discussed elsewhere herein, there are several kinds of symbolic tokens in the system in this example. Tokens starting with 01 . . . are called typeref tokens and refer to types from other modules. This is done via a table that contains the number of the other module, followed by the type token in that module. Tokens starting with 02 . . . are called typedef tokens and refer to types in this module (the types are numbered, starting from 02000002, type 02000001 is reserved). Tokens starting with 04 . . . are called fielddef tokens and refer to fields in this module (all the fields are numbered, starting from 04000001). Tokens starting with 06 . . . are called methoddef tokens and refer to methods in this module (all the methods are numbered, starting from 06000001). Tokens starting with 0A . . . are called memberref tokens and refer to fields or methods from other modules. This is done via a table that contains the containing type (usually a typeref token), a bit indicating whether a field or method is being referenced, and an ordinal that encodes the number of the referenced field or method token relative to the lowest field or method token contained in the type.

Here is the C# source code of another module referencing types and methods from the first module:

```
using System;
class DerivedClass : BaseClass
{
    int intField2;
    public override int SecondVirtual( )
    {
        return 3;
    }
    static void Main( )
    {
        DerivedClass d = new DerivedClass( );
        d.FirstVirtual( );
        d.SecondVirtual( );
        d.intField = 1;
        d.intField2 = 2;
        MyStruct ms1;
        ms1.intField = 42;
        ms1.doubleField = 3.141592;
        MyStruct ms2 = ms1;
    }
}
```

Shown below is a partial disassembly of the intermediate code 202 the foregoing source code compiles to. The code 202 in this example begins with module, type, and member references:

External modules referenced:

```
External modules referenced:
    1 a // this is a reference to the first module
    2 mscorlib
Type Refs: module ( name ) typedef token
    01000001:      1 ( a ) 02000003 // refers to BaseClass
    01000002:      2 ( mscorlib ) 020006c9 // not referenced
    01000003:      2 ( mscorlib ) 020006f5 // not referenced
    01000004:      1 ( a ) 02000002 // refers to MyStruct
Member Refs: parent type method/field ordinal
    0a000001:      01000002 method 000000 // not referenced
    0a000002:      01000003 method 000000 // not referenced
    0a000003:      01000001 method 000000 //
BaseClass.FirstVirtual
    0a000004:      01000001 method 000001 //
BaseClass.SecondVirtual
    0a000005:      01000001 field 000000 // BaseClass.intField
    0a000006:      01000004 field 000000 // MyStruct.intField
    0a000007:      01000004 field 000001 // MyStruct.doubleField
    0a000008:      01000001 method 000002 //
BaseClass."constructor method"
```

Next, the code 202 in this example describes DerivedClass, including an override:

```
// describes DerivedClass, gives it token 02000002
StartType 02000002 flags = 100000 baseTypeToken = 01000001
    fieldCount = 1
    methodCount = 3
    overrideVirtualMethodCount = 1
// this describes field intField2
Field 04000001 storage = instance protection = private
type = int
    // this describes SecondVirtual and specifies that it
overrides (shares a virtual slot with)
BaseClass.SecondVirtual
    Method 06000001 attrs = c6 (public, override) flags =
0 hints = 800
        overriddenMethodToken = 0a000004
```

The code 202 describing DerivedClass continues, with a description of Main( ):

```
// this describes Main
Method 06000002 attrs=91 (private,static) flags=0 hints= 800
// this describes a compiler-generated constructor method
Method 06000003 attrs=1886 (public) flags=0 hints=830
EndType
// intermediate code for DerivedClass.SecondVirtual
0000 b9                    END_PROLOG
0001 05 b8 03 00 00 00     mov             eax,00000003
0007 bb                    EPILOG_RET
// intermediate code for DerivedClass.Main
0000 b2                    EBP_FRAME
0001 b4 02                 PUSH_REGS       esi
// declares a local variable (ms1 in source)
// of type 01000004, i.e. MyStruct
0003 a8 c0 04      LOCAL_STRUCT    01000004 (defines var#0)
// declares another local variable (ms2) of the same type
0006 a8 c0 04      LOCAL_STRUCT    01000004 (defines var#1)
0009 b8 00         FRAME_SIZE      00
000b 8b 00         REF_UNTR_LOCAL  var#0 // gc tracking
000d 8b 08         REF_UNTR_LOCAL  var#1 // gc tracking
000f af 00         INIT_VAR        var#0 // zero-init var#0
0011 af 01         INIT_VAR        var#1 // zero-init var#1
0013 b9            END_PROLOG
// allocate a DerivedClass object
0014 6d 00 02      ALLOC_OBJECT    02000002
// call its constructor method
0017 04 8b f0 8b ce         mov             esi,eax
                            mov             ecx,esi
```

```
001c 4e 08 00               CALL_REF        0a000008
001f 75                     REF_BIRTH_ESI   // gc tracking;
call virtual method BaseClass.FirstVirtual on the object
0020 02 8b ce               mov             ecx,esi
0023 50 03 00               CALL_VIRT_REF   0a000003
// call virtual method BaseClass.SecondVirtual on the object
(calls DerivedClass.SecondVirtual, because of the override)
0026 02 8b ce               mov             ecx,esi
0029 50 04 00               CALL_VIRT_REF   0a000004
// Store int constant 1 in BaseClass.intField in the object
002c 30 06 c0 05 01         STORE_IMM       [esi].0a000005, 0x1
// Store integer constant 2 into field
DerivedClass.intField2 in the object
0031 30 06 00 01 02         STORE_IMM       [esi].04000001, 0x2
// Store integer constant 42 into MyStruct.intField in var#0
0036 30c5850001c0062a STORE_IMM [ebp].var#0.0a000006, 0x2a
// Store floating point const 3.141592 into
MyStruct.doubleField in var#0
003e 37 c4 84 1b            FLD   qword ptr [ConstPool]
0042 37dd850001c007         FSTP [ebp].var#0.0a000007
// Copy var#0 to var#1 - note size of structure is
unspecified
0049 3fd50501c50500         COPY_STRUCT   [ebp].var#1, [ebp].var#0
0050 bb                     EPILOG_RET
0051 c8 08 00 00 00 7a 00 8b fc fa 21 09 40
            CONST_DATA 8 7a 00 8b fc fa 21 09 40
// intermediate code for compiler-generator constructor
0000 b9                     END_PROLOG
// call BaseClass."constructor method"
0001 4e 08 00               CALL_REF        0a000008
0004 bb                     EPILOG_RET
```

The following may be noted. The intermediate code 202 for Main did not specify the sizes of local variables. These sizes are determined 604 by the binder, which will also determine 606 the stack frame offsets relative to register ebp. Also, there are pseudo instructions 212 to initialize (INIT_STRUCT) and copy (COPY_STRUCT) such variables; these pseudo instructions are translated into machine code sequences by the binder. MDIL also has a PUSH_STRUCT instruction (not shown above) to pass such variables as parameters. Note also how the local variables are accessed by giving the local variable number and the symbolic reference 248 to the field.

Code Fixups

To further illustrate aspects of the foregoing, consider now an example that demonstrates how familiar object code fixups may be insufficient. Being with source code for a type such as the following; in this example, the programming language is C# but embodiments are not necessarily limited to C# environments.

```
class Test : BaseClass
{
    int i;
    public static int GetI(Test t)
    {
        if (t != null)
            return t.i;
        else
            return 0;
    }
}
```

MDIL code 202 produced for method GetI may look like the following. In this disassembly (and others herein), upper case indicates pseudo instructions 212 and lower case indicates machine instructions 134. In this disassembly comments are marked by ;;.

```
Offset  Code bytes
0000    b9              END_PROLOG
0001    02 85 c9        test            ecx, ecx
0004    57 05           JUMP_EQ         0xb
        ;; jump conditionally to offset 000b - distance is 05
0006    13 01 00 01     LOAD            eax, [ecx].04000001
;; 04000001 is the "field token"
000a    bb              EPILOG_RET
000b    02 33 c0        xor             eax,eax
000e    bb              EPILOG_RET
```

A binder 214 may translate this intermediate code 202 into machine code 136 by translating each pseudo instruction 212, by copying the native machine instructions 134, by looking up the field offset for the field designated by field token 04000001, and by ensuring that the jump distances will make jumps go to the right places. Assuming the field offset has a low enough value (say it's 8), this would result in machine code like the following:

```
Offset  Code bytes
0000    85 c9           test            ecx,ecx
0002    75 04           je              0x8
        ;; jump conditionally to offset 0008 - distance is 04
0004    8b 41 08        mov             eax, [ecx+0x8]
;; field 04000001 has offset 8
0007    c3              ret
0008    33 c0           xor             eax,eax
000a    c3              ret
```

If for some reason the field offset has become bigger (say it's now 0xb4), a bigger instruction would be used at offset 4—the machine code would then look like this:

```
Offset  Code bytes
0000    85 c9                   test            ecx,ecx
0002    75 07                   je              0xb
        ;; jump conditionally to offset 000b - distance is 07
0004    8b 81 b4 00 00 00       mov             eax,
[ecx+0x000000b4] ;; field 04000001 has offset 0xb4
000a    c3                      ret
000b    33 c0                   xor             eax,eax
000d    c3                      ret
```

Note that two items were changed, in addition to adjusting the field offset. First, the binder needed a bigger instruction to reference the field. Second, as a consequence, the distance in the conditional jump needed to be adjusted. This example illustrates a transformation 602 of pseudo instruction(s) to different lengths. Old style object code fixups would only be able to handle inserting a new value into a field of an instruction; they would not be able to make the instruction bigger or adjust branch distances to make the jumps go to the right places. In this sense, the binder 214 has capabilities not present in a linker.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 through 7 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process of managing changes involving a base class of a software product, the process utilizing at least one device which has at least one logical processor in operable communication with at least one memory, the process comprising the steps in memory of:

obtaining an initial source code A for a module A, including an initial base class A declared in the initial source code A;

obtaining a source code B for a module B which includes a dependency on initial base class A;

generating an initial intermediate language code A by compiling the initial source code A;

generating an initial intermediate language code B by compiling the source code B;

preparing an initial executable code A by binding the initial intermediate language code A;

preparing an initial executable code B by binding the initial intermediate language code B;

obtaining a revised source code A for a revised base class A in module A which differs from initial base class A in at least one of the following ways: a field has been added, a private field has been removed, field order has been rearranged, a virtual method has been added, virtual method order has been rearranged;

generating a revised intermediate language code A by compiling the revised source code A;

preparing a revised executable code A by binding the revised intermediate language code A; and preparing a revised executable code B by rebinding the initial intermediate language code B while referencing the revised intermediate language code A, thus avoiding recompilation of source code B; and executing revised executable code A with revised executable code B free from any field offset collision and free from any virtual method slot assignment collision during execution of revised base class A;

the process further characterized in that the revised intermediate language code A and the revised executable code A are consistent with a structural correspondence in that each register allocation in the revised intermediate language code A has an identical register allocation in the revised executable code A, and the revised intermediate language code A and the revised executable code A are further consistent with the structural correspondence in at least two of the following ways:

pseudo instructions in the revised intermediate language code A for accessing objects include symbolic field references which correspond to machine instructions using numeric field offsets in the revised executable code A;

pseudo instructions in the revised intermediate language code A for calling virtual methods include symbolic slot references which correspond to machine instructions using numeric virtual method table slots in the revised executable code A;

a pseudo instruction in the revised intermediate language code A for copying a structure whose size is unspecified in the revised intermediate language code A corresponds to machine instructions in the revised executable code A that are consistent with a specific structure size;

a pseudo instruction in the revised intermediate language code A for zero-initializing a structure whose size is unspecified in the revised intermediate language code A corresponds to machine instructions in the revised executable code A that are consistent with a specific structure size;

a pseudo instruction in the revised intermediate language code A for declaring in a routine a local variable whose type is specified symbolically in the revised intermediate language code A corresponds to machine instructions in the revised executable code A that are consistent with at least one specific local variable size of at least one local variable declared symbolically in the routine.

2. The process of claim 1, wherein binding intermediate language code comprises transforming an intermediate language pseudo instruction that accesses memory into a corresponding native language instruction having a different length in bytes than the intermediate language pseudo instruction.

3. The process of claim 1, wherein a size of a local variable is unspecified in the initial intermediate language code B, and rebinding the initial intermediate language code B comprises determining that size and specifying that size in revised executable code B.

4. The process of claim 1, wherein a stack frame offset of a local variable is unspecified in the initial intermediate language code B, and rebinding the initial intermediate language code B comprises determining that stack frame offset and specifying that stack frame offset in revised executable code B.

5. The process of claim 1, wherein a stack frame offset alignment requirement of a local variable is unspecified in the initial intermediate language code B, and rebinding the initial intermediate language code B comprises determining that stack frame offset alignment requirement, and determining a stack frame offset of the local variable consistent with the stack frame offset alignment requirement.

6. The process of claim 1, wherein the initial intermediate language code B includes a symbolic reference to a type defined in revised base class A, and rebinding the initial intermediate language code B comprises transforming that symbolic reference into a reference in revised executable code B that utilizes an address of a data structure describing the type.

7. The process of claim 1, wherein the initial intermediate language code B includes a symbolic reference to a field, and rebinding the initial intermediate language code B comprises transforming that symbolic reference into a numeric offset in revised executable code B.

8. The process of claim 1, wherein the initial intermediate language code B includes a symbolic reference to a member defined in Module A, and rebinding the initial intermediate language code B comprises transforming that symbolic reference into at least one of the following in revised executable code B: a numeric offset, a direct pointer to a method body, an indirect pointer to a method body, a virtual slot number.

9. A computer-readable storage memory configured with data and with instructions that when executed by at least one processor causes the at least one processor to perform a process facilitating management of changes involving base classes of a software product, the process comprising the steps of:

obtaining in a memory a base class source code; and generating in the memory from the base class source code an intermediate language code in which register allocation is execution-ready but at least one of the following is as yet unbound: object field layout, virtual method slot assignment;

wherein the process is further characterized in that an executable code also resides in the memory, the intermediate language code and the executable code are consistent with a structural correspondence in that each register allocation in the intermediate language code has an identical register allocation in the executable code, and the intermediate language code and the executable code are further consistent with the structural correspondence in at least two of the following ways:

pseudo instructions in the intermediate language code for accessing objects include symbolic field references which correspond to machine instructions using numeric field offsets in the executable code;

pseudo instructions in the intermediate language code for calling virtual methods include symbolic slot references which correspond to machine instructions using numeric virtual method table slots in the executable code;

a pseudo instruction in the intermediate language code for copying a structure whose size is unspecified in the intermediate language code corresponds to machine instructions in the executable code that are consistent with a specific structure size;

a pseudo instruction in the intermediate language code for zero-initializing a structure whose size is unspecified in the intermediate language code corresponds to machine instructions in the executable code that are consistent with a specific structure size;

a pseudo instruction in the intermediate language code for declaring in a routine a local variable whose type is specified symbolically in the intermediate language code corresponds to machine instructions in the executable code that are consistent with at least one specific local variable size of at least one local variable declared symbolically in the routine.

10. The computer-readable storage memory of claim 9, wherein the generating step generates intermediate language code in which object field layout is as yet unbound, and does so at least in part by generating intermediate language code which uses a symbolic reference rather than a direct offset to identify a field.

11. The computer-readable storage memory of claim 9, wherein the generating step generates intermediate language code in which object field layout is as yet unbound, and does so at least in part by generating intermediate language code which is field order independent.

12. The computer-readable storage memory of claim 9, wherein the generating step generates intermediate language code in which virtual method slot assignment is as yet unbound.

13. The computer-readable storage memory of claim 9, wherein the generating step generates intermediate language code which includes native instructions and pseudo instructions, with at least one of the following expressed using pseudo instruction(s):
a field access;
a method call;
a virtual method call;
an entire method prolog;
at least a portion of a method prolog;
an entire method epilog;
at least a portion of a method epilog.

14. The computer-readable storage memory of claim 9, wherein the process further comprises binding the intermediate language code and thereby producing executable code, namely, code which is executable by a processor on at least one device.

15. The computer-readable storage memory of claim 9, wherein the process further comprises:
firstly binding the intermediate language code and thereby producing a first executable code for use with a first version of an execution engine; and
secondly binding the same intermediate language code and thereby producing a second executable code for use with a second version of the execution engine.

16. A system comprising:
a processor in operable communication with a memory;
an intermediate language code residing in the memory;
an executable code also residing in the memory, the intermediate language code and the executable code consistent with a structural correspondence in that each register allocation in the intermediate language code has an identical register allocation in the executable code;
the intermediate language code and the executable code further consistent with the structural correspondence in at least two of the following ways:
pseudo instructions in the intermediate language code for accessing objects include symbolic field references which correspond to machine instructions using numeric field offsets in the executable code;
pseudo instructions in the intermediate language code for calling virtual methods include symbolic slot references which correspond to machine instructions using numeric virtual method table slots in the executable code;
a pseudo instruction in the intermediate language code for copying a structure whose size is unspecified in the intermediate language code corresponds to machine instructions in the executable code that are consistent with a specific structure size;
a pseudo instruction in the intermediate language code for zero-initializing a structure whose size is unspecified in the intermediate language code corresponds to machine instructions in the executable code that are consistent with a specific structure size;
a pseudo instruction in the intermediate language code for declaring in a routine a local variable whose type is specified symbolically in the intermediate language code corresponds to machine instructions in the executable code that are consistent with at least one specific local variable size of at least one local variable declared symbolically in the routine.

17. The system of claim 16, further comprising a binder which implements the structural correspondence between the intermediate language code and the executable code.

18. The system of claim 16, wherein the intermediate language code and the executable code are consistent with the structural correspondence in that a pseudo instruction in the intermediate language code for a type layout description of a type at least partially defines a runtime mapping of virtual slot indices to method bodies for the type, wherein at least one method body pointer in the executable code implements a virtual method as being one of the following: a new virtual method, an override of a virtual method in a base type.

19. The system of claim 16, wherein the intermediate language code and the executable code are consistent with the structural correspondence in that a pseudo instruction in the intermediate language code symbolically referencing a type corresponds to machine instructions in the executable code specifying an address of a data structure describing the type.

20. The system of claim 16, wherein the system comprises at least two of the following kinds of symbolic tokens: typeref symbolic tokens, typedef symbolic tokens, memberref symbolic tokens, methoddef symbolic tokens.

* * * * *